United States Patent
Sekiguchi et al.

(10) Patent No.: US 12,531,325 B2
(45) Date of Patent: Jan. 20, 2026

(54) REFLECTION UNIT AND WIRELESS TRANSMISSION SYSTEM

(71) Applicant: Sumitomo Electric Industries, Ltd., Osaka (JP)

(72) Inventors: Masami Sekiguchi, Osaki (JP); Manabu Shiozaki, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 460 days.

(21) Appl. No.: 18/021,022

(22) PCT Filed: Sep. 24, 2021

(86) PCT No.: PCT/JP2021/035080
§ 371 (c)(1),
(2) Date: Feb. 13, 2023

(87) PCT Pub. No.: WO2022/091660
PCT Pub. Date: May 5, 2022

(65) Prior Publication Data
US 2023/0327321 A1    Oct. 12, 2023

(30) Foreign Application Priority Data

Oct. 28, 2020   (JP) ................................. 2020-180447

(51) Int. Cl.
*H01Q 15/14* (2006.01)
*H01Q 1/24* (2006.01)
(Continued)

(52) U.S. Cl.
CPC .............. *H01Q 1/24* (2013.01); *H01Q 15/14* (2013.01); *H01Q 17/00* (2013.01); *H01Q 21/06* (2013.01); *H04B 7/145* (2013.01)

(58) Field of Classification Search
CPC ........ H01Q 1/24; H01Q 15/008; H01Q 17/00; H01Q 21/06; H01Q 15/14–18; H01Q 19/10
See application file for complete search history.

(56) References Cited

U.S. PATENT DOCUMENTS

| 7,164,932 B1 | 1/2007 | Sato et al. |
| 11,658,423 B2 * | 5/2023 | Herrero ..................... H01Q 3/46 343/702 |

(Continued)

FOREIGN PATENT DOCUMENTS

| EP | 3 919 929 A1 | 12/2021 |
| JP | 06-053701 A | 2/1994 |

(Continued)

OTHER PUBLICATIONS

Mohamed A. Elmossallamy et al., :Reconfigurable Intelligent Surfaces for Wireless Communications: Principles, Challenges, and Opportunities, IEEE Transactions on Cognitive Communications and Networking, vol. 6, No. 3, Sep. 2020, pp. 990-1002. [Cited in EP Search Report in corresponding EP Appl. No. 21 885 779.5 dated Mar. 22, 2024.].

(Continued)

*Primary Examiner* — Hasan Islam
(74) *Attorney, Agent, or Firm* — McCarter & English, LLP; Michael A. Sartori

(57) ABSTRACT

A reflection unit of this disclosure is a reflection unit installed in a wireless transmission path between a first wireless device configured to at least transmit a wireless communication signal and a second wireless device configured to at least receive the wireless communication signal, in order to change a direction of the wireless transmission path. The reflection unit includes a plurality of reflectors configured to reflect the wireless communication signal. The (Continued)

plurality of reflectors include at least one reflectarray reflector.

27 Claims, 38 Drawing Sheets

(51) Int. Cl.
*H01Q 17/00* (2006.01)
*H01Q 21/06* (2006.01)
*H04B 7/145* (2006.01)

(56) References Cited

U.S. PATENT DOCUMENTS

| | | | |
|---|---|---|---|
| 11,811,140 B2* | 11/2023 | Balakrishnan | H01Q 3/46 |
| 2010/0119234 A1 | 5/2010 | Suematsu et al. | |
| 2019/0363448 A1 | 11/2019 | Yemelong et al. | |
| 2020/0028262 A1 | 1/2020 | Fang | |

FOREIGN PATENT DOCUMENTS

| | | |
|---|---|---|
| JP | 06-077726 A | 3/1994 |
| JP | 06-200584 A | 7/1994 |
| JP | 2000-165959 A | 6/2000 |
| JP | 2005-244362 A | 9/2005 |
| JP | 2007-143044 A | 6/2007 |
| JP | 2010-118845 A | 5/2010 |
| JP | 2012-060530 A | 3/2012 |
| JP | 2012-182783 A | 9/2012 |
| JP | 2014-072818 A | 4/2014 |
| JP | 2014-082709 A | 5/2014 |
| JP | 2015-046821 A | 3/2015 |
| JP | 2020-509687 A | 3/2020 |
| WO | 2021/030492 A1 | 2/2021 |

OTHER PUBLICATIONS

Tukada et al., "Fundamental Study on Design of Radiation Scattering Shared Reflect Array Antenna," vol. 2016, No. 581-2, 5 pages. [w/English Translation].

* cited by examiner

REFLECTION UNIT AND WIRELESS TRANSMISSION SYSTEM

TECHNICAL FIELD

The present disclosure relates to a reflection unit and a wireless transmission system. The present application claims priority on Japanese Patent Application No. 2020-180447 filed on Oct. 28, 2020, the entire content of which is incorporated herein by reference.

BACKGROUND ART

PATENT LITERATURE 1 discloses a radio wave reflection plate for use in an in-premises information communication system provided with a master transmitter-receiver and a slave transmitter-receiver. The radio wave reflection plate of PATENT LITERATURE 1 forms a convex curved surface or a concave curved surface, and is mounted to a ceiling part in the premises.

PATENT LITERATURE 2 discloses a method for designing a reflectarray. The reflectarray is configured by arranging a plurality of reflection elements on a substrate. The reflectarray reflects a radio wave incident thereon, into a desired direction.

PATENT LITERATURE 3 discloses a reflection mirror antenna having a curved surface shape. The reflection mirror antenna of PATENT LITERATURE 3 includes a primary radiation part, a sub reflection mirror, and a main reflection mirror. The sub reflection mirror has a curved surface that converts parallel rays radiated from the primary radiation part into focused rays, and reflects the resultant rays. The main reflection mirror has a curved surface that converts diverging rays, which are the focused rays from the sub reflection mirror having diverged through the focusing position, into parallel rays, and reflects the resultant rays. PATENT LITERATURE 3 indicates that the sub reflection mirror and the main reflection mirror may be implemented by a reflectarray.

PATENT LITERATURE 4 also discloses an antenna device that includes a primary radiation part and a reflectarray.

PATENT LITERATURE 5 discloses a millimeter wave transmission/reception system using a metal reflection plate.

PATENT LITERATURE 6 discloses a millimeter wave communication system that can easily adjust the initial direction of a metal reflection plate disposed at a propagation path of a signal in a millimeter wave band.

PATENT LITERATURE 7 discloses a 90°-bend for millimeter waves for use in a system in which a millimeter wave outputted from a gyrotron in an electron cyclotron resonance heating device is transmitted. The 90°-bend for millimeter waves of PATENT LITERATURE 7 changes the transmission direction of the millimeter wave by two reflection plates.

PATENT LITERATURE 8 discloses a reflectarray that can reflect, into a desired direction, a first polarized wave having an electric field component parallel to the surface of a substrate and a second polarized wave having an electric field component perpendicular to the surface of the substrate.

NON PATENT LITERATURE 1 discloses designing of a reflectarray antenna for both radiation and scattering.

CITATION LIST

Patent Literature

PATENT LITERATURE 1: Japanese Laid-Open Patent Publication No. H6-200584

PATENT LITERATURE 2: Japanese Laid-Open Patent Publication No. 2015-046821

PATENT LITERATURE 3: Japanese Laid-Open Patent Publication No. 2012-182783

PATENT LITERATURE 4: Japanese Laid-Open Patent Publication No. 2014-082709

PATENT LITERATURE 5: Japanese Laid-Open Patent Publication No. 2010-118845

PATENT LITERATURE 6: Japanese Laid-Open Patent Publication No. 2005-244362

PATENT LITERATURE 7: Japanese Laid-Open Patent Publication No. H6-053701

PATENT LITERATURE 8: Japanese Laid-Open Patent Publication No. 2014-072818

Non Patent Literature

NON PATENT LITERATURE 1: Ryuhei Tsukada and two others "Housha sanran kyouyou rifurekuto arei antena no sekkei no kisokento" (provisional translation: "Basic study of designing of reflectarray antenna for both radiation and scattering"), document by transmission engineering study group, Vol. 2016, No. 581, pp. 2-3, Tohoku University, Research Institute of Electrical Communication, Transmission Engineering Study Group, June 2016

SUMMARY OF THE INVENTION

An aspect of the present disclosure is a reflection unit. The reflection unit of the disclosure is installed in a wireless transmission path between a first wireless device configured to at least transmit a wireless communication signal and a second wireless device configured to at least receive the wireless communication signal, in order to change a direction of the wireless transmission path. The reflection unit includes a plurality of reflectors configured to reflect the wireless communication signal. The plurality of reflectors include at least one reflectarray reflector.

A reflection unit of the disclosure is installed in a wireless transmission path between a first wireless device configured to at least transmit a wireless communication signal and a second wireless device configured to at least receive the wireless communication signal. The reflection unit includes at least one concentration-type reflectarray reflector configured such that a reflected wave of the wireless communication signal is concentrated at a focal point.

Another aspect of the disclosure is a wireless transmission system. The wireless transmission system of the disclosure includes: a first wireless device configured to at least transmit a wireless communication signal; a second wireless device configured to at least receive the wireless communication signal; and the reflection unit installed in a wireless transmission path between the first wireless device and the second wireless device in order to change a direction of the wireless transmission path.

DETAILED DESCRIPTION

Figure 1:
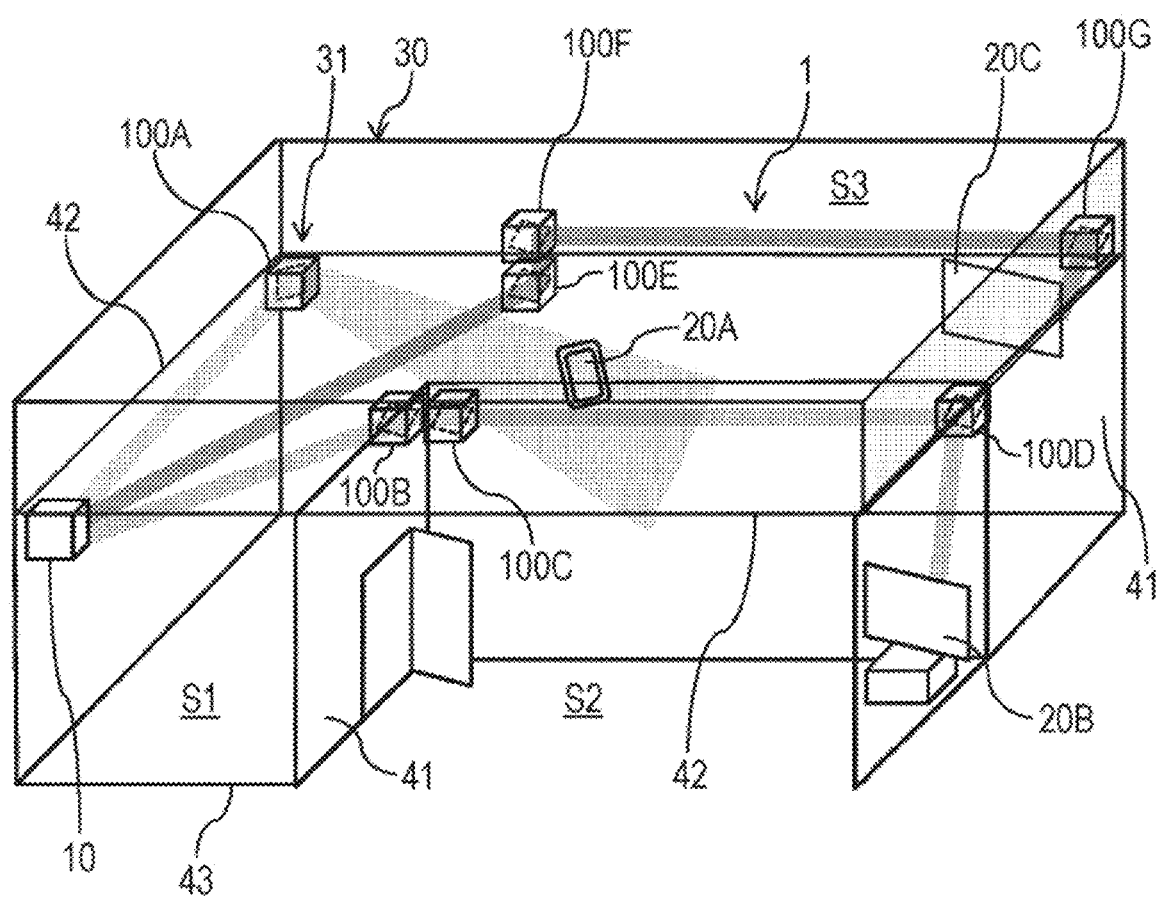
FIG. 1 is a schematic configuration diagram of a structure where a wireless transmission system is installed.

Problems to be Solved by the Present Disclosure

Between a first wireless device and a second wireless device that transmit/receive a wireless communication signal, it is necessary to change the direction of the wireless transmission path in some cases. An appropriate reflection unit for changing the direction of a wireless transmission path is desired.

Outline of Embodiment of the Present Disclosure

Hereinafter, outlines of embodiments of the present disclosure will be listed and described.

(1) A reflection unit according to an embodiment is installed in a wireless transmission path between a first wireless device configured to at least transmit a wireless communication signal and a second wireless device configured to at least receive the wireless communication signal, in order to change a direction of the wireless transmission path. The reflection unit includes a plurality of reflectors configured to reflect the wireless communication signal. The plurality of reflectors include at least one reflectarray reflector. Different from a metal reflection plate, the reflectarray reflector can be designed so as to radiate a reflected wave into a desired direction, which is advantageous. Therefore, when the plurality of reflectors include at least one reflectarray reflector, the degree of freedom in the direction of the reflected wave is increased. When the number of reflectarray reflectors is one, it is difficult to cope with incidence from directly beside thereof or reflection to directly beside thereof. However, when the reflection unit includes a plurality of reflectors, such a problem is solved. Here, a "wireless communication signal" includes radio signals having a frequency of a submillimeter wave, a frequency of a millimeter wave, and a frequency higher than that of a millimeter wave, and a high frequency power signal.

(2) The at least one reflectarray reflector may be a plurality of reflectarray reflectors. When a plurality of reflectarray reflectors are combined, the function of the reflection unit is improved.

(3) The reflection unit may be mountable to a structure having a corner where a first face and a second face are in contact with each other. The plurality of reflectarray reflectors may include: a first reflectarray reflector configured to be mounted to the first face; and a second reflectarray reflector configured to be mounted to the second face. In this case, an appropriate installation form at a corner can be obtained.

(4) The plurality of reflectarray reflectors may include at least one non-diffusion reflectarray reflector configured such that the wireless communication signal is reflected in a non-diffused manner. In this case, a reflected wave according to non-diffuse reflection can be obtained.

(5) The plurality of reflectarray reflectors may include at least one diffusion reflectarray reflector configured such that the wireless communication signal is reflected in a diffused manner, and at least one non-diffusion reflectarray reflector configured such that the wireless communication signal is reflected in a non-diffused manner. In this case, diffusion and non-diffusion of the reflected wave can be obtained.

(6) The at least one non-diffusion reflectarray reflector may include at least one concentration-type reflectarray reflector configured such that a reflected wave of the wireless communication signal is concentrated at a focal point. In this case, the reflected wave can be caused to have a narrow angle.

(7) The reflection unit may be mountable to a structure that has: a first portion; and a second portion where the wireless communication signal is more easily propagated than in the first portion, and the concentration-type reflectarray reflector may be mounted to the structure such that the reflected wave passes through the second portion. In this case, the reflected wave having been caused to have a narrow angle can pass through the second portion.

(8) The concentration-type reflectarray reflector may be configured such that the focal point is present at a position where an obstacle present in the wireless transmission path is avoided. In this case, the wireless communication signal can be transmitted while the obstacle is avoided.

(9) The plurality of reflectors may include another reflector that further reflects the reflected wave caused by the concentration-type reflectarray reflector. The other reflector may be smaller than the concentration-type reflectarray reflector. In this case, the other reflector can be downsized.

(10) The plurality of reflectarray reflectors may include a first reflectarray reflector, and a second reflectarray reflector configured to reflect a reflected wave, caused by the first reflectarray reflector, of the wireless communication signal. The first reflectarray reflector may be one of a diffusion reflectarray reflector, a concentration-type reflectarray reflector, and a non-diffusion and non-concentration-type reflectarray reflector. The second reflectarray reflector may be one of the diffusion reflectarray reflector, the concentration-type reflectarray reflector, and the non-diffusion and non-concentration-type reflectarray reflector. The diffusion reflectarray reflector may be a reflectarray reflector configured such that the wireless communication signal is reflected in a diffused manner. The concentration-type reflectarray reflector may be a reflectarray reflector configured such that a reflected wave of the wireless communication signal is concentrated at a focal point. The non-diffusion and non-concentration-type reflectarray reflector may be a reflectarray reflector configured such that: the wireless communication signal is not reflected in a diffused manner; and a reflected wave of the wireless communication signal is not concentrated at a focal point. When a plurality of reflectarray reflectors are combined, the function of the reflection unit is improved.

(11) The reflection unit may be mountable to a structure having an installation surface. The plurality of reflectarray reflectors may include: a first reflectarray reflector configured to form a first reflected wave by reflecting the wireless communication signal; and a second reflectarray reflector configured to form a second reflected wave by reflecting the first reflected wave. The second reflectarray reflector may be configured to radiate the second reflected wave into a range including a direction orthogonal to the installation surface. In this case, the second reflected wave can be radiated into a range including a direction orthogonal to the installation surface, and thus, a radiation range that is easily and intuitively understood can be obtained.

(12) The plurality of reflectarray reflectors may include a first reflectarray reflector, a second reflectarray reflector, and a third reflectarray reflector. The first reflectarray reflector may be configured to form: a first reflected wave toward the second reflectarray reflector by reflecting a first incident wave having a first incident angle; and a second reflected wave toward the third reflectarray reflector by reflecting a second incident wave having a second incident angle different from the first incident angle. The second reflectarray reflector may be configured to form a third reflected wave by reflecting the first reflected wave. The third reflectarray reflector may be configured to form a fourth reflected wave by reflecting the second reflected wave. The third reflected wave and the fourth reflected wave may have radiation ranges overlapping each other. In this case, the overlapping radiation ranges of the third reflected wave and the fourth reflected wave can be enlarged, which is preferable.

(13) The plurality of reflectarray reflectors may include a first reflectarray reflector, and a second reflectarray reflector. The reflection unit may further include a radio wave absorber. The first reflectarray reflector may be configured to form: a first reflected wave toward the second reflectarray reflector by reflecting a first incident wave having a first incident angle; and a second reflected wave toward the radio wave absorber by reflecting a second incident wave having a second incident angle different from the first incident angle. In this case, the second reflected wave can be absorbed.

(14) The at least one reflectarray reflector may include a multi-focal point reflectarray reflector. The multi-focal point reflectarray reflector may be configured such that a first focal point at a first radiation plane included in a radiation range of a reflected wave of the wireless communication signal and a second focal point at a second radiation plane orthogonal to the first radiation plane are present at different positions. In this case, a plurality of focal points can be obtained.

(15) The plurality of reflectarray reflectors may include a first reflectarray reflector and a second reflectarray reflector. The first reflectarray reflector may be configured to reflect a second reflected wave, caused by the second reflectarray reflector, of a second wireless communication signal transmitted from the second wireless device. The second reflectarray reflector may be configured to reflect a first reflected wave, caused by the first reflectarray reflector, of a first wireless communication signal transmitted from the first wireless device. The first reflectarray reflector may include: a first concentration reflection part configured such that the first reflected wave is concentrated at a focal point; and a first non-concentration reflection part configured such that the first reflected wave is not concentrated. The second reflectarray reflector may include: a second concentration reflection part configured such that the second reflected wave is concentrated at a focal point; and a second non-concentration reflection part configured such that the second reflected wave is not concentrated. Transmission loss of the wireless communication signal can be reduced not only in the wireless transmission path from the first wireless device toward the second wireless device, but also in the wireless transmission path from the second wireless device toward the first wireless device.

(16) The first concentration reflection part and the second concentration reflection part may be each implemented by a reflectarray including a plurality of reflection elements. Accordingly, the degree of freedom in the direction of the reflected wave is increased. Further, since the reflectarray can be formed in a flat plate shape, space can be reduced, and impairment of the appearance of the mounting place of the reflection unit can be suppressed.

(17) The first non-concentration reflection part may be configured to reflect the second reflected wave caused by the second concentration reflection part. The second non-concentration reflection part may be configured to reflect the first reflected wave caused by the first concentration reflection part. Accordingly, the wireless communication signal can be efficiently transmitted.

(18) The first reflectarray reflector may include a first low reflection region around the first non-concentration reflection part. The first low reflection region may have a reflectance lower than a reflectance, as to the second reflected wave, of the first non-concentration reflection part. The second reflectarray reflector may include a second low reflection region around the second non-concentration reflection part. The second low reflection region may have a reflectance lower than a reflectance, as to the first reflected wave, of the second non-concentration reflection part. Accordingly, entry of a noise radio wave into the wireless communication signal can be suppressed.

(19) The first low reflection region and the second low reflection region may each include a radio wave absorber. Accordingly, entry of a noise radio wave into the wireless communication signal can be further suppressed.

(20) The first concentration reflection part may be formed in a ring shape. The first non-concentration reflection part may be disposed on an inner side of the first concentration reflection part. The second concentration reflection part may be formed in a ring shape. The second non-concentration reflection part may be disposed on an inner side of the second concentration reflection part. Accordingly, the first concentration reflection part and the first non-concentration reflection part, and the second concentration reflection part and the second non-concentration reflection part can be efficiently disposed.

(21) The reflection unit may be mountable to a structure having a corner where a first face and a second face are in contact with each other. The first reflectarray reflector may be mounted to the first face. The second reflectarray reflector may be mounted to the second face. The first non-concentration reflection part may be disposed at a position closer to the second face than the first concentration reflection part, or a position farther away from the second face than the first concentration reflection part. The second non-concentration reflection part may be disposed at a position closer to the first face than the second concentration reflection part, or a position farther away from the first face than the second concentration reflection part. Accordingly, when the dispositions of the first concentration reflection part and the first non-concentration reflection part, and the second concentration reflection part and the second non-concentration reflection part are determined according to the radio wave state and the like in a space where the reflection unit is mounted, influence of noise in the wireless communication can be reduced.

(22) The first non-concentration reflection part may be configured such that the first reflected wave is diffused, or may be configured such that the first reflected wave is not diffused and is not concentrated. The second non-concentration reflection part may be configured such that the second reflected wave is diffused, or may be configured such that the second reflected wave is not diffused and is not concentrated. Accordingly, the wireless communication signal can be transmitted in a preferable manner.

(23) The first non-concentration reflection part and the second non-concentration reflection part may be each implemented by a reflectarray including a plurality of reflection elements. Accordingly, the degree of freedom in the direction of the reflected wave is increased. Further, since the reflectarray can be formed in a flat plate shape, space can be reduced, and impairment of the appearance of the mounting place of the reflection unit can be suppressed.

(24) The first non-concentration reflection part may be attachable to and detachable from the first concentration reflection part. The second non-concentration reflection part may be attachable to and detachable from the second concentration reflection part. Accordingly, the position of the first non-concentration reflection part can be adjusted to a position where the reflected wave from the second concentration reflection part can be incident. The position of the second non-concentration reflection part can be adjusted to a position where the reflected wave from the first concentration reflection part can be incident.

(25) The reflection unit may be embedded in a construction member. A preferable form in which the reflection unit is embedded in a construction member can be obtained.

(26) A reflection unit according to an embodiment is installed in a wireless transmission path between a first wireless device configured to at least transmit a wireless communication signal and a second wireless device configured to at least receive the wireless communication signal. The reflection unit includes at least one concentration-type reflectarray reflector configured such that a reflected wave of the wireless communication signal is concentrated at a focal point. In this case, the reflected wave can be caused to have a narrow beam width around a focal point.

(27) The reflection unit may be mountable to a structure that has: a first portion; and a second portion where the wireless communication signal is more easily propagated than in the first portion. The concentration-type reflectarray reflector may be mounted to the structure such that the reflected wave passes through the second portion. In this case, the reflected wave having been caused to have a narrow beam width around a focal point can pass through the second portion.

(28) The concentration-type reflectarray reflector may be configured such that the focal point is present at a position where an obstacle present in the wireless transmission path is avoided. In this case, the obstacle can be avoided.

(29) The reflection unit can further include another reflector configured to further reflect the reflected wave. The other reflector may be smaller than the concentration-type reflectarray reflector. In this case, the other reflector can be downsized.

(30) A wireless transmission system according to an embodiment includes: a first wireless device configured to at least transmit a wireless communication signal; a second wireless device configured to at least receive the wireless communication signal; and the reflection unit installed in a wireless transmission path between the first wireless device and the second wireless device in order to change a direction of the wireless transmission path.

Details of Embodiments of the Present Disclosure

Hereinafter, details of embodiments of the present disclosure will be described with reference to the drawings. At least some of embodiments described blow may be combined as desired.

First Embodiment

FIG. 1 shows a wireless transmission system 1 according to a first embodiment. The wireless transmission system 1 according to the first embodiment is used, for example, for wireless transmission at a frequency of a submillimeter wave and a frequency higher than that of the submillimeter wave, and more preferably, is used for wireless transmission at a frequency of a millimeter wave and a frequency higher than that of the millimeter wave. The millimeter wave is a radio wave having a frequency of 30 GHz to 300 GHz. The submillimeter wave is a radio wave of which the frequency is lower than that of the millimeter wave but is close to that of the millimeter wave. The frequency of the submillimeter wave is not less than 20 GHz and less than 30 GHz, for example. A radio wave having a high frequency such as a millimeter wave can realize a large volume of transmission data. However, a radio wave having a high frequency such as a millimeter wave has a high straight-line propagation properties and tends to have a narrow directivity (narrow beam characteristic) in order to cover transmission loss. Therefore, the radio wave having a high frequency such as a millimeter wave has a problem in radiation to a space having poor Line of Sight or radiation to a wide range. In addition, the radio wave having a high frequency such as a millimeter wave has a problem in transmission indoors because it is difficult for the radio wave to penetrate a member such as a wall.

The wireless transmission system 1 shown in FIG. 1 includes a plurality of wireless devices 10, 20 that perform transmission/reception of a wireless communication signal. The plurality of wireless devices 10, 20 include a first wireless device 10 and a second wireless device 20. The first wireless device 10 is a base station, as an example. The base station 10 is a base station for mobile communication systems for the 5th generation or a generation thereafter, for example. The second wireless device 20 is user equipment that communicates with the base station 10, for example. The user equipment 20 may be a mobile station that can be moved, or may be a fixed station that is not moved.

The wireless transmission system 1 shown in FIG. 1 is installed in a structure 30 having an internal space such as an architecture. The architecture is a house, a building, or a factory, for example. The structure 30 may be an underground town, a tunnel, or the like. In the present embodiment, the internal space of the structure 30 is used as a wireless transmission path. The space used as a wireless transmission path may be an external space surrounded by one or a plurality of buildings.

The structure 30 shown in FIG. 1 is, as an example, an architecture that has a plurality of internal spaces S1, S2, S3 partitioned by a wall member 41. The plurality of internal spaces include a corridor S1 and a room S2, for example. The construction member forming the architecture 30 includes a ceiling member 42 and a floor member 43 other than the wall member 41 mentioned above. The ceiling member 42 and the floor member 43, together with the wall member 41, define the internal spaces S1, S2, S3 in the architecture 30. The architecture 30 includes, as the internal space, an attic space S3 being a space above the ceiling member 42, or an underfloor space being a space below the floor member 43. In the present embodiment, in addition to the internal spaces, such as the corridor S1 or the room S2, that are utilized by a person, the attic space S3 or the underfloor space, which are not internal spaces that are utilized by a person, are also used as wireless transmission paths.

The wireless transmission system 1 shown in FIG. 1 includes a plurality of reflection units 100A, 100B, 100C, 100D, 100E, 100F, 100G. In order to change the directions of the wireless transmission paths between the base station 10 and the user equipment 20A, 20B, 20C, the plurality of reflection units 100A, 100B, 100C, 100D, 100E, 100F, 100G are installed in the wireless transmission paths.

In FIG. 1, the reflection unit 100A is provided in Line of Sight (LOS) of the base station 10, and reflects a wireless communication signal (incident wave) transmitted from the base station 10. The reflected wave caused by the reflection unit 100A is radiated to the user equipment 20A positioned in No Line Of Sight (NLOS) of the base station 10. The reflection unit 100A diffuses the incident wave transmitted from the base station 10 and radiates a reflected wave in the form of a wide beam to a space where the user equipment 20A is positioned. Since the reflection unit 100A can perform wide angle reflection through diffusion, the reflection unit 100A can supplement the narrow beam characteristic of the radio wave having a high frequency such as a millimeter wave.

The reflection unit 100B is provided in Line of Sight of the base station 10, and reflects a wireless communication signal (incident wave) transmitted from the base station 10. The reflection unit 100B causes a radio wave to pass, from the internal space S1 where the base station 10 is present, through an opening formed in the wall member 41, to the adjacent internal space S2 sectioned by the wall member 41. The reflection unit 100C further reflects the reflected wave caused by the reflection unit 100B. In the internal space S2, the reflected wave caused by the reflection unit 100C is radiated toward the reflection unit 100D. The reflection unit 100D further reflects the reflected wave caused by the reflection unit 100C, to provide the reflected wave to the user equipment 20B.

In general, a radio wave having a high frequency such as a millimeter wave cannot be sufficiently radiated to another space S2 partitioned by a construction member such as the wall member 41 in some cases. However, since the reflection unit 100B reflects a radio wave such that the radio wave passes through the opening in the wall member 41, the radio wave can be efficiently radiated to another space S2.

The reflection unit 100E is provided in Line of Sight of the base station 10 and reflects a wireless communication signal (incident wave) transmitted from the base station 10. The reflection unit 100E causes a radio wave to pass, from the internal space S1 where the base station 10 is present, through an opening formed in the ceiling member 42, to the attic space S3. The reflection unit 100F further radiates the reflected wave caused by the reflection unit 100E. In the attic space S3, the reflected wave caused by the reflection unit 100F is radiated toward the reflection unit 100G. The reflection unit 100G further reflects the reflected wave from the reflection unit 100F, to provide the reflected wave to the user equipment 20C. In the present embodiment, a space, such as the attic space S3, that is not utilized by a person is also utilized as a wireless transmission path.

As shown in FIG. 1, since the plurality of reflection units 100A, 100B, 100C, 100D, 100E, 100F, 100G are disposed indoors, a radio wave can be radiated to corners indoors.

The reflection unit 100A, 100B, 100C, 100D, 100E, 100F, 100G also reflects a wireless communication signal (radio wave) transmitted from the user equipment 20A, 20B, 20C to the base station 10.

The functions of the reflection units 100A, 100B, 100C, 100D, 100E, 100F, 100G shown in FIG. 1 are merely examples. Hereinafter, details of the reflection units and a large variation of functions will be described.

Figure 2:
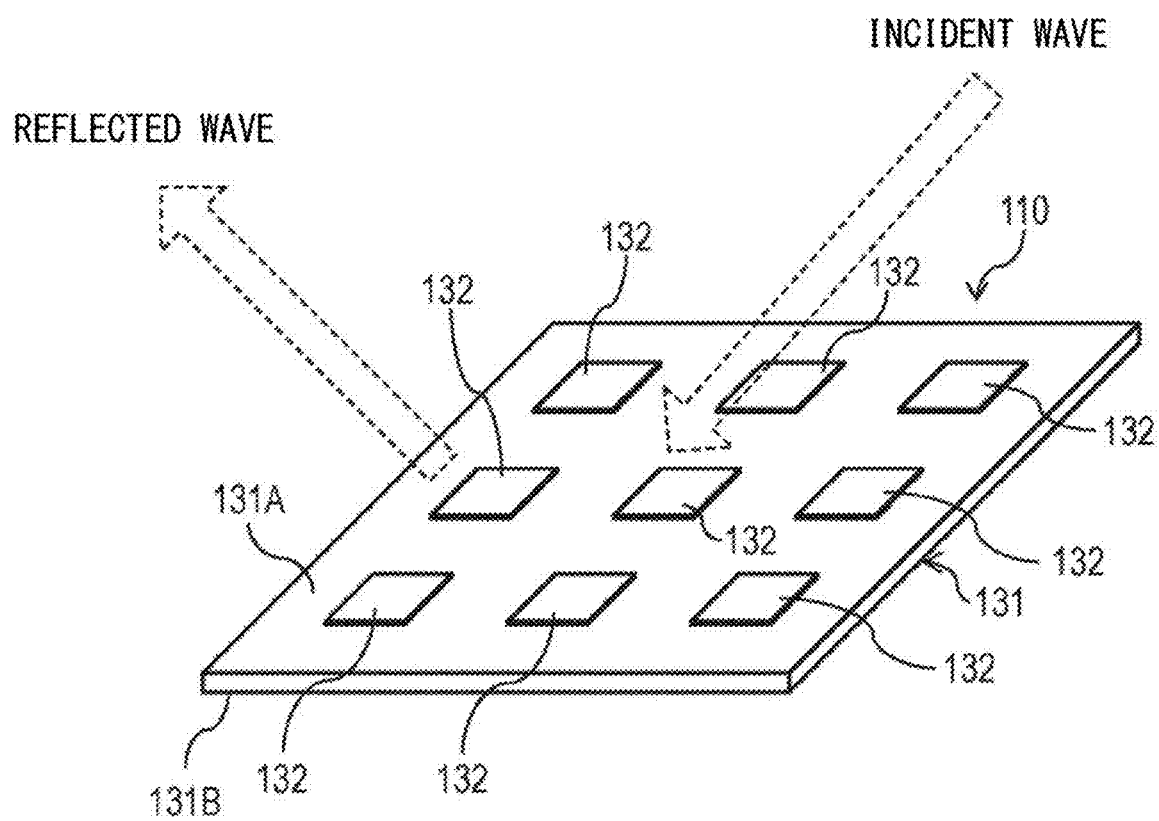
FIG. 2 is a perspective view of a reflectarray reflector.

FIG. 2 shows a reflectarray reflector 110 of the reflection unit according to the first embodiment. The reflectarray reflector 110 of the first embodiment has a plate shape, and thus, is also referred to as a reflectarray reflection plate. The reflection unit according to the first embodiment includes one or a plurality of reflectarray reflectors 110. The reflectarray reflector 110 includes a high frequency substrate 131 having a first face being a front face 131A and a second face being a rear face 131B. The high frequency substrate 131 is formed in a flat plate shape. The high frequency substrate 131 is formed from a dielectric. A plurality of reflection elements 132 each formed from a conductor are formed at the front face 131A of the high frequency substrate 131. A conductor serving as a ground is formed at the rear face 131B of the high frequency substrate 131. The reflectarray reflector 110 reflects a radio wave at the front face 131A on which the reflection elements 132 are formed.

Here, as a reflector of a radio wave, there is a plane metal reflection plate, for example. The plane metal reflection plate reflects a radio wave in a mirror reflection manner. That is, the incident angle of an incident wave to the plane metal reflection plate and the reflection angle of the reflected wave from the plane metal reflection plate are equal to each other. Therefore, when a plane metal reflection plate is used as a reflector, the direction of the reflected wave is restricted by the direction of the incident wave. Therefore, in a case where an installation surface has a restriction, by merely using a plane metal reflection plate, it is difficult to radiate the reflected wave into a desired direction.

In contrast to this, when the size or the shape of each reflection element 132 is adjusted, the reflectarray reflector 110 can radiate a reflected wave into a desired direction.

Here, in general, a reflectarray is used as a part of an antenna. However, the reflectarray reflector 110 of the first embodiment does not form a part of an antenna of the wireless device 10, 20, but is used for reflecting, in a wireless transmission path, a radio wave (wireless communication signal) radiated from the wireless device 10, 20 that includes an antenna. That is, the reflectarray reflector 110 of the first embodiment is installed in a wireless transmission path in order to change the direction of the wireless transmission path between the first wireless device 10 and the second wireless device 20.

With respect to diffusion or concentration of a reflected wave, the reflectarray reflector 110 can be designed so as to simulate reflection characteristics of a metal reflection surface having an arbitrary shape. In order to design the reflectarray reflector 110 that simulates the reflection characteristics of a metal reflection surface having an arbitrary shape, first, a phase change amount necessary for each reflection element 132 of the reflectarray reflector 110 is obtained from the reflection characteristics at the metal reflection surface to be simulated. There is a predetermined correspondence relationship between the phase change amount and the size or shape of the reflection element 132. Therefore, when the phase change amount is obtained, the size or shape of the reflection element 132 can be determined.

Here, as for the reflection characteristics simulated by the reflectarray reflector 110, a reflection characteristic regarding diffusion or concentration of a reflected wave at the metal reflection surface is sufficient, and there is no need to simulate the direction of the reflected wave. As described above, in the case of a metal reflection surface, the direction of the reflected wave cannot be freely adjusted, but the reflectarray reflector 110 can radiate the reflected wave into a desired direction by appropriately designing the size or shape of each reflection element.

Figure 3:
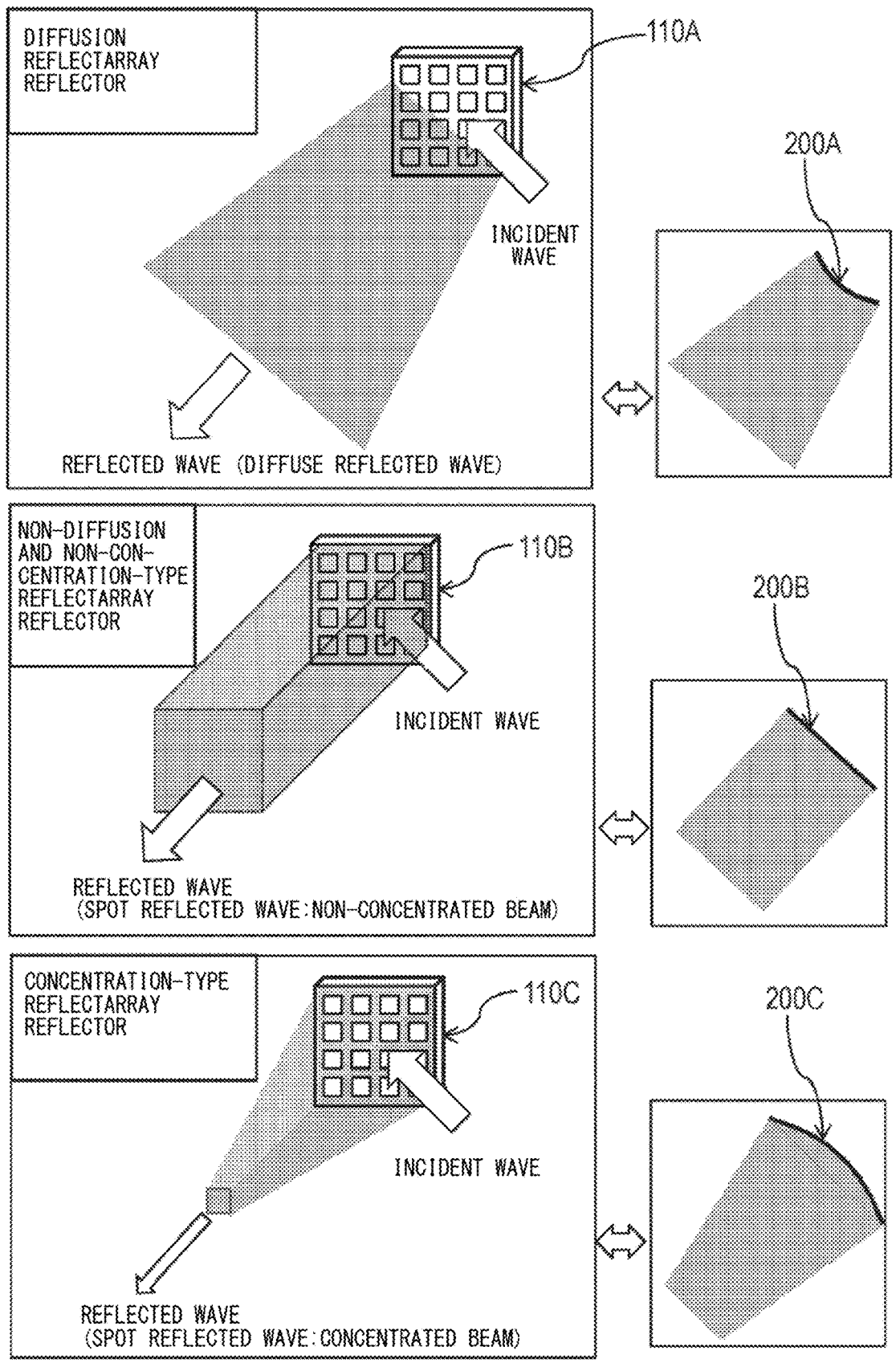
FIG. 3 describes variations of a reflected wave at the reflectarray reflector.

The shape of the metal reflection surface of which the reflection characteristics can be simulated by the reflectarray reflector 110 is a spherical surface, for example. As shown in FIG. 3, a convex curved surface metal plate 200A having a convex curved surface forming a part of a spherical surface diffuses a reflected wave. The degree of diffusion is determined by the curvature of the convex curved surface. Another shape of the metal reflection surface of which the reflection characteristics can be simulated by the reflectarray reflector 110 is a paraboloid of revolution. A concave curved surface metal plate 200C having a concave curved surface forming a part of a paraboloid of revolution concentrates a reflected wave. The degree of concentration is determined by the curvature of the concave curved surface. The focal point of the concentrated reflected wave is positioned forward of the concave curved surface metal plate 200C. A plane metal plate 200B does not have an action of diffusing or concentrating a reflected wave.

Here, as shown in FIG. 3, a reflectarray reflector that simulates the beam diffusion characteristic of the convex curved surface metal plate 200A is referred to as a diffusion reflectarray reflector 110A. The diffusion reflectarray reflector 110A diffuses a reflected wave, similar to the convex curved surface metal plate 200A. A reflected wave caused by the diffusion reflectarray reflector 110A is also referred to as a diffuse reflected wave.

A reflectarray reflector that simulates the beam characteristic of the plane metal plate 200B is referred to as a non-diffusion and non-concentration-type reflectarray reflector 110B. The non-diffusion and non-concentration-type reflectarray reflector 110B does not have an action of diffusing or concentrating a reflected wave, similar to the plane metal plate 200B.

A reflectarray reflector that simulates the beam concentration characteristic of the concave curved surface metal plate 200C is referred to as a concentration-type reflectarray reflector 110C. The concentration-type reflectarray reflector 110C concentrates a reflected wave, similar to the concave curved surface metal plate 200C. The focal point of the concentrated reflected wave is positioned forward of the concentration-type reflectarray reflector 110C.

Here, the non-diffusion and non-concentration-type reflectarray reflector 110B and the concentration-type reflectarray reflector 110C are also referred as a non-diffusion reflectarray reflector. The reflected wave caused by the non-diffusion reflectarray reflector 110B, 110C is also referred to as a spot reflected wave or a non-diffuse reflected wave. The reflected wave caused by the non-diffusion and non-concentration-type reflectarray reflector 110B is also referred to as a non-concentration spot reflected wave. The reflected wave caused by the concentration-type reflectarray reflector 110C is also referred to as a concentration spot reflected wave.

The reflectarray reflector 110 can diffuse or concentrate a reflected wave without a convex curved surface or a concave curved surface being formed, unlike the metal reflection plate. When a convex curved surface or a concave curved surface is necessary, the space necessary for installation is increased. However, in the case of the reflectarray reflector 110, a reflected wave can be diffused or concentrated by means of a planar body, and thus, the space necessary for installation can be reduced.

The metal reflection surface simulated by the diffusion reflectarray reflector 110A and the concentration-type reflectarray reflector 110C is not limited to a curved surface of a part of a spherical surface being the surface of a sphere, and a curved surface of a part of a paraboloid of revolution being the surface of a paraboloid body of revolution, and may be a curved surface of a part of the surface of an ellipsoid body of revolution or a hyperboloid body of revolution. The paraboloid body of revolution includes, as a form thereof, an ellipsoid body of revolution and a hyperboloid body of revolution. Therefore, the metal reflection surface simulated by the diffusion reflectarray reflector 110A and the concentration-type reflectarray reflector 110C may be a curved surface of a part of the surface of an ellipsoid body of revolution or a hyperboloid body of revolution. When the convex curved surface metal plate 200A shown in FIG. 3 is a paraboloid of revolution or an ellipsoid of revolution, and the reflectarray reflector 110A simulates the beam diffusion characteristic of the convex curved surface metal plate 200A, the focal point of a reflected wave is positioned behind the reflectarray reflector 110A and the convex curved surface metal plate 200A.

Figure 4:
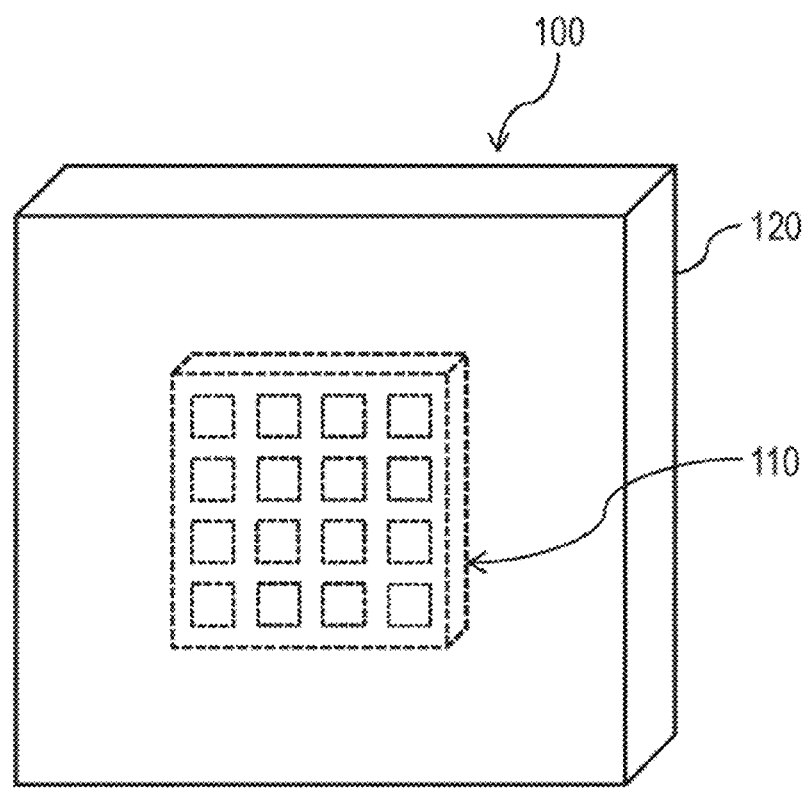
FIG. 4 is a perspective view of a reflection unit having a protection cover.

FIG. 4 shows an example of the reflection unit 100 according to the first embodiment. The reflection unit 100 shown in FIG. 4 includes one reflectarray reflector 110 and a protection cover 120 (housing) surrounding the reflectarray reflector 110. The protection cover 120 is a member that covers the reflectarray reflector 110 so as not to be exposed.

The reflection unit 100 according to the first embodiment is a passive element that merely reflects a radio wave, and does not have an active element (e.g., transmitter or receiver) for transmitting or receiving a radio wave. The reflection unit 100 according to the first embodiment reflects an incident wave that is incident from a first direction, into a second direction different from the first direction.

Figure 5:
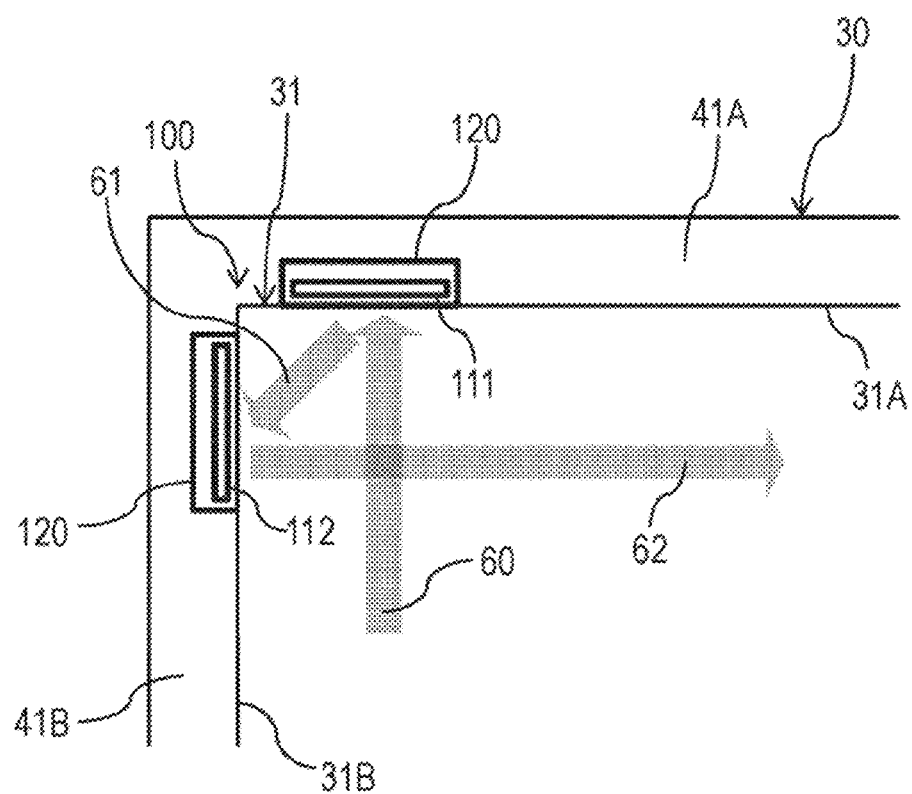
FIG. 5 is a plan view showing an installation example of the reflection unit.

FIG. 5 shows another example of the reflection unit 100 according to the first embodiment. As shown in FIG. 5, the reflection unit 100 according to the first embodiment is installed at a place where the direction of a wireless transmission path is to be changed. The place where the direction of a wireless transmission path is to be changed is, for example, a corner 31 where a first face 31A and a second face 31B are in contact with each other in the architecture 30.

The reflection unit 100 shown in FIG. 5 includes a first reflectarray reflector 111 and a second reflectarray reflector 112. The first reflectarray reflector 111 reflects an incident wave 60 that comes along the second face 31B, to form a reflected wave 61 toward the second reflectarray reflector 112. The second reflectarray reflector 112 reflects the reflected wave 61 to form a reflected wave 62 that advances along the first face 31A.

The first reflectarray reflector 111 is covered by the protection cover 120. The protection cover 120 housing the first reflectarray reflector 111 is embedded in a wall member 41A. The first reflectarray reflector 111 may be mounted to the wall member 41A together with the protection cover 120 after the wall member 41A has been assembled as the architecture 30. Alternatively, the first reflectarray reflector 111 may be mounted to the wall member 41A together with the protection cover 120 before the wall member 41A is assembled as the architecture 30.

The first reflectarray reflector 111 is installed in parallel with the first face 31A being a surface of the wall member 41A. Since the first reflectarray reflector 111 is embedded in the wall member 41A, the appearance of the wall member 41A is less likely to be impaired. Sine there is no or little protrusion of the protection cover 120 from the wall member 41A as well, the appearance of the wall member 41A is less likely to be impaired.

The second reflectarray reflector 112 is covered by the protection cover 120. In FIG. 5, the first reflectarray reflector 111 and the second reflectarray reflector 112 are respectively covered by separate protection covers 120, but may be covered by the same protection cover 120.

The protection cover 120 housing the second reflectarray reflector 112 is embedded in a wall member 41B. The second reflectarray reflector 112 may be mounted to the wall member 41B together with the protection cover 120 after the wall member 41B has been assembled as the architecture 30. Alternatively, the second reflectarray reflector 112 may be mounted to the wall member 41B together with the protection cover 120 before the wall member 41B is assembled as the architecture 30.

The second reflectarray reflector 112 is installed in parallel with the second face 31B being a surface of the wall member 41B. Since the second reflectarray reflector 112 is embedded in the wall member 41B, the appearance of the wall member 41B is less likely to be impaired. Since there is no or little protrusion of the protection cover 120 from the wall member 41B as well, the appearance of the wall member 41B is less likely to be impaired.

In the wireless transmission path in which the incident wave 60 is radiated in a direction (first direction) parallel to the second face 31B, the reflection unit 100 shown in FIG. 5 reflects the incident wave 60 into a direction (second direction) parallel to the first face 31A, to cause the reflected wave 62. The reflection unit 100 shown in FIG. 5 bends the wireless transmission path by 90 degrees at the corner 31, thereby forming a wireless transmission path along the wall member 41A, 41B.

As shown in FIG. 4, even in the case of the reflection unit 100 that has only one reflectarray reflector 110, it is possible to bend the wireless transmission path by 90 degrees at the corner 31. That is, the reflection unit 100 shown in FIG. 4 and the reflection unit 100 shown in FIG. 5 have a common function of bending the wireless transmission path by 90 degrees. However, as shown in FIG. 4, when a single reflectarray reflector 110 is used, it is difficult to install the reflectarray reflector 110 in parallel with the wall member 41A, 41B. Therefore, as shown in FIG. 5, it is advantageous to use a plurality of reflectarray reflectors 111, 112.

Figure 6:
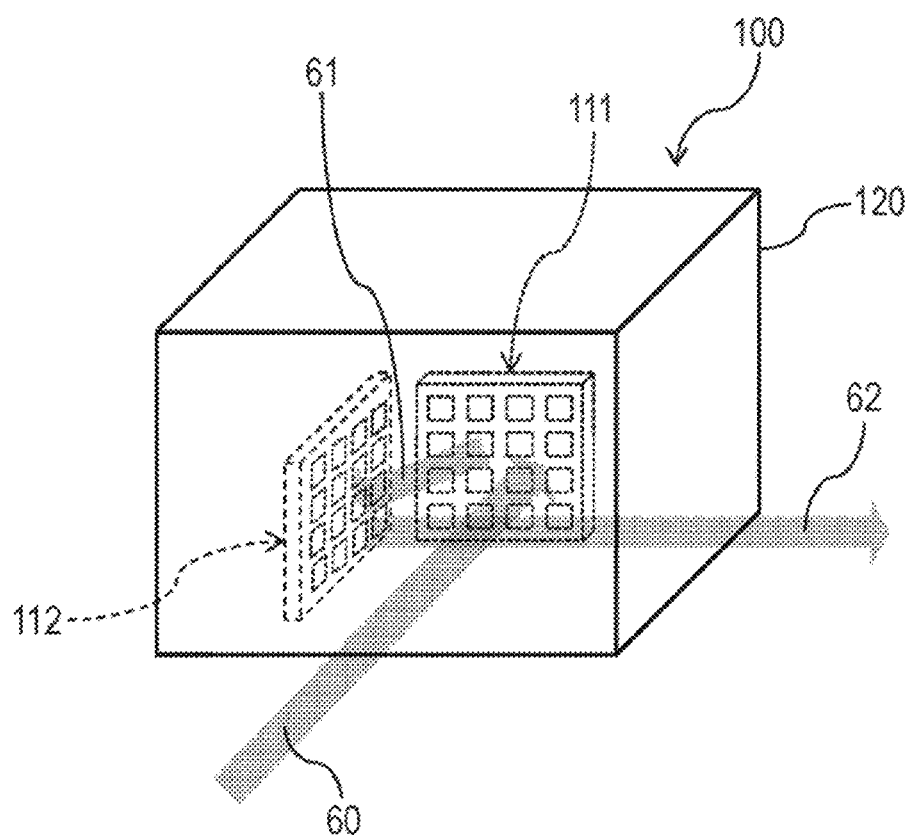
FIG. 6 is a perspective view of the reflection unit having a protection cover.

As shown in FIG. 6, the reflection unit 100 may include a plurality of reflectarray reflectors 111, 112 in a single protection cover 120.

In the first embodiment, it is preferable that the reflection unit 100 includes a plurality of reflectors 110 including at least one reflectarray reflector 110. The plurality of reflectors 110 may all be the reflectarray reflectors 110. The plurality of reflectors 110 may include one or more of the reflectarray reflectors 110A, 110B, 110C, and one or more of the metal reflectors 200A, 200B, 200C.

In the first embodiment, a single reflection unit 100 need not be implemented as a single united structure body as shown in FIG. 4 or FIG. 6, but may be implemented as a plurality of separate structure bodies as shown in FIG. 5. In the first embodiment, a single reflection unit 100 denotes a united unit that realizes a desired predetermined reflection angle at a place where the reflection unit 100 is installed. For example, in FIG. 5, the reflectarray reflectors 111, 112 are covered by separate protection covers 120, and thus, the reflection unit 100 shown in FIG. 5 is implemented as a plurality of separate structure bodies. Meanwhile, in FIG. 6, the reflectarray reflectors 111, 112 are covered by a common protection cover 120, and thus, the reflection unit 100 shown in FIG. 6 is implemented as a single multi-structure body. However, the reflection units 100 shown in FIG. 5 and FIG. 6 each realize a desired reflection angle of 90 degrees at the corner 31 having an angle of 90 degrees. Therefore, in each of FIG. 5 and FIG. 6, the number of the reflection units 100 is one.

Figure 7:
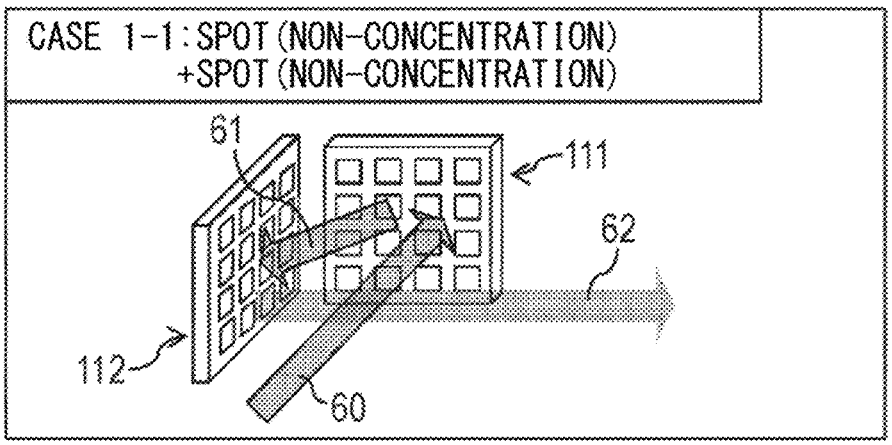
FIG. 7 describes variations of the reflection unit.
Figure 7:
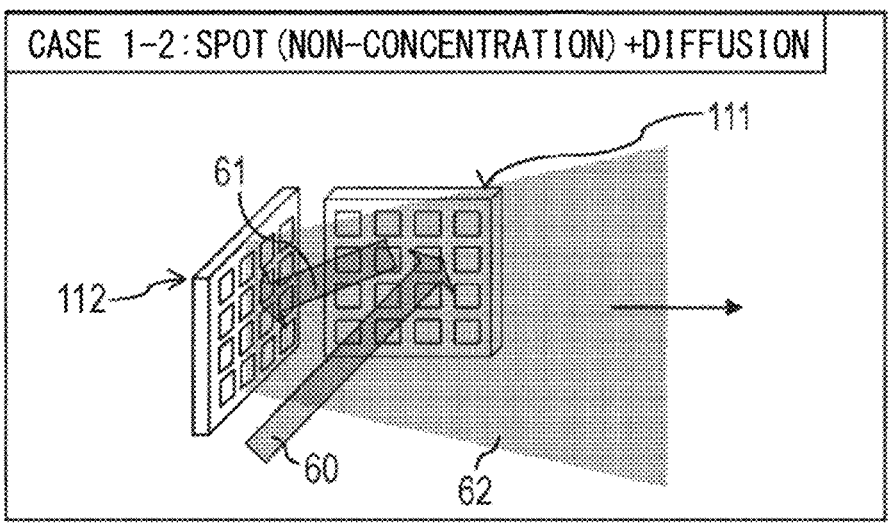
Figure 7:
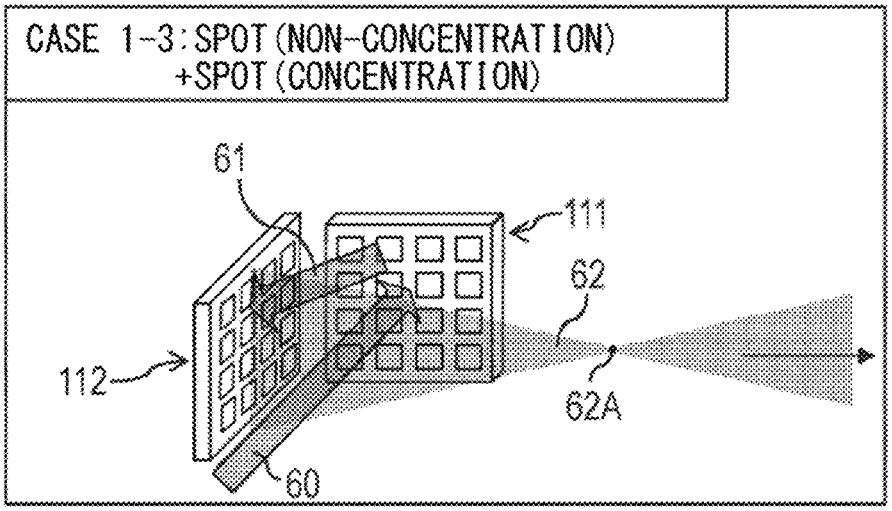
Figure 8:
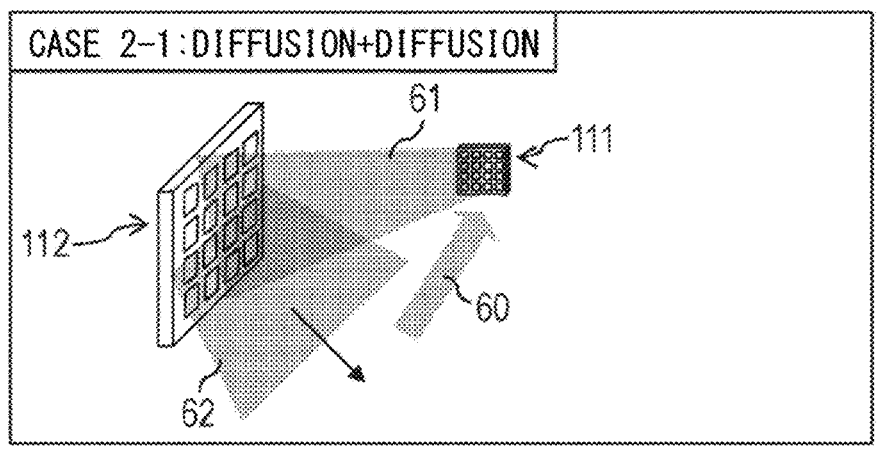
FIG. 8 describes variations of the reflection unit.
Figure 8:
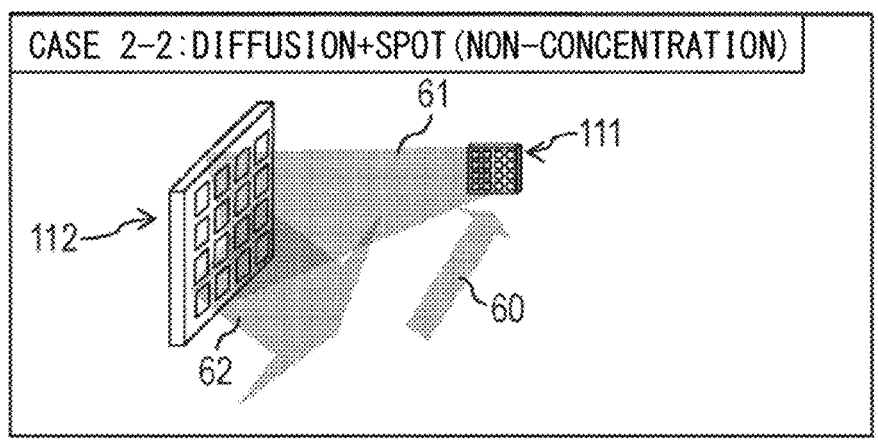
Figure 8:
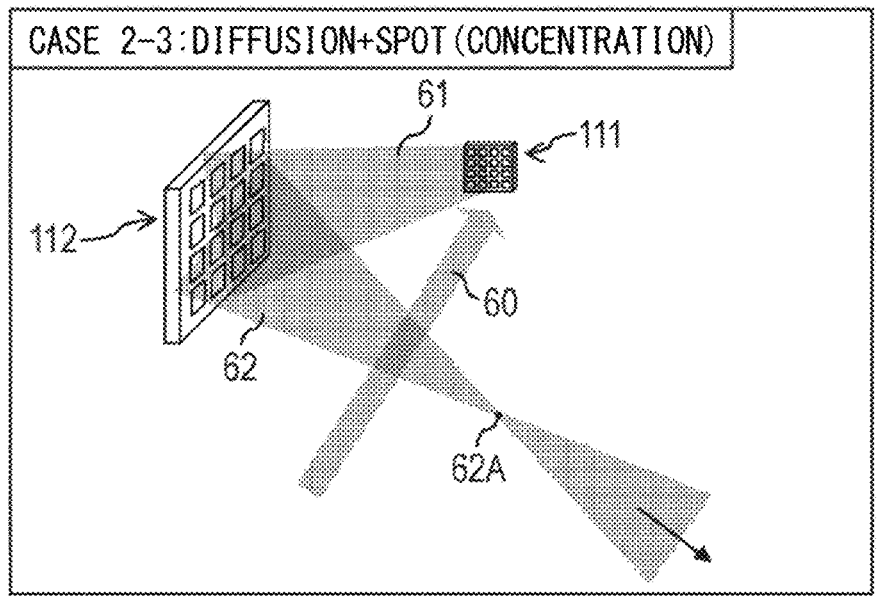
Figure 9:
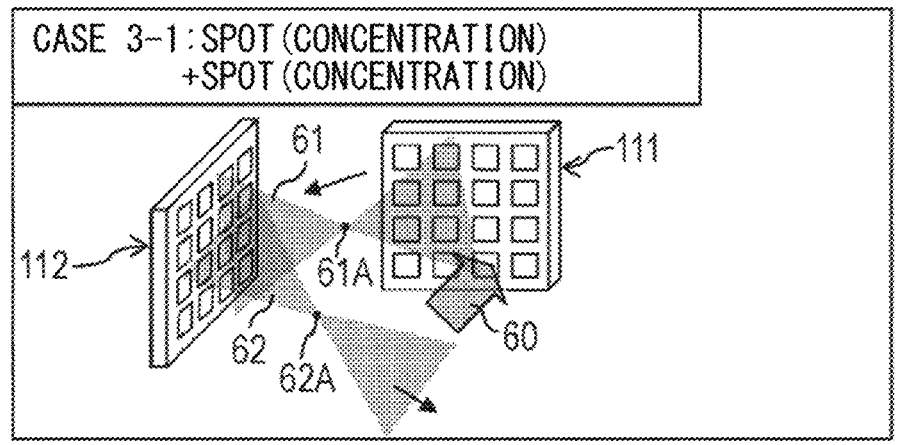
FIG. 9 describes variations of the reflection unit.
Figure 9:
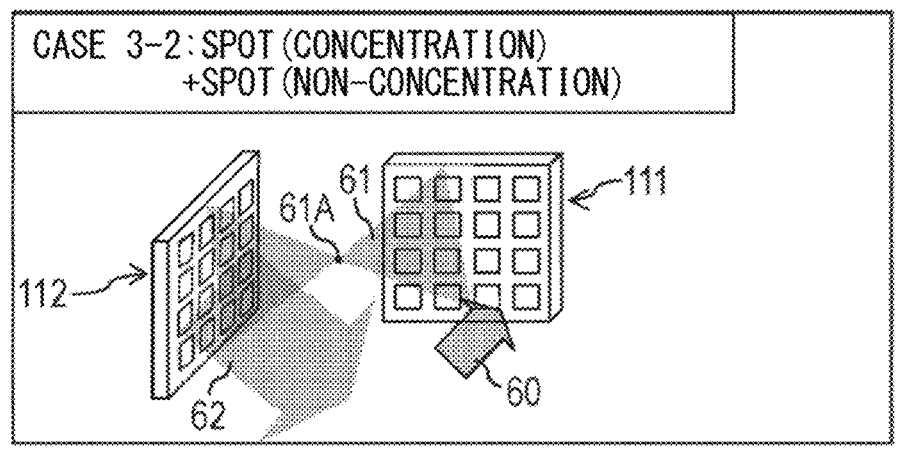
Figure 9:
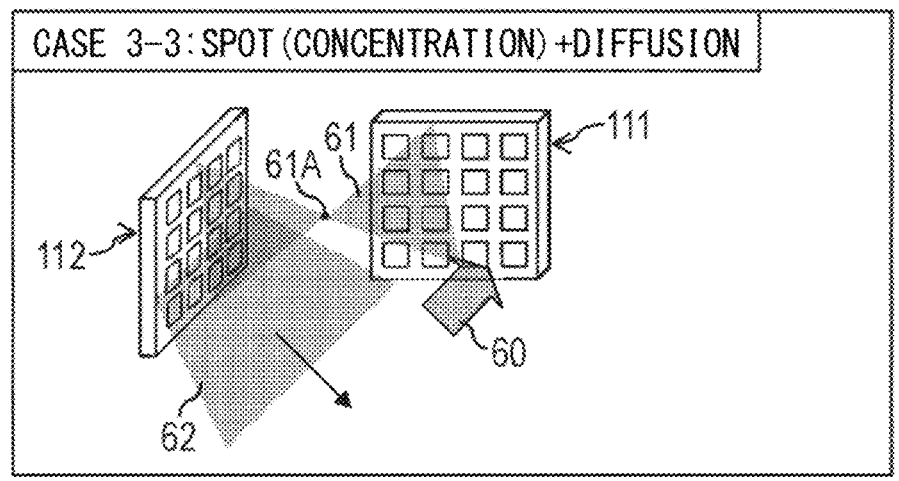

FIG. 7, FIG. 8, and FIG. 9 show variations of combination of the first reflectarray reflector 111 and the second reflectarray reflector. FIG. 7 shows CASES 1-1, 1-2, 1-3 in which the first reflectarray reflector 111 is the non-diffusion and non-concentration-type reflectarray reflector 110B which forms a non-concentration spot reflected wave. In CASE 1-1, the second reflectarray reflector 112 is also the non-diffusion and non-concentration-type reflectarray reflector 110B. In CASE 1-1, mainly, only conversion of the direction of the wireless transmission path is performed.

In CASE 1-2, the second reflectarray reflector 112 is the diffusion reflectarray reflector 110A. In CASE 1-2, in addition to conversion of the direction of the wireless transmission path, realization of a wide angle beam of a second reflected wave 62 is possible.

In CASE 1-3, the second reflectarray reflector 112 is the concentration-type reflectarray reflector 110C. In CASE 1-3, concentration of the second reflected wave 62 and realization of a wide angle beam of the second reflected wave 62 on the far side with respect to a focal point 62A are possible.

FIG. 8 shows CASES 2-1, 2-2, 2-3 in which the first reflectarray reflector 111 is the diffusion reflectarray reflector 110A which forms a diffuse reflected wave. In CASE 2-1, the second reflectarray reflector 112 is also the diffusion reflectarray reflector 110A. In CASE 2-1, the first reflectarray reflector 111 can be downsized. Even when the first reflectarray reflector 111 is downsized, the first reflected wave 61 is diffused to be a wide angle beam. In addition, the second reflectarray reflector 112 further performs diffuse reflection, and thus, a wider angle beam is realized In CASE 2-2, the second reflectarray reflector 112 is the non-diffusion and non-concentration-type reflectarray reflector 110B. In CASE 2-2 as well, the first reflectarray reflector 111 can be downsized.

In CASE 2-3, the second reflectarray reflector 112 is the concentration-type reflectarray reflector 110C. In CASE 2-3 as well, the first reflectarray reflector 111 can be downsized. In addition, in CASE 2-3, concentration of the second reflected wave 62 and realization of a wide angle beam of the second reflected wave 62 on the far side with respect to the focal point 62A are possible.

FIG. 9 shows CASES 3-1, 3-2, 3-3 in which the first reflectarray reflector 111 is the concentration-type reflectarray reflector 110C which forms a concentrated reflected wave. In CASE 3-1, the second reflectarray reflector 112 is also the concentration-type reflectarray reflector 110C. In CASE 3-1, the first reflected wave 61 is concentrated at a focal point 61A, and the second reflected wave 62 is concentrated at the focal point 62A.

In CASE 3-2, the second reflectarray reflector 112 is the non-diffusion and non-concentration-type reflectarray reflector 110B. In CASE 3-2, the first reflected wave 61 is concentrated at the focal point 61A.

In CASE 3-3, the second reflectarray reflector 112 is the diffusion reflectarray reflector 110A. In CASE 3-3, the first reflected wave 61 is concentrated at the focal point 61A. Realization of a wide angle beam of the second reflected wave 62 is possible.

In CASES 3-1, 3-2, 3-3 shown in FIG. 9, the focal point 61A of the first reflected wave 61 is present between the first reflectarray reflector 111 and the second reflectarray reflector 112. However, the position of each focal point 61A shown in FIG. 9 is not limited to a position between the first reflectarray reflector 111 and the second reflectarray reflector 112, and may be a position shown in one of CASES 4-1, 4-2, 4-3 shown in FIG. 10.

Figure 10:
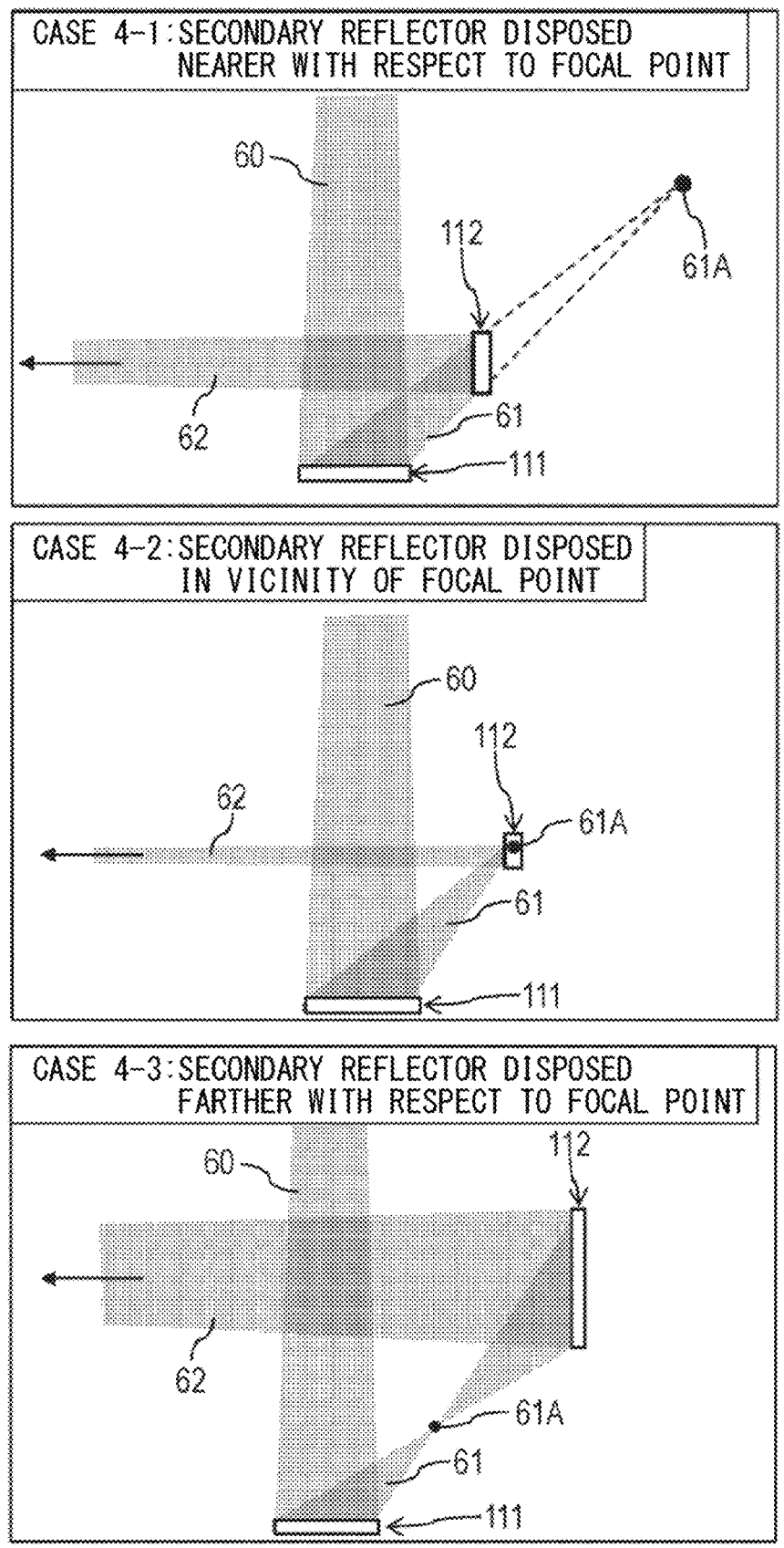
FIG. 10 describes variations of the reflection unit.

In CASE 4-1 shown in FIG. 10, the focal point 61A is present farther with respect to the second reflectarray reflector 112, when viewed from the first reflectarray reflector 111. That is, the second reflectarray reflector 112 is present between the first reflectarray reflector 111 and the focal point 61A. In CASE 4-1, the second reflectarray reflector 112 only needs to reflect the first reflected wave 61 having been caused to have a narrow angle, and thus, the second reflectarray reflector 112 can be downsized. In CASE 4-1, the electric field intensity of the first reflected wave 61 reflected by the second reflectarray reflector 112 can be increased.

In CASE 4-2, the focal point 61A is present on the second reflectarray reflector 112 or in the vicinity of the second reflectarray reflector 112. In CASE 4-2, the second reflectarray reflector 112 only needs to reflect the first reflected wave 61 concentrated at the focal point 61A, and thus, the second reflectarray reflector 112 can be downsized to a great extent. In CASE 4-2, the electric field intensity of the first reflected wave 61 reflected by the second reflectarray reflector 112 can be increased to a great extent.

In CASE 4-3, the focal point 61A is present between the first reflectarray reflector 111 and the second reflectarray reflector 112. That is, the second reflectarray reflector 112 is present farther with respect to the focal point 61A, when viewed from the first reflectarray reflector 111. In CASE 4-3, the beam can be concentrated between the first reflectarray reflector 111 and the second reflectarray reflector 112. Accordingly, in a space (e.g., an opening formed in a wall or a ceiling) having a small diameter and present between the first reflectarray reflector 111 and the second reflectarray reflector 112, the reflected wave 61 can be efficiently transmitted. In addition, the reflected wave 61 can be transmitted so as to avoid an obstacle present between the first reflectarray reflector 111 and the second reflectarray reflector 112.

Figure 11:
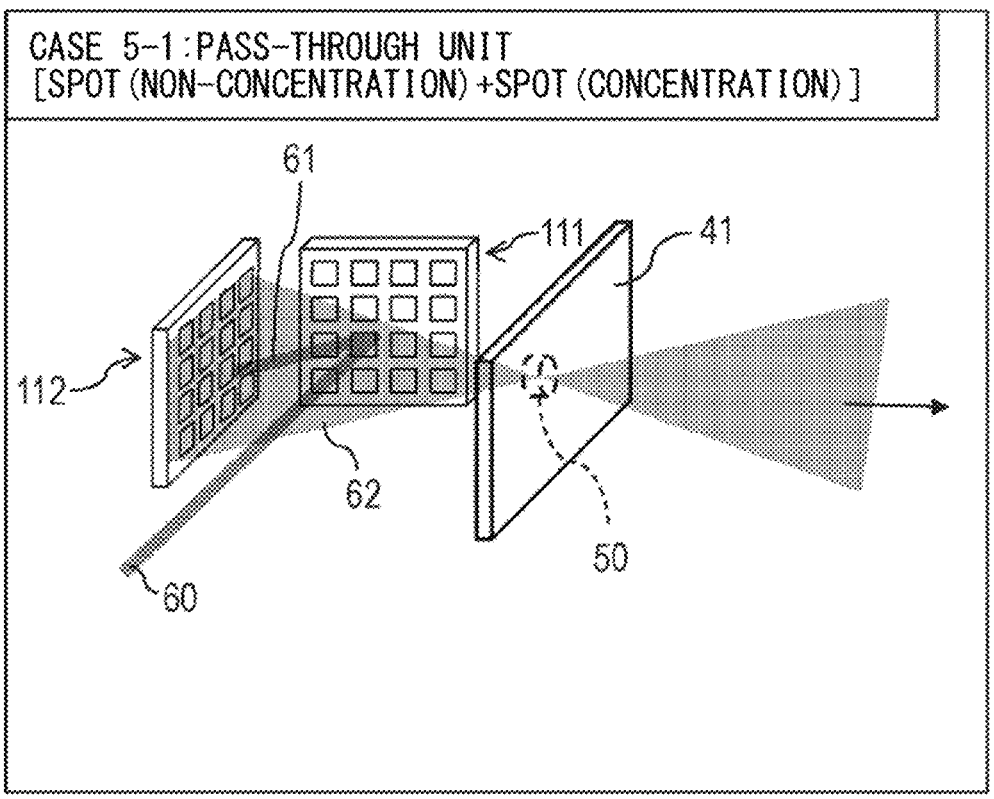
FIG. 11 describes variations of the reflection unit.
Figure 11:
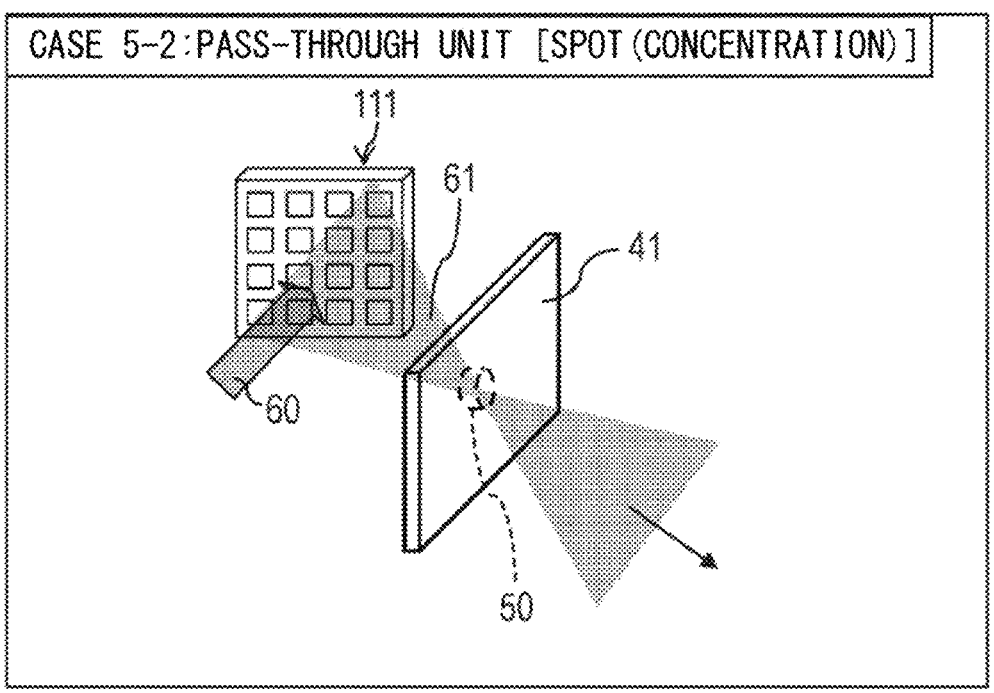

FIG. 11 shows CASES 5-1, 5-2 which are examples in which the reflection unit 100 is used as a pass-through unit for causing a radio wave to pass through an opening 50 having a small diameter and formed in the wall member 41. CASE 5-1 corresponds to an example in which the second reflected wave 62 in CASE 1-3, CASE 2-3, and CASE 3-1 passes through the opening 50, for example. Since the second reflected wave 62 is concentrated at the focal point 62A to have a small diameter, the second reflected wave 62 can pass through the opening 50 that is small and formed in a construction member such as the wall member 41. The second reflected wave 62, at the position of the opening 50, is caused to have a smaller diameter than that of the opening 50. Therefore, inhibition of passing-through of the second reflected wave 62 by a construction member such as the wall member 41 is suppressed, and the second reflected wave 62 can efficiently pass through the construction member at the position of the opening 50.

CASE 5-2 corresponds to an example in which the first reflected wave 61 in CASE 3-1 or CASE 4-3 passes through the opening 50, for example. CASE 5-2 may be regarded as an example in which the reflected wave of the reflectarray reflector 110 shown in FIG. 4 passes through the opening 50.

Figure 13:
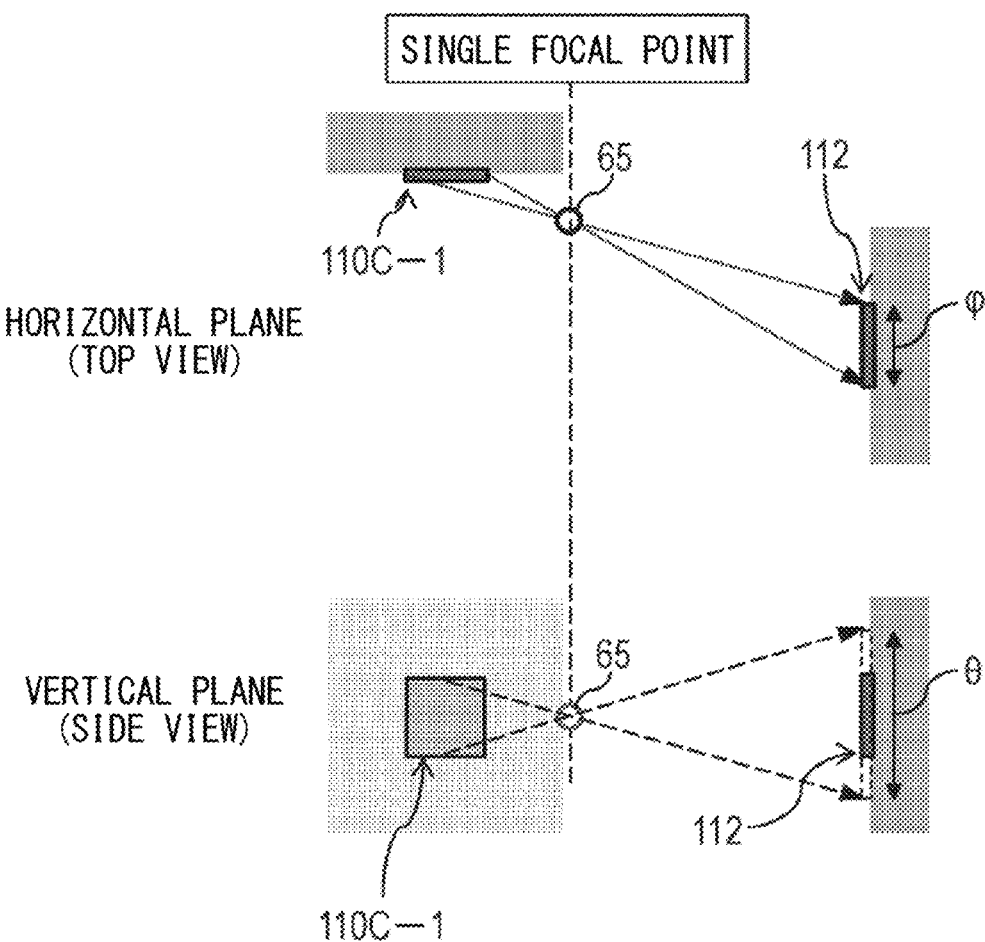
FIG. 13 describes the single-focal point reflectarray reflector.
Figure 14:
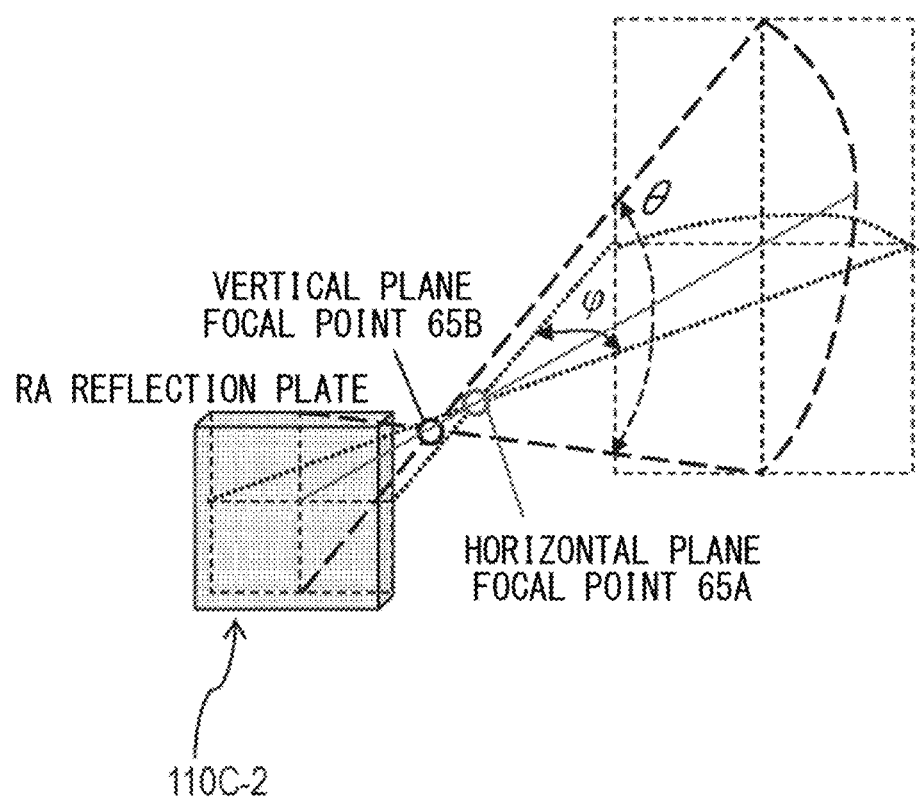
FIG. 14 describes a multi-focal point reflectarray reflector.
Figure 15:
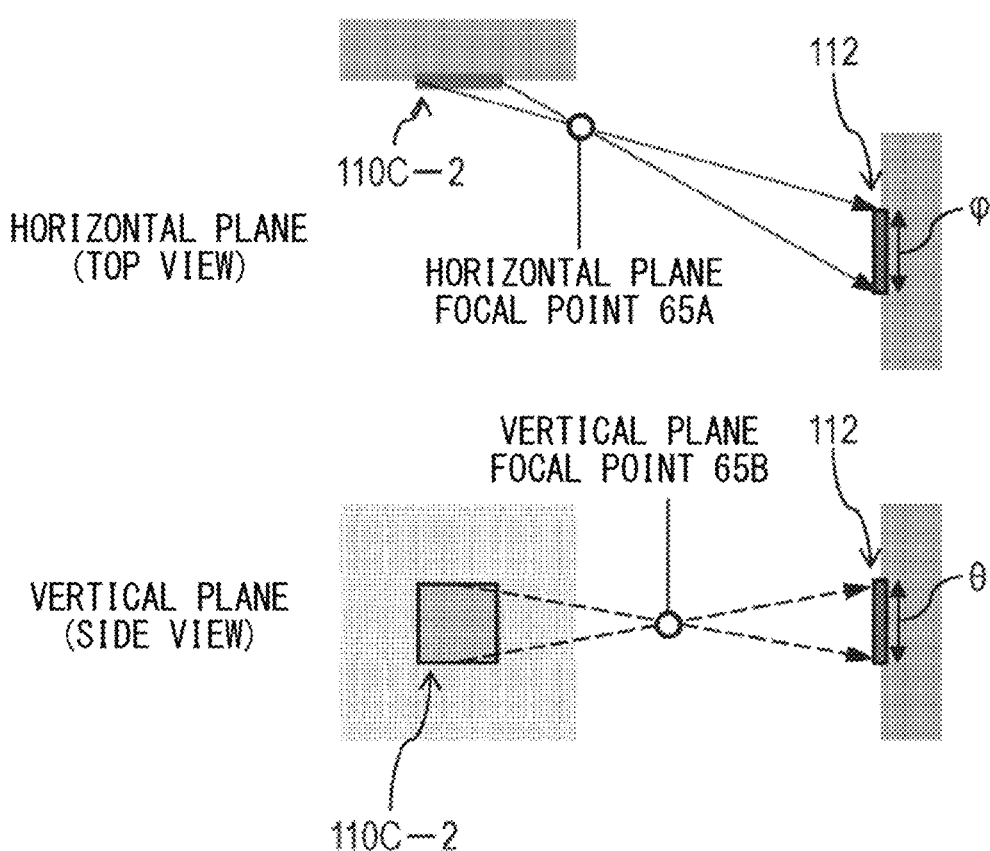
FIG. 15 describes the multi-focal point reflectarray reflector.

The concentration-type reflectarray reflector 110C (or the diffusion reflectarray reflector 110A) described above may be a single-focal point reflectarray reflector 110C-1 (see FIG. 12 and FIG. 13), or may be a multi-focal point reflectarray reflector 110C-2 (see FIG. 14 and FIG. 15).

The single-focal point reflectarray reflector 110C-1 is configured such that only one focal point of a reflected wave is present. Meanwhile, the multi-focal point reflectarray reflector 110C-2 is configured such that a plurality of focal points are present.

Figure 12:
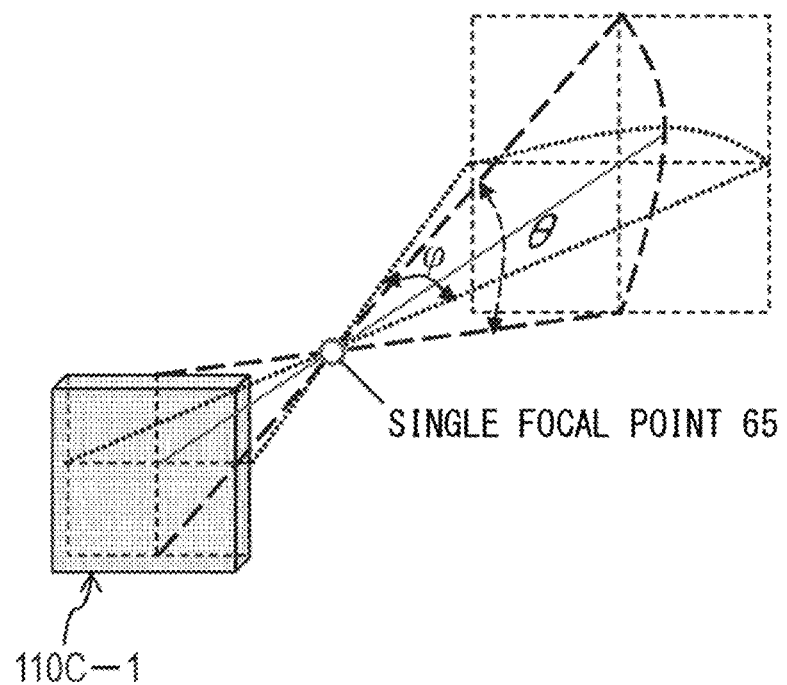
FIG. 12 describes a single-focal point reflectarray reflector.

FIG. 12 shows the spread of a reflected wave on the far side with respect to a focal point 65, in the case of the single-focal point reflectarray reflector 110C-1. In this case, the relationship between a spread $\phi$ of a reflected wave in a horizontal plane (first radiation plane) included in the radiation range of the reflected wave and a spread $\theta$ of the reflected wave in a vertical plane (second radiation plane) is restricted by the aspect ratio of the single-focal point reflectarray reflector 110C-1. Therefore, the size or aspect ratio of the second reflectarray reflector 112 which further reflects the reflected wave caused by the single-focal point reflectarray reflector 110C-1 needs to be changed according to the disposition thereof.

For example, as shown in FIG. 13, there is a case where, although the size (horizontal dimension) of the second reflectarray reflector 112 matches the spread φ of the reflected wave in a horizontal plane, the size (vertical dimension) of the second reflectarray reflector 112 is smaller than the spread θ of the reflected wave in a vertical plane. In this case, the second reflectarray reflector 112 cannot receive all of the reflected wave, and thus, the transmission efficiency is reduced. Therefore, for efficient transmission, the vertical dimension of the second reflectarray reflector 112 needs to be changed according to the disposition of the second reflectarray reflector 112, which is uneconomical.

Meanwhile, as shown in FIG. 14, in the case of the multi-focal point reflectarray reflector 110C-2, a first focal point 65A in a horizontal plane (first radiation plane) included in the radiation range of a reflected wave and a second focal point 65B in a vertical plane (second radiation plane) included in the radiation range of the reflected wave are present at different positions. It should be noted that the horizontal plane (first radiation plane) is a plane that includes a horizontal line. The horizontal line here is a horizontal line that passes through the center of the front face of the multi-focal point reflectarray reflector 110C-2 and that extends along the front face thereof. The vertical plane (second radiation plane) is a plane that includes a vertical line and that is orthogonal to the horizontal plane (first radiation plane). The vertical line here is a vertical line that passes through the center of the front face of the multi-focal point reflectarray reflector 110C-2.

Since the first focal point 65A in the horizontal plane and the second focal point 65B in the vertical plane are separated from each other, the spreads (0, 0) of the reflected wave can be arbitrarily formed irrespective of the aspect ratio of the multi-focal point reflectarray reflector 110C-2. For example, as shown in FIG. 15, the first focal point 65A at the horizontal plane can be set to be present at a position closer to the multi-focal point reflectarray reflector 110C-2, and the second focal point 65B in the vertical plane can be set to be shifted to a position closer to the second reflectarray reflector 112. As a result, appropriate spreads of the reflected wave can be controlled according to the aspect ratio and disposition of the second reflectarray reflector 112, which is economical.

The phase change amount of the reflection elements 132 for separating the first focal point 65A in a horizontal plane and the second focal point 65B in a vertical plane may be obtained as follows. That is, a first phase change amount of the reflection elements 132 in the horizontal plane at which the first focal point 65A is set and a second phase change amount of the reflection elements 132 in the vertical plane at which the second focal point 65B is set are obtained. Then, when the first phase change amount and the second phase change amount are added together, a phase change amount of the reflection elements 132 necessary for designing the multi-focal point reflectarray reflector 110C-2 is obtained. In the case of a metal reflection surface as well, it is possible to form a curved surface (e.g., a surface of a paraboloid body of revolution in which focal lengths are different between a horizontal cross section and a vertical cross section) in which the first focal point 65A in a horizontal plane and the second focal point 65B in a vertical plane are present at different positions.

Hereinafter, based on a specific installation example, advantages of the reflection unit 100 according to the first embodiment will be described.

Figure 16:
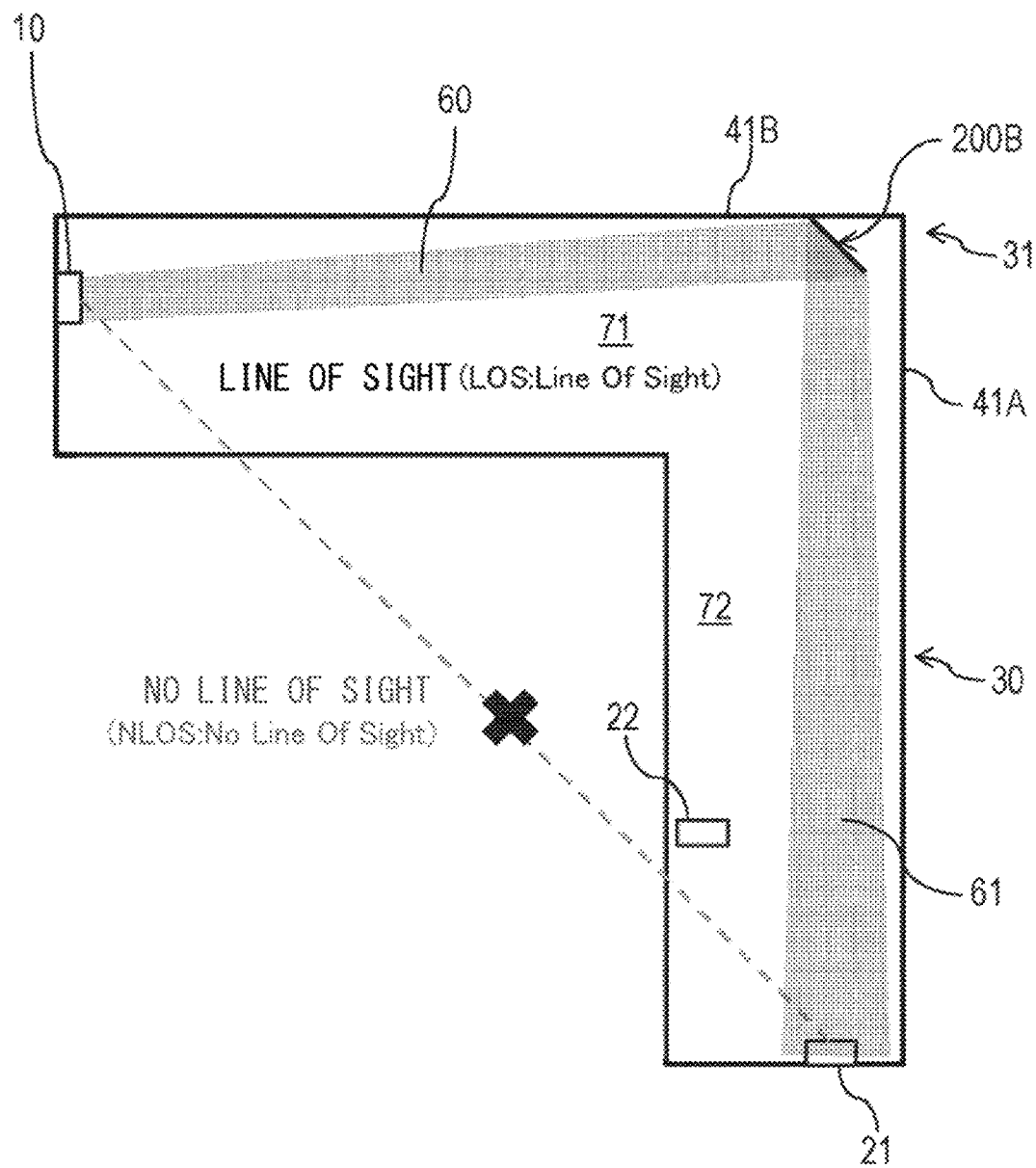
FIG. 16 is a plan view showing an installation example of a plane metal reflection plate.

FIG. 16 shows, as a reference example, a wireless transmission system that has the plane metal plate 200B as a reflector. In FIG. 16, a wireless transmission system is constructed in the architecture 30 in which a first area 71 and a second area 72 are orthogonal to each other to form an L-shaped internal space as a whole. The wireless transmission system includes the base station 10 and user equipment 21, 22. The base station 10 is installed in the first area 71. The user equipment 21, 22 is present in the second area 72 and thus is present in No Line of Sight (NLOS), when viewed from the base station 10. In FIG. 16, the plane metal plate 200B is installed at the corner 31 where the wall member 41A facing the second area 72 and the wall member 41B facing the first area 71 are in contact with each other. The plane metal plate 200B bends, by about 90 degrees, the incident wave 60 advancing straight in the first area 71 along the wall member 41B, to form the reflected wave 61 advancing straight in the second area 72 along the wall member 41A.

Since the plane metal plate 200B is provided, even if the straight-line propagation properties of a radio wave radiated from the base station 10 are high, the radio wave can be caused to reach the user equipment 21 in No Line of Sight. However, in the case of FIG. 16, since the radio wave has a narrow beam characteristic, the radio wave does not reach the user equipment 22 present in the second area 72.

Figure 17:
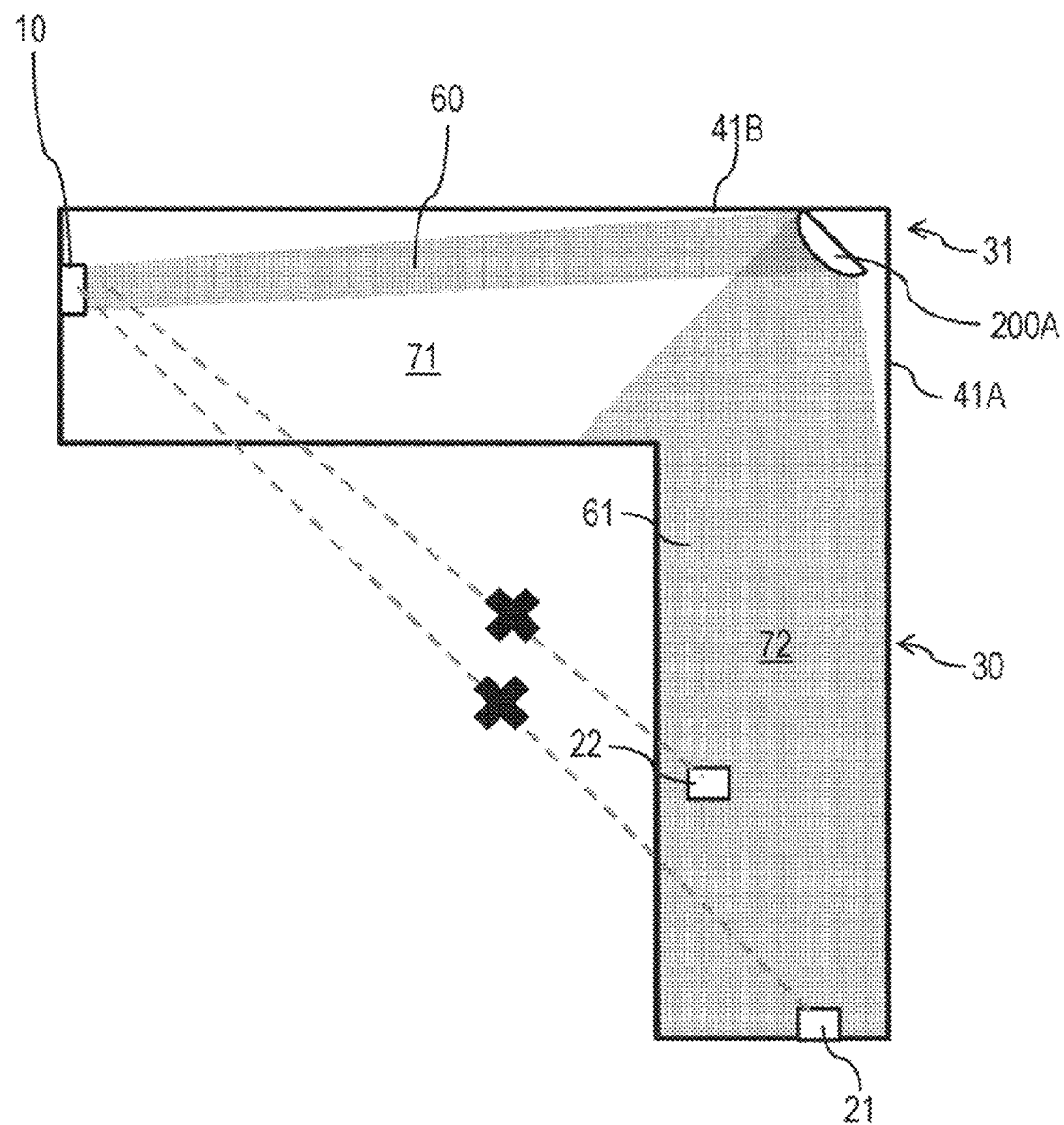
FIG. 17 is a plan view showing an installation example of a convex curved surface metal reflection plate.

FIG. 17 shows an example in which the convex curved surface metal plate 200A is installed at the corner 31, instead of the plane metal plate 200B in FIG. 16. In the example in FIG. 17, since the convex curved surface metal plate 200A realizes a wide angle beam of a radio wave, the radio wave can be radiated to the entirety of the second area 72.

In the examples in FIG. 16 and FIG. 17, it is necessary to install the metal plates 200A, 200B in a state of protruding from the wall members 41, 41B, and thus, the appearance is likely to be impaired.

Therefore, using the reflectarray reflector 110 as a reflector, instead of the metal plate, is conceivable. The reflectarray reflector 110 has a flat plate shape and can be designed so as to direct a reflected wave into a desired direction. For example, it is conceivable to mount the reflectarray reflector 110 to the wall member 41B, in the vicinity of the corner 31 as in FIG. 18, or to mount the reflectarray reflector 110 to the wall member 41A, in the vicinity of the corner 31 as in FIG. 19. In the case of the installation form as in FIG. 18 or FIG. 19, the reflectarray reflector 110 is in parallel with the wall member 41A, 41B and the protruding amount from the wall member 41, 41B is small. Thus, the appearance is less likely to be impaired.

Figure 18:
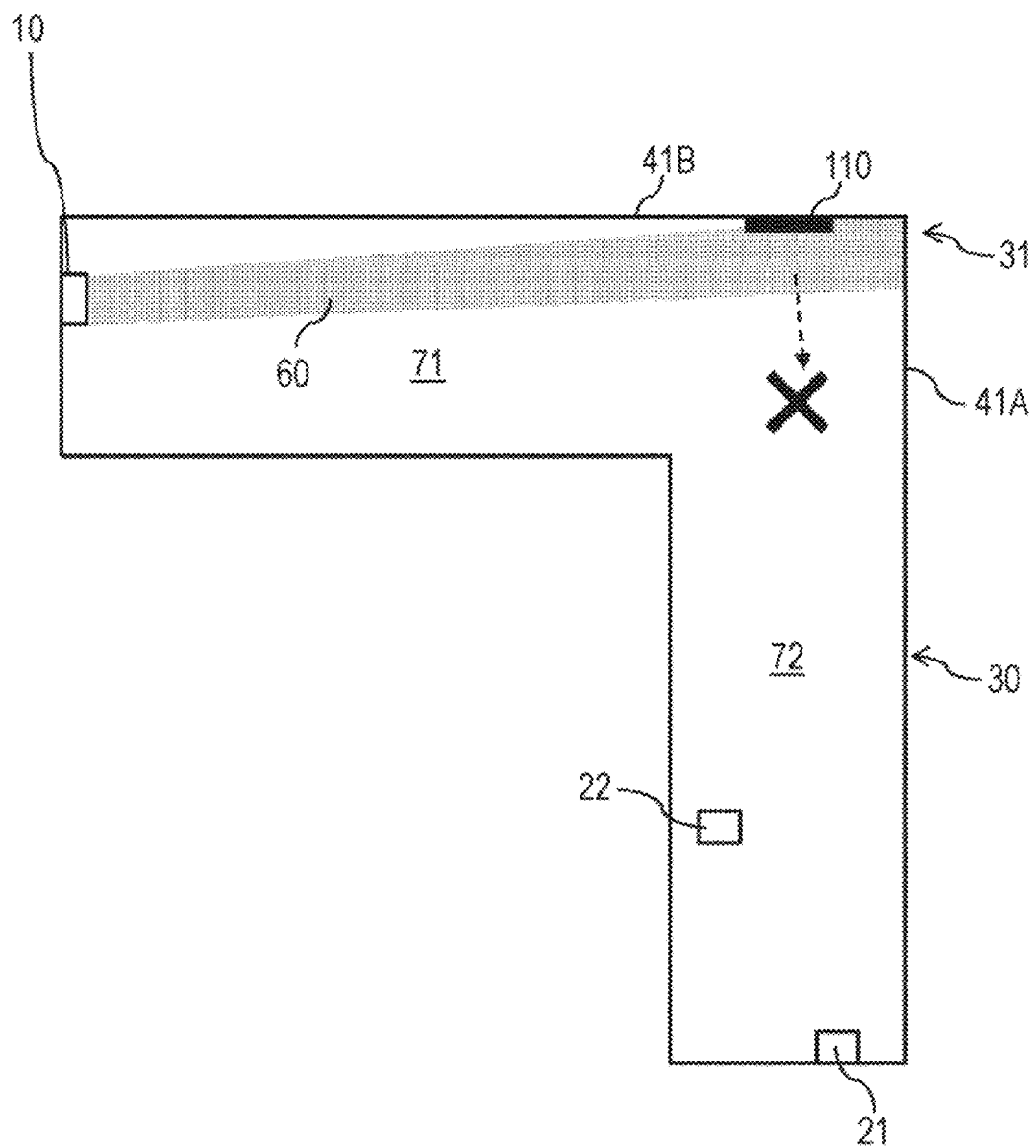
FIG. 18 is a plan view showing an installation example of a reflectarray reflector.
Figure 19:
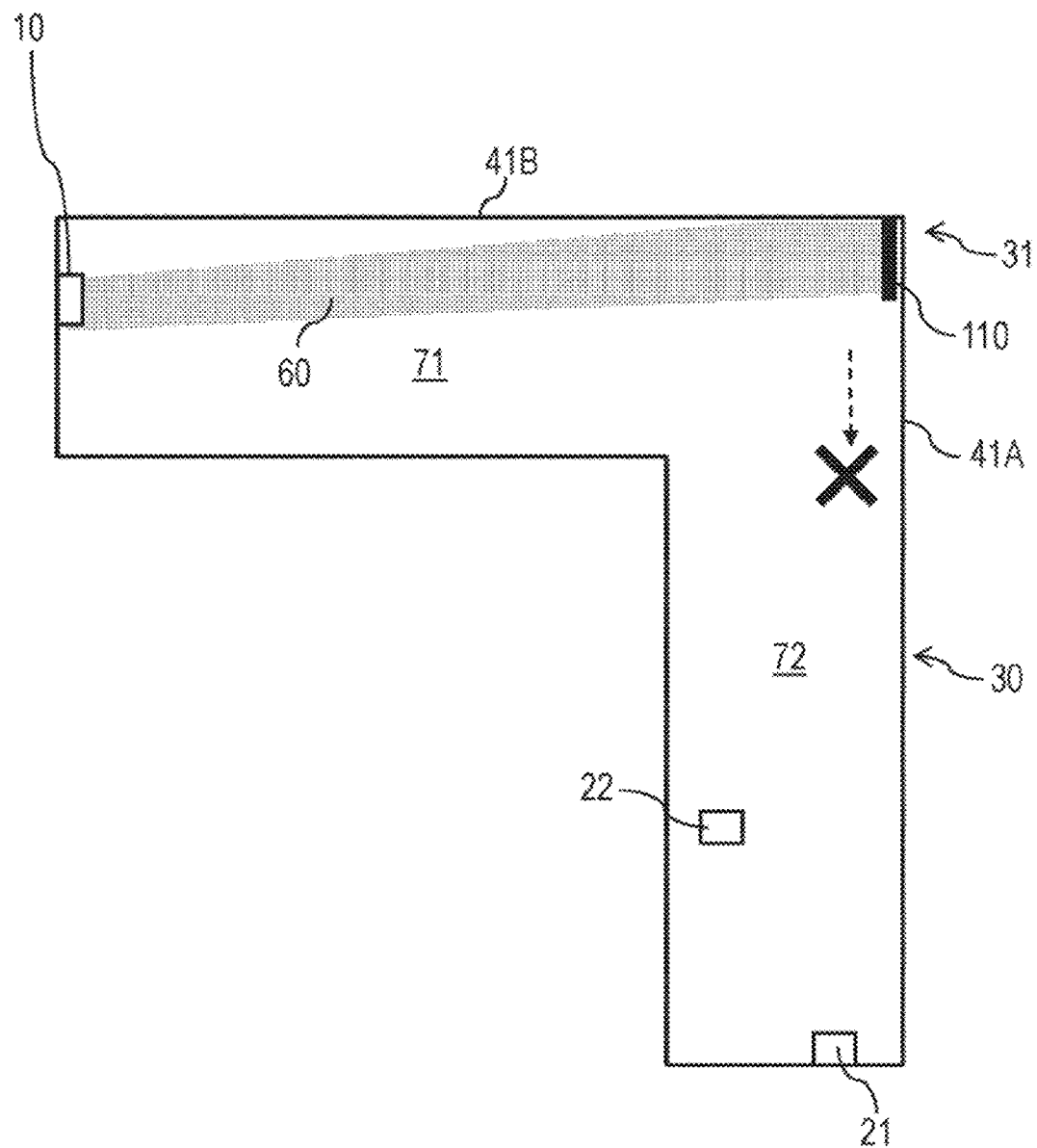
FIG. 19 is a plan view showing an installation example of a reflectarray reflector.

However, even when the reflectarray reflector 110 can direct a reflected wave into a desired direction, if the incident wave comes from directly beside the reflectarray reflector 110, it is difficult to form a reflected wave. Therefore, the installation form in FIG. 18 is not realistic. Also, it is difficult for the reflectarray reflector 110 to radiate a reflected wave directly beside thereof. Therefore, the installation form in FIG. 19 is not realistic, either.

Figure 20:
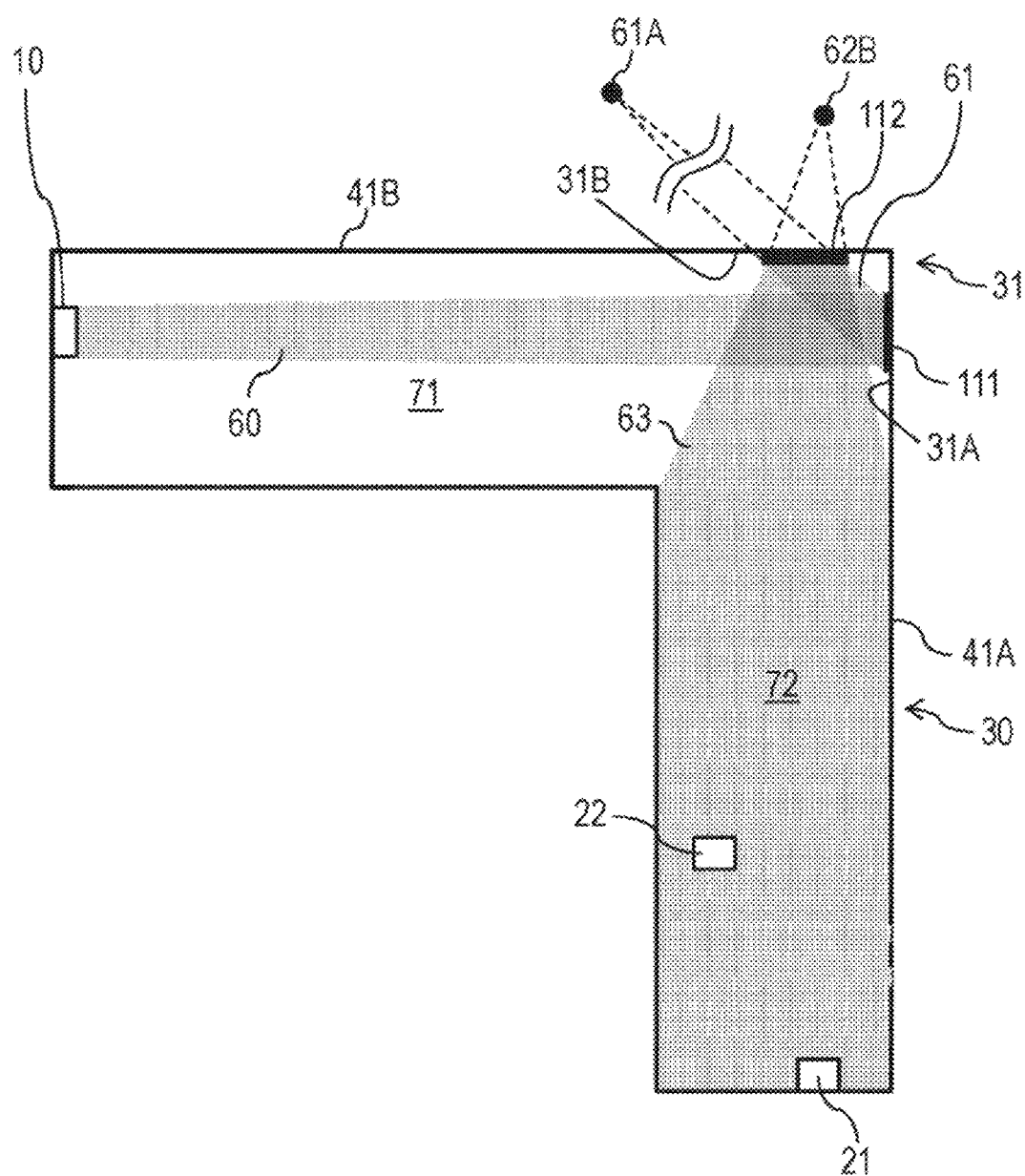
FIG. 20 is a plan view showing an installation example of reflectarray reflectors.

Meanwhile, as shown in FIG. 20, the reflection unit 100 according to the present embodiment using a plurality of reflectarray reflectors 110 can appropriately reflect the incident wave 60 from the first area 71, into the second area 72. In FIG. 20, the first reflectarray reflector 111 is mounted to the first face 31A of the wall member 41A opposed to the base station 10. The second reflectarray reflector 112 is mounted to the second face 31B of the wall member 41B opposed to the user equipment 21, 22. The first reflectarray reflector 111 and the second reflectarray reflector 112 are installed at the corner 31 where the first face 31A and the second face 31B are in contact with each other. Features not described in particular in FIG. 20 are the same as those in FIG. 16 to FIG. 19.

The first reflectarray reflector 111 receives the incident wave 60 from a substantially front direction, and forms the first reflected wave 61 toward the second reflectarray reflector 112 which is present diagonally in front (not directly beside). The first reflectarray reflector 111 is, for example, the concentration-type reflectarray reflector 110C configured such that the focal point of the first reflected wave 61 is present farther with respect to the second reflectarray reflector 112. Therefore, the second reflectarray reflector 112 may be small. The electric field intensity of the radio wave received by the second reflectarray reflector 112 is increased.

The second reflectarray reflector 112 receives the first reflected wave 61 from diagonally front and radiates the second reflected wave 62 into a substantially front direction. The second reflectarray reflector 112 is, for example, the diffusion reflectarray reflector 110A configured such that the focal point of the second reflected wave 62 is behind the second reflectarray reflector 112. Therefore, the second reflected wave 62 is caused to be a wide angle beam and reaches the entirety of the second area 72.

In addition, in the case of the installation form as in FIG. 20, the appearance is better than that in the installation form in FIG. 16 or FIG. 17.

Figure 21:
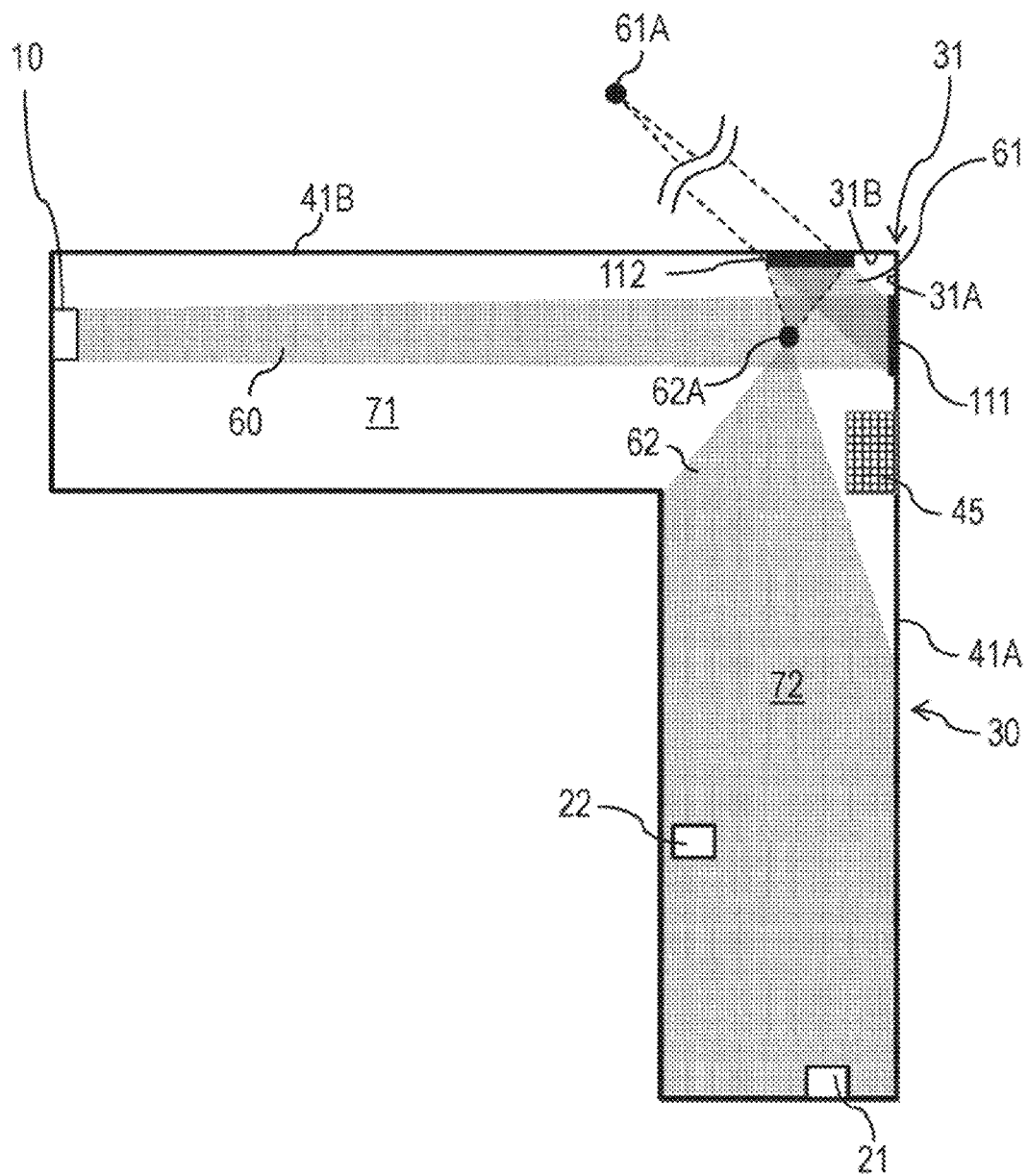
FIG. 21 is a plan view showing an installation example of reflectarray reflectors.

In the example in FIG. 21, as the second reflectarray reflector 112 in FIG. 20, the concentration-type reflectarray reflector 110C is used instead of the diffusion reflectarray reflector 110A. Features not described in particular in FIG. 21 are the same as those in FIG. 20.

The second reflectarray reflector 112 in FIG. 21 forms the second reflected wave 62 of which the focal point 62A is present in the vicinity of an obstacle 45. The obstacle 45 is, for example, a locker or another object installed so as to be in contact with the wall member 41.

When the second reflectarray reflector 112 is the diffusion reflectarray reflector 110A as in FIG. 20, if the obstacle 45 as in FIG. 21 is present, the range that the radio wave does not reach due to the obstacle 45 is increased. In contrast to this, in the case of FIG. 21, the second reflectarray reflector 112 can narrow the second reflected wave 62 at the focal point 62A in the vicinity of the obstacle 45, and thus, the beam can be propagated while the obstacle 45 is avoided. In addition, since the second reflected wave 62 is diffused on the far side with respect to the focal point 62A, the second reflected wave 62 reaches substantially all of the second area 72.

Figure 22:
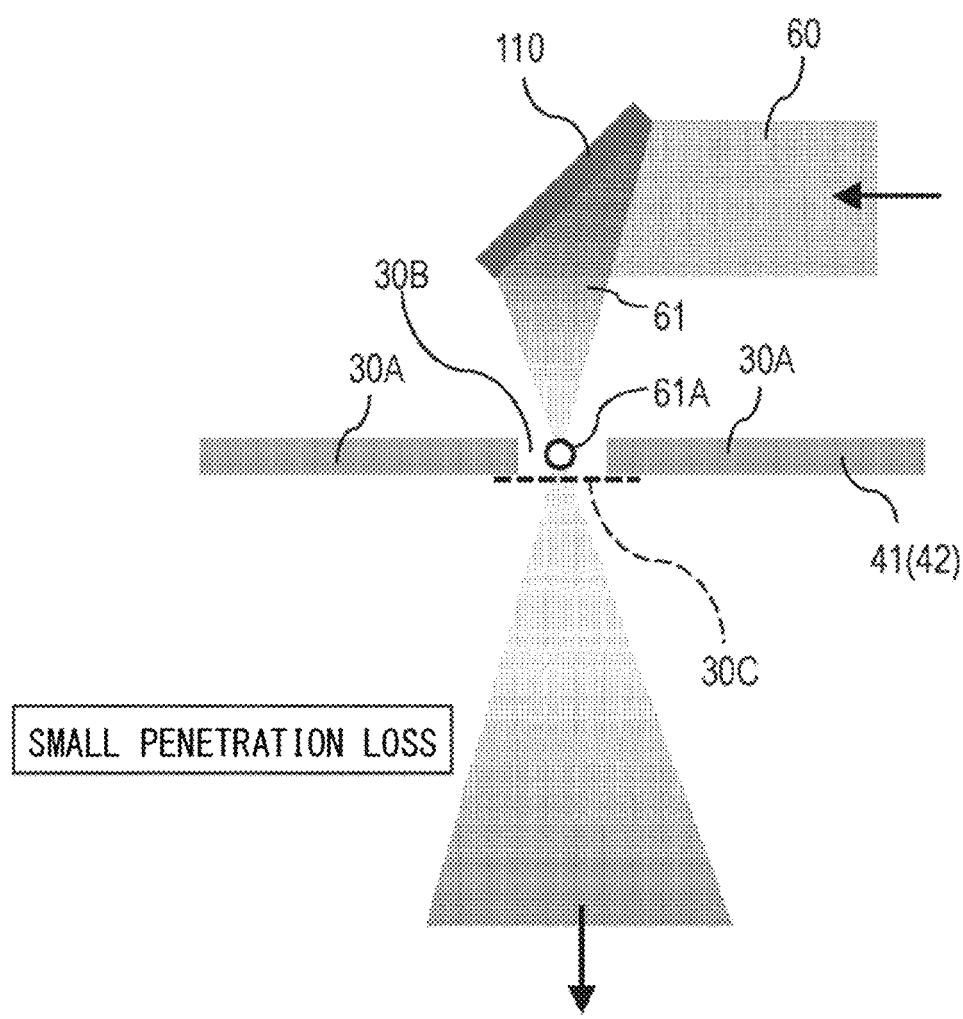
FIG. 22 is a cross-sectional view showing an installation example of a reflectarray reflector.

FIG. 22 shows an example in which an opening 30B having a small diameter is formed in a construction member such as the wall member 41 or the ceiling member 42, to transmit a radio wave with a small penetration loss. FIG. 22 corresponds to CASE 5-2 shown in FIG. 11.

Figure 23:
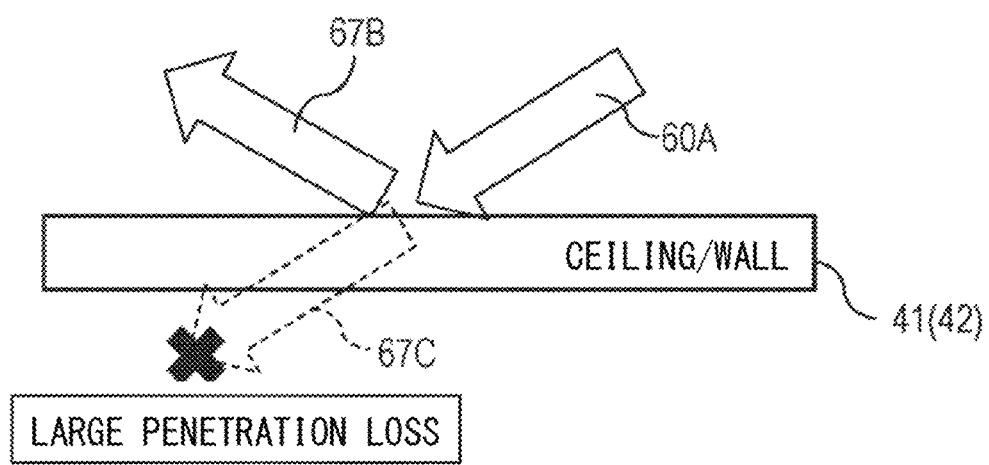
FIG. 23 indicates that penetration loss of a radio wave at a ceiling or wall is large.

As shown in FIG. 23, it is difficult for a radio wave 60A having a high frequency such as a millimeter wave to penetrate a construction member such as the wall member 41 or the ceiling member 42. That is, when the radio wave 60A hits a construction member such as the wall member 41 or the ceiling member 42, most of the radio wave 60A becomes a reflected wave 67B, and a penetrating wave 67C is very little. Therefore, it is difficult to transmit the radio wave 60A to another space partitioned by a construction member such as the wall member 41 or the ceiling member 42.

Therefore, the opening 30B having a small diameter is formed in a construction member such as the wall member 41 or the ceiling member 42. The opening 30B allows a radio wave having a high frequency such as a millimeter wave, to pass therethrough with a small loss. That is, in a construction member such as the wall member 41 or the ceiling member 42, the portion where the opening 30B is not formed is a first portion where the penetration loss is large, and the portion where the opening 30B is formed is a second portion where the penetration loss is small. The radio wave is more easily propagated through a second portion 30B than through a first portion 30A. When the reflectarray reflector 110 is of a concentration type, the reflected wave 61 is caused to have a smaller diameter than that of the second portion 30B, at the position of the second portion 30B being an opening. Therefore, inhibition of passing-through of the reflected wave 61 by a construction member such as the wall member 41 or the ceiling member 42 is suppressed. As a result, penetration loss is reduced.

Here, when the reflectarray reflector 110 is of a non-concentration type, the opening 30B that has a size the same as or greater than that of the reflectarray reflector 110 is necessary in order to cause a radio wave to penetrate with a low loss. However, as shown in FIG. 22, since the reflectarray reflector 110 is of a concentration type and the focal point 61A is set in the vicinity of the opening 30B, the opening 30B may be small. Thus, the opening 30B can be easily formed. Since the opening 30B may be small, impairment of the appearance can be suppressed. It should be noted that the opening 30B may be blindfolded with a member such as a decorative plate 30C. When the decorative plate 30C is formed of a material that is thinner than the wall member 41 and that the radio wave easily penetrates, increase in penetration loss of the radio wave is suppressed.

Figure 24:
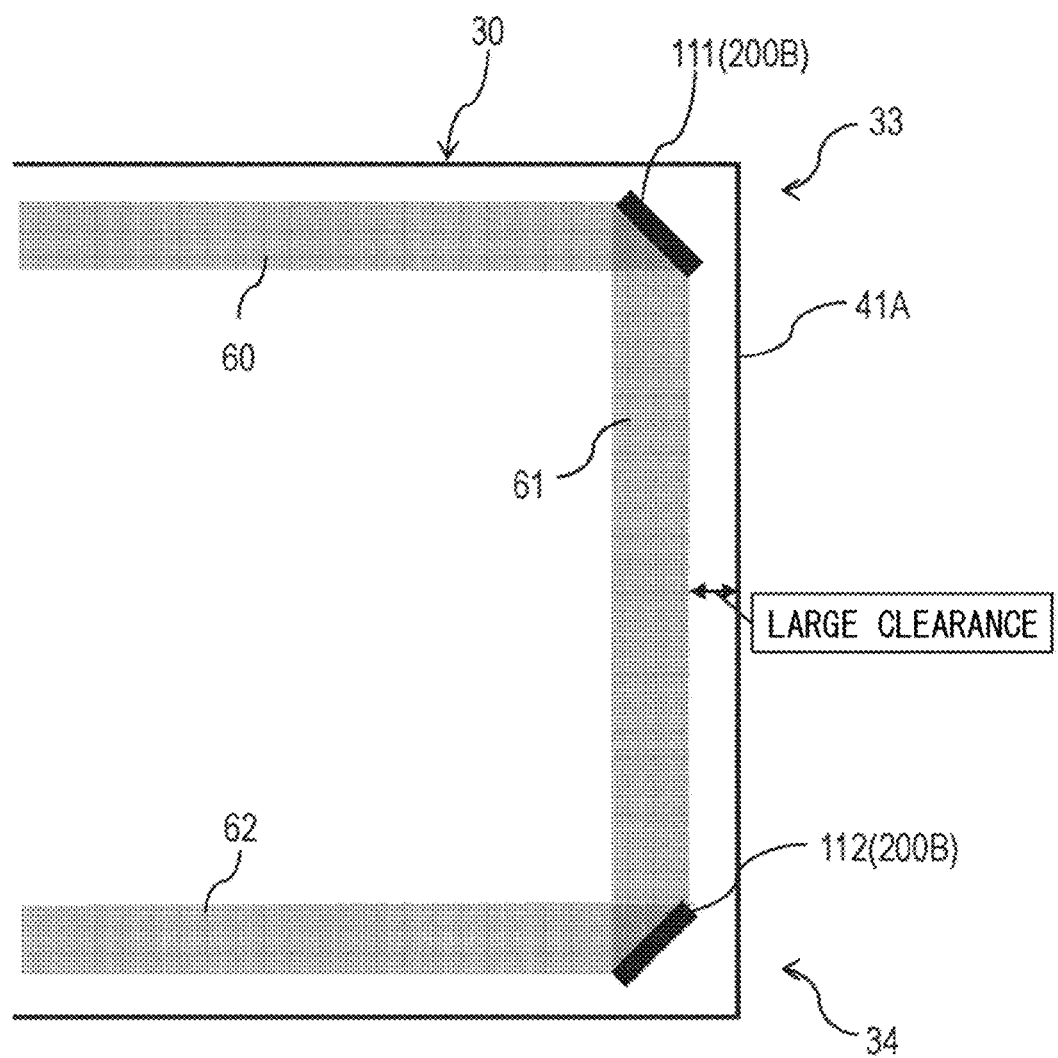
FIG. 24 is a plan view showing an installation example of reflectarray reflectors.

FIG. 24 shows an example in which the reflectors 111, 112 are respectively installed at a plurality of corners 33, 34 in the structure 30. In FIG. 24, the incident wave 60 is reflected by the reflector 111, whereby the first reflected wave 61 that advances along the wall member 41A is formed. The first reflected wave 61 is reflected by the reflector 112, whereby the second reflected wave 62 is formed.

When the plurality of reflectors 111, 112 are used to transmit a radio wave, it is appropriate to install the reflectors 111, 112 at the respective corners 33, 34 of the structure 30, when stability of the reflection surface, ease of installation, or inconspicuousness is taken into consideration. However, if the reflectors 111, 112 are installed at the corners 33, 34, the wireless transmission path has to be close to the wall member 41A. In particular, at the center of the transmission sector where the radius of the radio wave path (first Fresnel radius) becomes maximum, a large clearance is necessary between the first reflected wave 61 and the wall member 41A. As a result, the reflectors 111, 112 need to be installed away from the wall member 41A.

Figure 25:
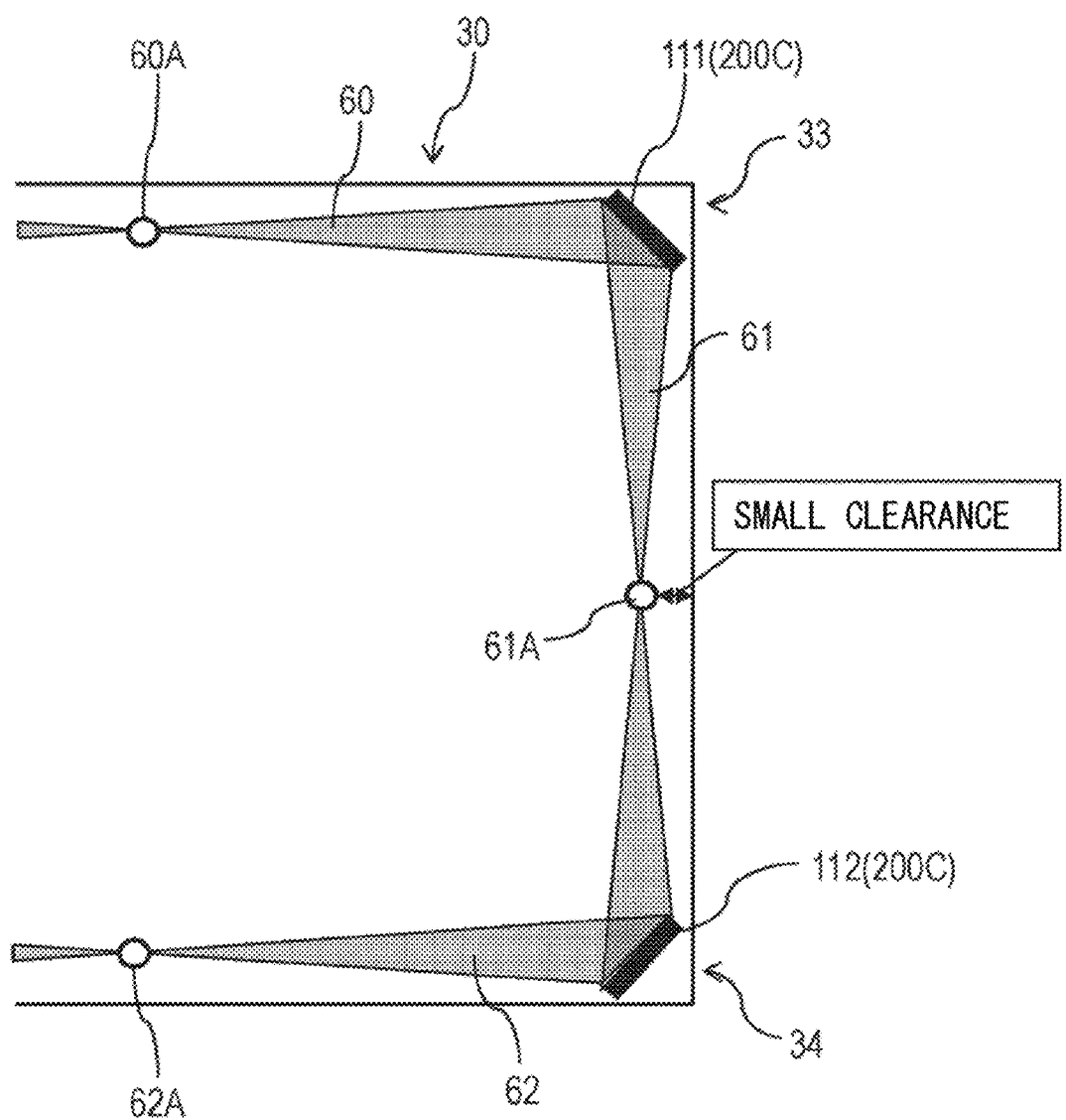
FIG. 25 is a plan view showing an installation example of reflectarray reflectors.

However, as shown in FIG. 25, when the reflector 111, 112 are configured to form a concentration-type reflected wave and the focal point 61A is present in the vicinity of the center of the transmission sector, the clearance between the first reflected wave 61 and the wall member 41A can be reduced, which is preferable.

In FIG. 25, a single reflector 111, 112 is installed at the corresponding corner 33, 34, but the present disclosure is not limited thereto. At each of the corners 33, 34, the reflection unit 100 according to the first embodiment may be installed or the concave curved surface metal plate 200C may be installed. The reflection unit 100 installed at each of the corners 33, 34 preferably includes the concentration-type reflectarray reflector 110C. More specifically, the reflection unit 100 installed at each of the corners 33, 34 is preferably one of those of CASES 1-3, 2-3, 3-1.

Figure 26:
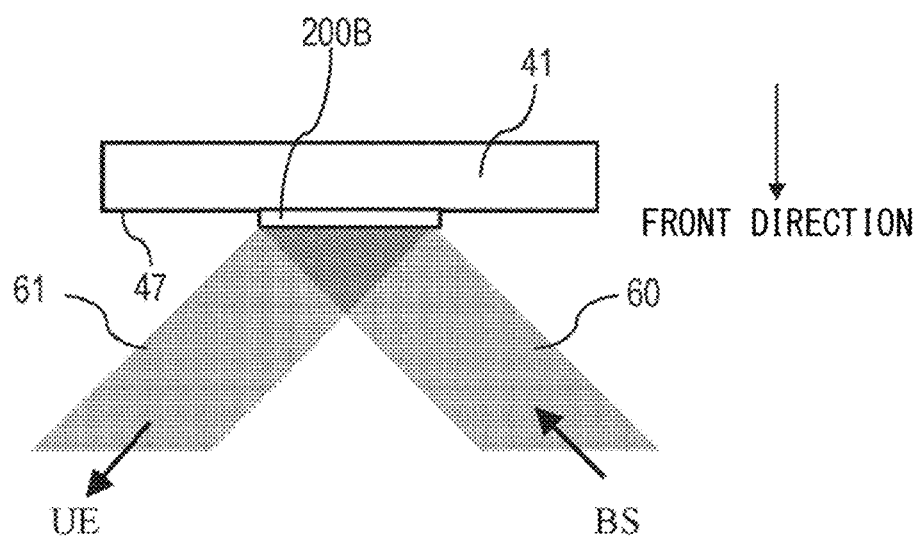
FIG. 26 is a plan view showing an installation example of a reflectarray reflector.

FIG. 26 shows the plane metal plate 200B installed at the wall member 41. The wall member 41 has an installation surface 47 for the plane metal plate 200B. The plane metal plate 200B may be installed in the vicinity of signage or digital signage.

There are many chances that the user equipment 20 is used in front of signage or digital signage. Advertisers wish that people stop in front of signage or digital signage. However, even when there is a plane metal plate 200B installed in the vicinity of signage or digital signage and a radio wave 60, 61 is reflected as in FIG. 26, the radio wave 60, 61 is not visible, and thus, the user does not know in which direction the radio wave is reflected. In addition, it is difficult for installation workers of the plane metal plate 200B to know which direction the radio wave is reflected, and thus, it is difficult to perform appropriate installation work.

Figure 27:
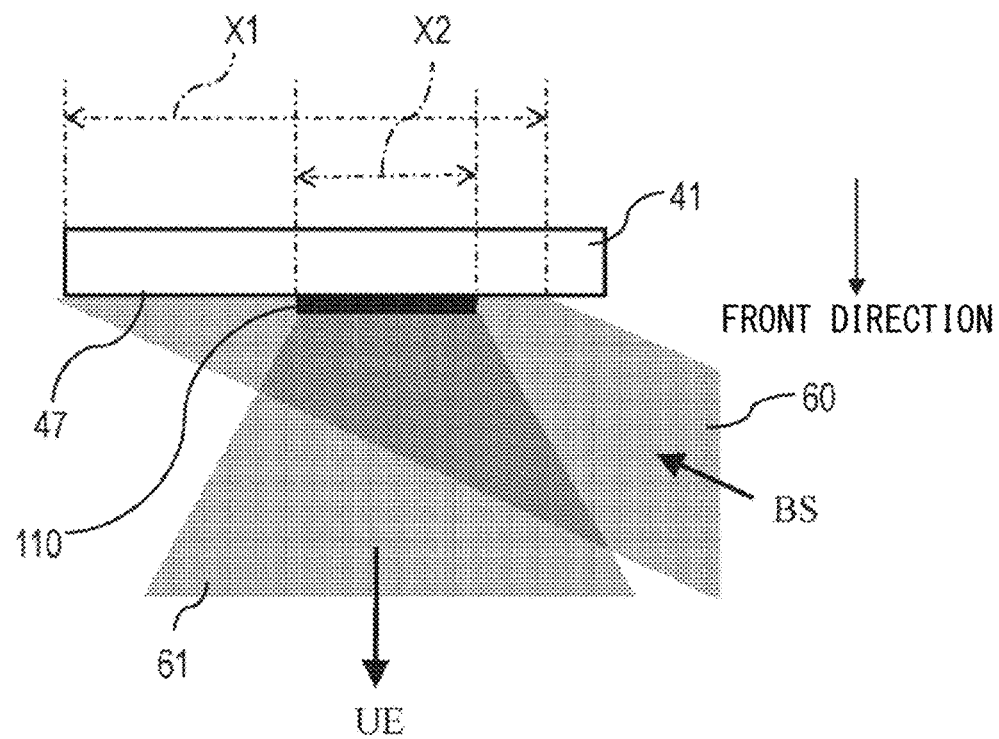
FIG. 27 is a plan view showing an installation example of a reflectarray reflector.

A radiation direction (reflection direction) of a radio wave that is easily and intuitively understood by a person is the front direction of a reflector or the installation surface 47 of the reflector. Therefore, as shown in FIG. 27, it is conceivable to install the reflectarray reflector 110 at the installation surface 47. The reflectarray reflector 110 in FIG. 27 is configured to radiate the reflected wave 61 to a range including the front direction being a direction orthogonal to the installation surface 47. In the case of FIG. 27, since the reflected wave 61 is radiated in the front direction of the reflectarray reflector 110 or the installation surface 47, the radiation direction of the reflected wave 61, which is not visible, is easily and intuitively understood.

However, in the case of FIG. 27, since the incident wave 60 is incident from sideways of the reflectarray reflector 110, a range X2 of the reflectarray reflector 110 is smaller than a range X1 in which the incident wave 60 hits the installation surface 47. As a result, reflection efficiency by the reflectarray reflector 110 is decreased.

Figure 28:
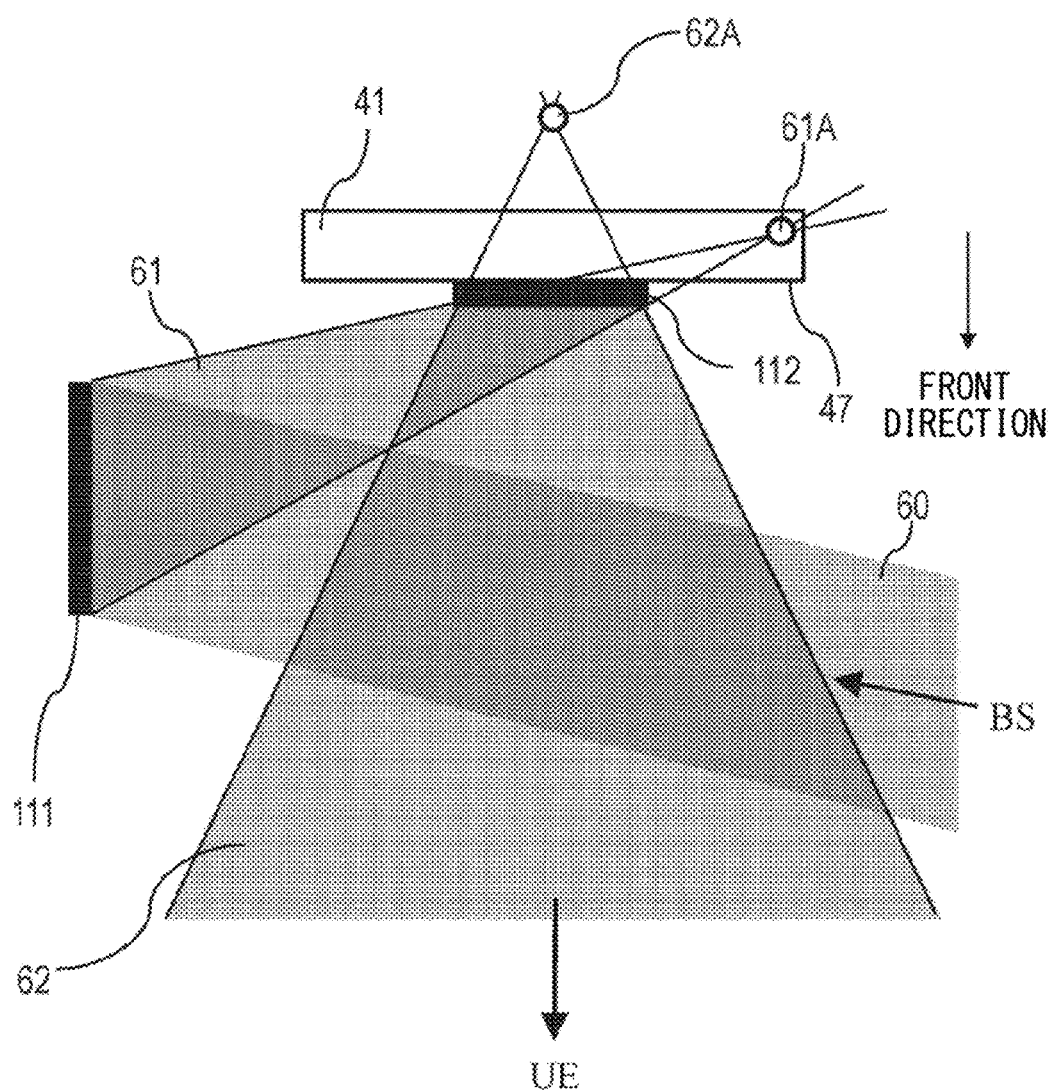
FIG. 28 is a plan view showing an installation example of reflectarray reflectors.

In contrast to this, in the installation form in FIG. 28, decrease of the reflection efficiency can be suppressed. That is, the incident wave 60 is reflected by the first reflectarray reflector 111. The first reflected wave 61 caused by the first reflectarray reflector 111 advances toward the second reflectarray reflector 112 installed at the installation surface 47. The first reflectarray reflector 111 can be installed so as to receive the incident wave 60 from substantially the front. Therefore, the first reflectarray reflector 111 can efficiently receive the incident wave 60.

Preferably, the first reflectarray reflector 111 is the concentration-type reflectarray reflector 110C. In this case, the first reflected wave 61 can be concentrated to the second reflectarray reflector 112. Therefore, the second reflectarray reflector 112 may be of a small size. The focal point 61A of the first reflected wave 61 is present farther with respect to the second reflectarray reflector 112, when viewed from the first reflectarray reflector 111.

The second reflectarray reflector 112 reflects the first reflected wave 61 to form the second reflected wave 62 that is radiated into the front direction of the second reflectarray reflector 112 or the installation surface 47. In the case of FIG. 28, the radiation direction of the second reflected wave 62, which is not visible, can be easily and intuitively understood.

Preferably, the second reflectarray reflector 112 is the diffusion reflectarray reflector 110A. In this case, the second reflected wave 62 is radiated in a wide range. The focal point 62A of the second reflected wave 62 is present behind the second reflectarray reflector 112.

Figure 29:
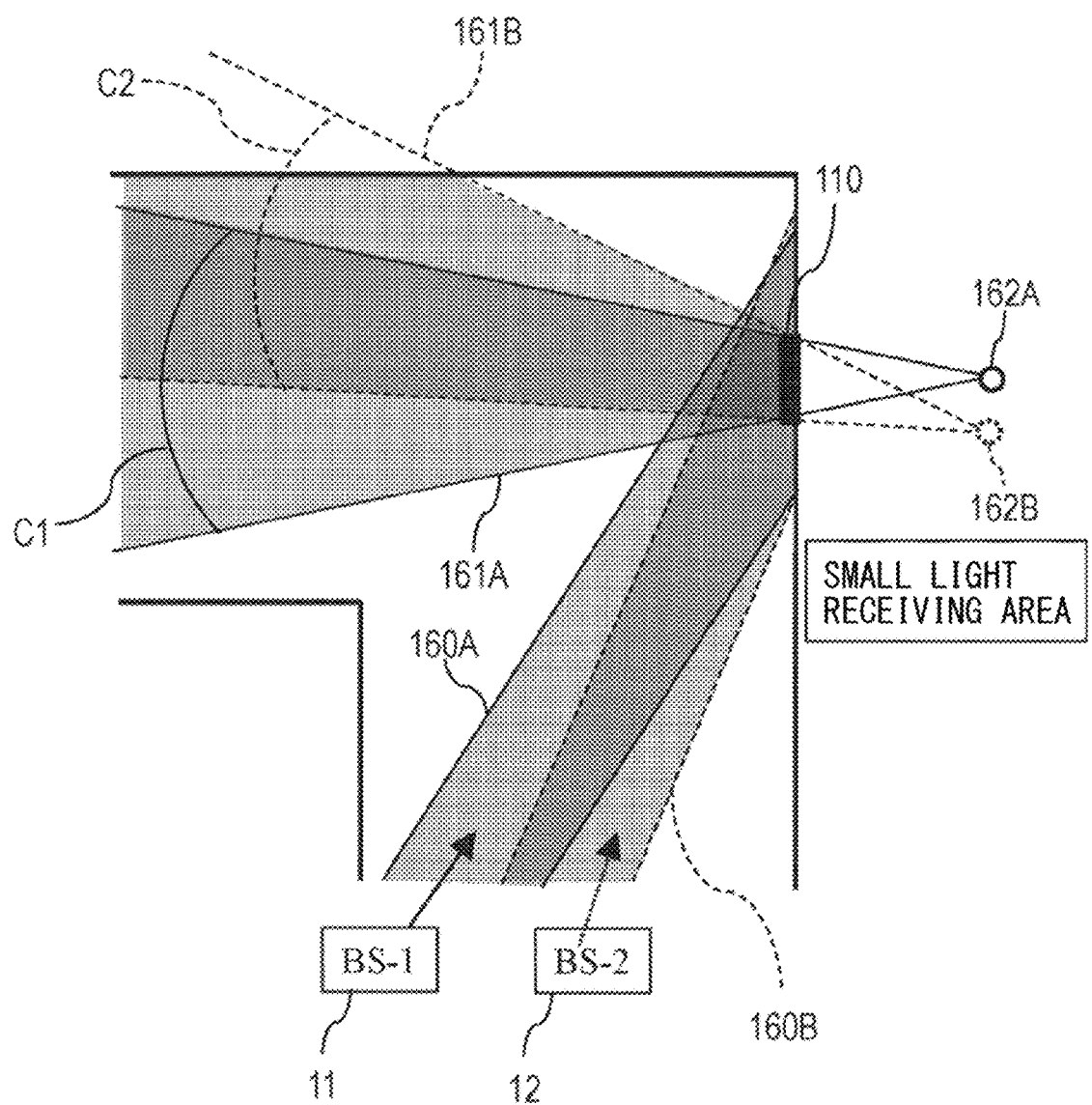
FIG. 29 is a plan view showing an installation example of a reflectarray reflector.

FIG. 29 shows the reflectarray reflector 110 that reflects incident waves 160A, 160B from a plurality of base stations 11, 12. Although the direction of the reflected wave caused by the reflectarray reflector 110 can be freely designed, when the incident angle of an incident wave on the reflectarray reflector 110 is changed, the reflection angle of the reflected wave is also changed.

As in FIG. 29, when a plurality of base stations 11, 12 are presented at different positions, the first incident wave 160A from the first base station 11 toward the reflectarray reflector 110 and the second incident wave 160B from the second base station 12 toward the reflectarray reflector 110 are present. When viewed from the reflectarray reflector 110, the first incident wave 160A has a first incident angle and the second incident wave 160B has a second incident angle different from the first incident angle.

Therefore, the radiation direction of a first reflected wave 161A formed by the reflectarray reflector 110 reflecting the first incident wave 160A, and the radiation direction of a second reflected wave 161B formed by the reflectarray reflector 110 reflecting the second incident wave 160B are different from each other. That is, a first coverage area C1 in which the first reflected wave 161A is radiated and a second coverage area C2 in which the second reflected wave 161B is radiated are different from each other. However, it is not preferable that the coverage areas C1, C2 of the reflected waves 161A, 161B from the same reflector 110 are different depending on the base stations 11, 12. In FIG. 29, the reflectarray reflector 110 is, as an example, the diffusion reflectarray reflector 110A, and focal points 162A, 162B of the reflected waves 161A, 161B are behind the reflectarray reflector 110.

Figure 30:
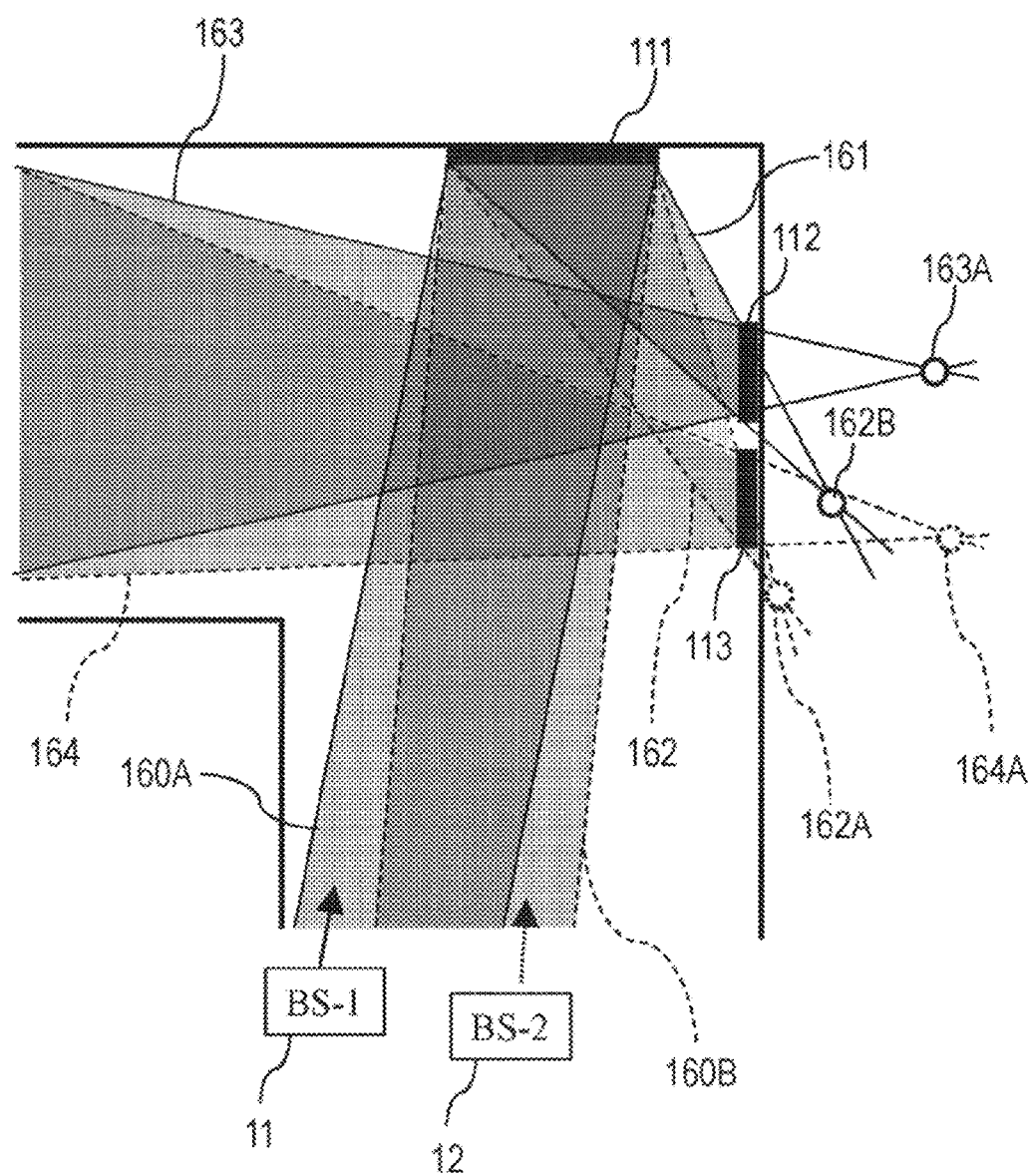
FIG. 30 is a plan view showing an installation example of reflectarray reflectors.

FIG. 30 shows an example of an installation form in which the problem that the coverage areas C1, C2 are different as in FIG. 29 is suppressed. In FIG. 30, the first incident wave 160A and the second incident wave 160B are reflected by the first reflectarray reflector 111. The first reflectarray reflector 111 reflects the first incident wave 160A to form a first reflected wave 161. In addition, the first reflectarray reflector 111 reflects the second incident wave 160B to form a second reflected wave 162. The reflection angles of the first reflected wave 161 and the second reflected wave 162 are different according to the difference in the incident angle of the first incident wave 160A and the second incident wave 160B.

In FIG. 30, the second reflectarray reflector 112 receiving the first reflected wave 161, and a third reflectarray reflector 113 receiving the second reflected wave 162 are provided. The second reflectarray reflector 112 reflects the first reflected wave 161 to form a third reflected wave 163. The third reflectarray reflector 113 reflects the second reflected wave 162 to form a fourth reflected wave 164.

The reflection angles of the second reflectarray reflector 112 and the third reflectarray reflector 113 can each be designed independently. Therefore, as shown in FIG. 30, the ranges (coverage area) in which the third reflected wave 163 and the fourth reflected wave 164 are radiated can be caused to generally overlap each other. That is, the third reflected wave 163 and the fourth reflected wave 164 have radiation ranges overlapping each other. When the broadness of the radiation range of either one of the radiation range of the third reflected wave 163 and the radiation range of the fourth reflected wave 164 is defined as 100, the broadness of the overlapping range between the radiation range of the third reflected wave 163 and the radiation range of the fourth reflected wave 164 is preferably not less than 60, more preferably not less than 70, further preferably not less than 80, and further preferably not less than 90.

In FIG. 30, preferably, the first reflectarray reflector 111 is the concentration-type reflectarray reflector 110C. In this case, the second reflectarray reflector 112 and the third reflectarray reflector 113 can be made small. The focal points 162B, 162A of the first reflected wave 161 and the second reflected wave 162 are present farther with respect to the second reflectarray reflector 112 and the third reflectarray reflector 113, when viewed from the first reflectarray reflector 111.

Preferably, the second reflectarray reflector 112 and the third reflectarray reflector 113 are each the diffusion reflectarray reflector 110A. In this case, the third reflected wave 163 and the fourth reflected wave 164 can be radiated in a wide range.

In FIG. 30, either one of the second reflectarray reflector 112 and the third reflectarray reflector 113 may be a radio wave absorber, instead of a reflector. That is, it may be understood that FIG. 30 does not show an example of a reflection unit including three reflectarray reflectors 111, 112, 113, but shows an example of a reflection unit including two reflectarray reflectors 111, 112 and a radio wave absorber 113.

For example, in FIG. 30, when a radio wave absorber is provided instead of the third reflectarray reflector 113, the radio wave from the second base station 12 is absorbed by the radio wave absorber. Formation of the fourth reflected wave 164 can be prevented.

Figure 31:
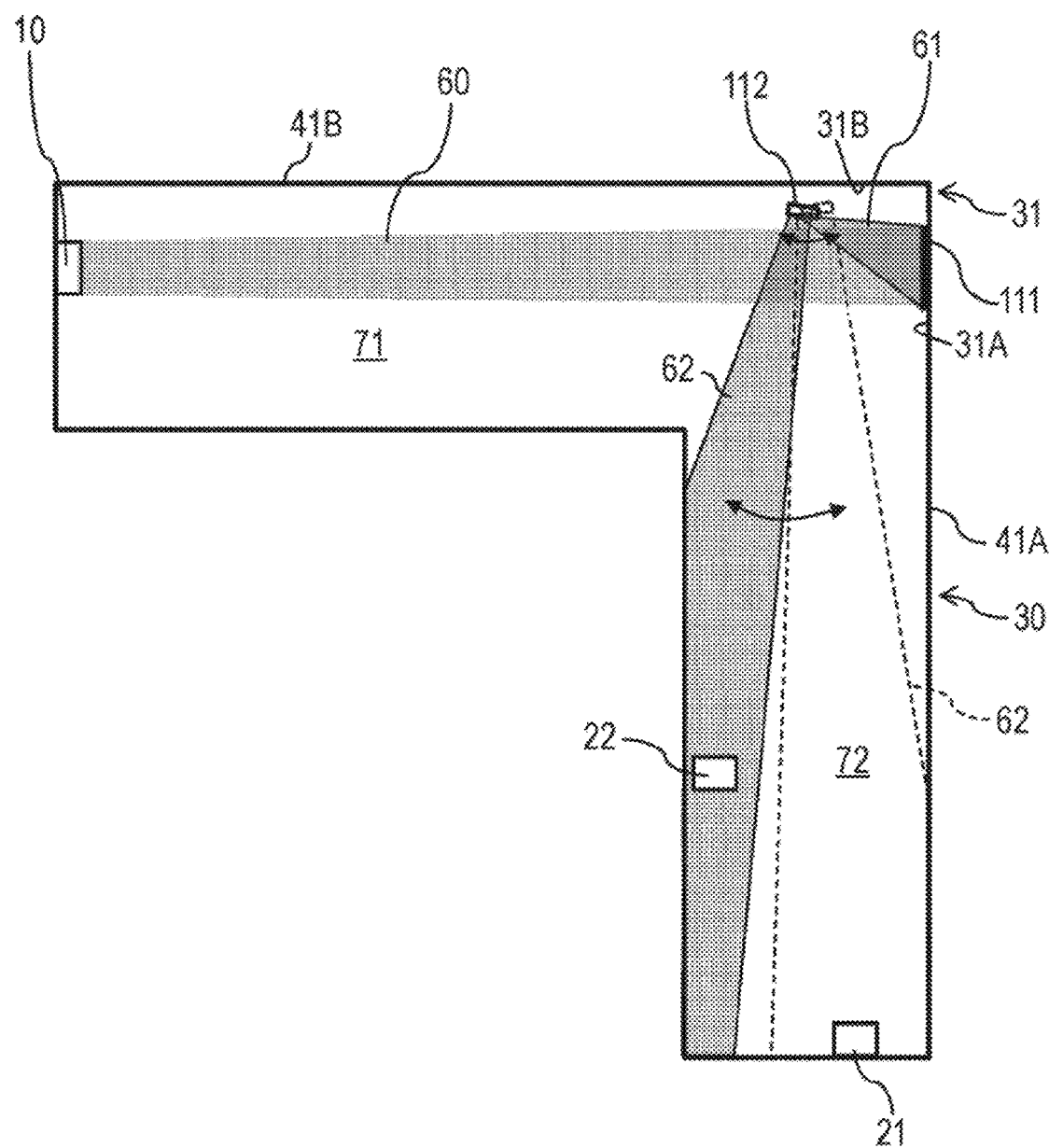
FIG. 31 is a plan view showing an installation example of reflectarray reflectors.

FIG. 31 shows a specific installation example of CASE 4-2 shown in FIG. 10. CASE 4-2 is an example in which the second reflectarray reflector 112 is installed at the position of the focal point 61A of the first reflected wave 61 caused by the first reflectarray reflector 111 or in the vicinity of the focal point 61A. FIG. 31 is also an example in which the focal point 61A of the first reflected wave 61 caused by the first reflectarray reflector 111 in FIG. 20 is set in the vicinity of the second reflectarray reflector 112.

In FIG. 31, the incident wave 60 from the base station 10 is reflected by the first reflectarray reflector 111, whereby the first reflected wave 61 is formed. The first reflected wave 61 advances toward the second reflectarray reflector 112. The first reflected wave 61 is focused at the focal point in the vicinity of the second reflectarray reflector 112. Therefore, the second reflectarray reflector 112 may be small. As the reflector that reflects the first reflected wave 61, a metal reflection plate may be used instead of the second reflectarray reflector 112. Irrespective of which of the reflectarray reflector and the metal reflection plate is used, as long as the reflector is of a small size, the reflector is inconspicuous, and thus, is less likely to impair the appearance. A small-sized reflector is inexpensive and light in weight, and further, easy to be handled. A small-sized reflector is also advantageous for use in adjustment of the reflection angle such as when reflection is to be caused toward a specific spot.

Figure 32:
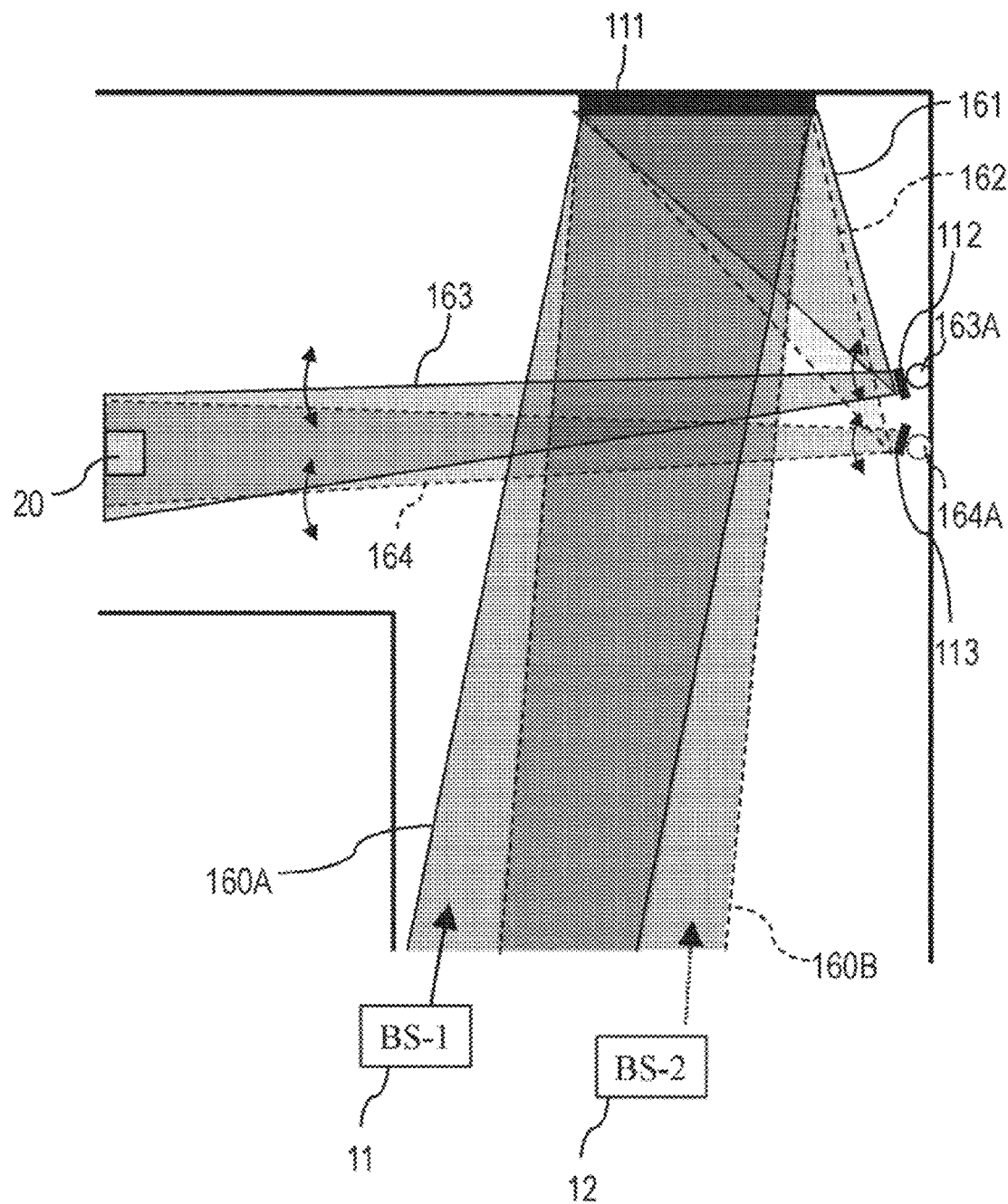
FIG. 32 is a plan view showing an installation example of reflectarray reflectors.

FIG. 32 shows another example of a specific installation of CASE 4-2 shown in FIG. 10. FIG. 32 is also an example in which focal points 163A, 164A according to the first reflectarray reflector 111 in FIG. 30 are set in the vicinities of the second reflectarray reflector 112 and the third reflectarray reflector 113.

In FIG. 32, the incident waves 160A, 160B from the base stations 11, 12 are reflected by the first reflectarray reflector 111, whereby the first reflected wave 161 and the second reflected wave 162 are formed. The first reflected wave 161 is focused at the focal point 163A in the vicinity of the second reflectarray reflector 112. The second reflected wave 162 is focused at the focal point 164A in the vicinity of the third reflectarray reflector 113. Therefore, the second reflectarray reflector 112 and the third reflectarray reflector 113 may be small. Therefore, the reflectors that reflect the first reflected wave 161 and the second reflected wave 162 may be metal reflection plates instead of the second reflectarray reflector 112 and the third reflectarray reflector 113. Irrespective of which of the reflectarray reflector and the metal reflection plate is used, as long as the reflectors are of a small size, advantages as described above with reference to FIG. 31 can be obtained.

In FIG. 32 as well, either one of the second reflectarray reflector 112 and the third reflectarray reflector 113 may be a radio wave absorber, instead of a reflector. In this case, for example, when a radio wave absorber is used instead of the third reflectarray reflector 113, formation of the fourth reflected wave 164 is prevented and the radio wave from the second base station 12 can be prevented from reaching the user equipment 20.

Second Embodiment

Figure 33:
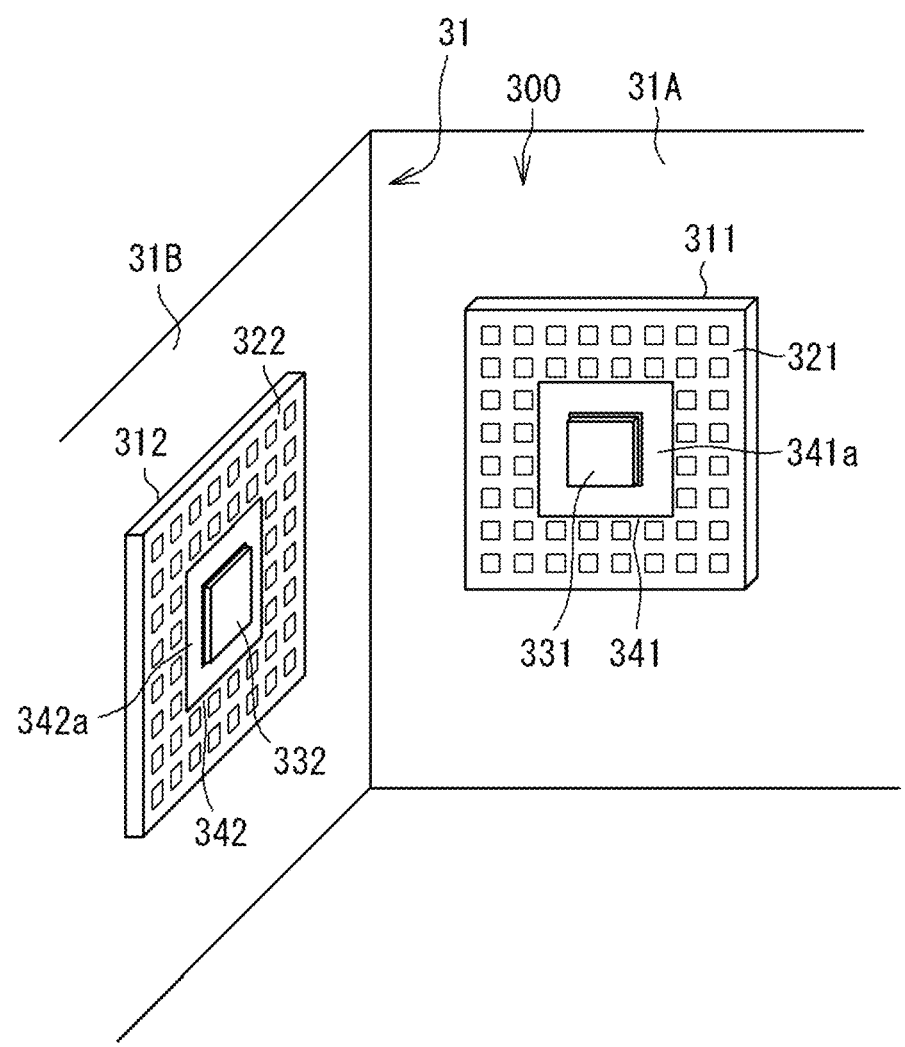
FIG. 33 shows an example of a configuration of a reflection unit according to a second embodiment.

FIG. 33 shows an example of a configuration of a reflection unit according to a second embodiment. A reflection unit 300 according to the second embodiment is installed in a wireless transmission path in order to change the direction of the wireless transmission path between the base station 10 and the user equipment 20A, 20B, 20C (see FIG. 1), similar to the reflection unit 100 according to the first embodiment.

The reflection unit 300 includes a first reflectarray reflector 311 and a second reflectarray reflector 312.

As shown in FIG. 33, in an architecture, the reflection unit 300 is mounted to the corner 31 where the first face 31A and the second face 31B are in contact with each other. Each of the first reflectarray reflector 311 and the second reflectarray reflector 312 has a plate shape. The first reflectarray reflector 311 is mounted to the first face 31A and the second reflectarray reflector 312 is mounted to the second face 31B.

Figure 34:
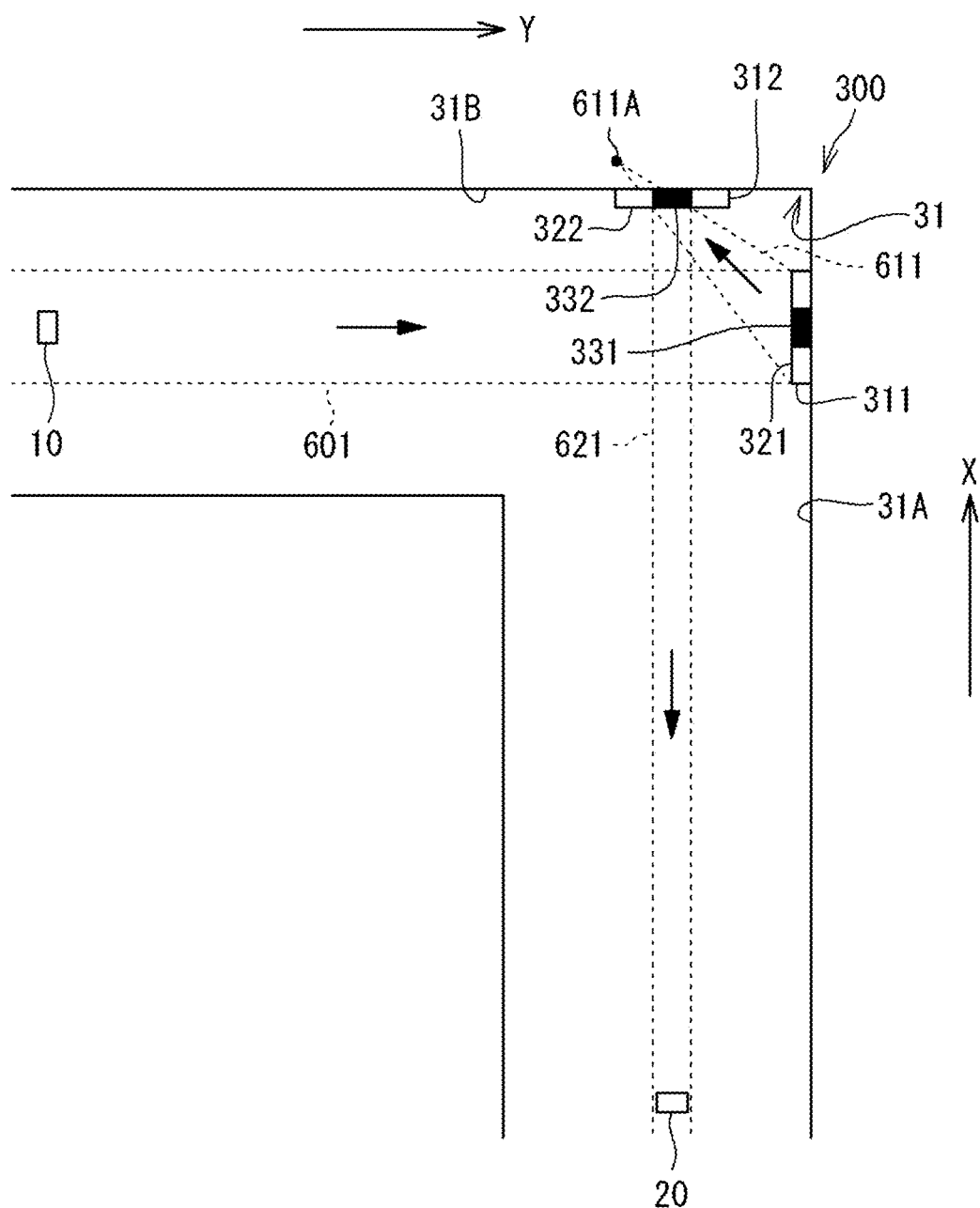
FIG. 34 describes reflection of a wireless communication signal by the reflection unit according to the second embodiment.
Figure 35:
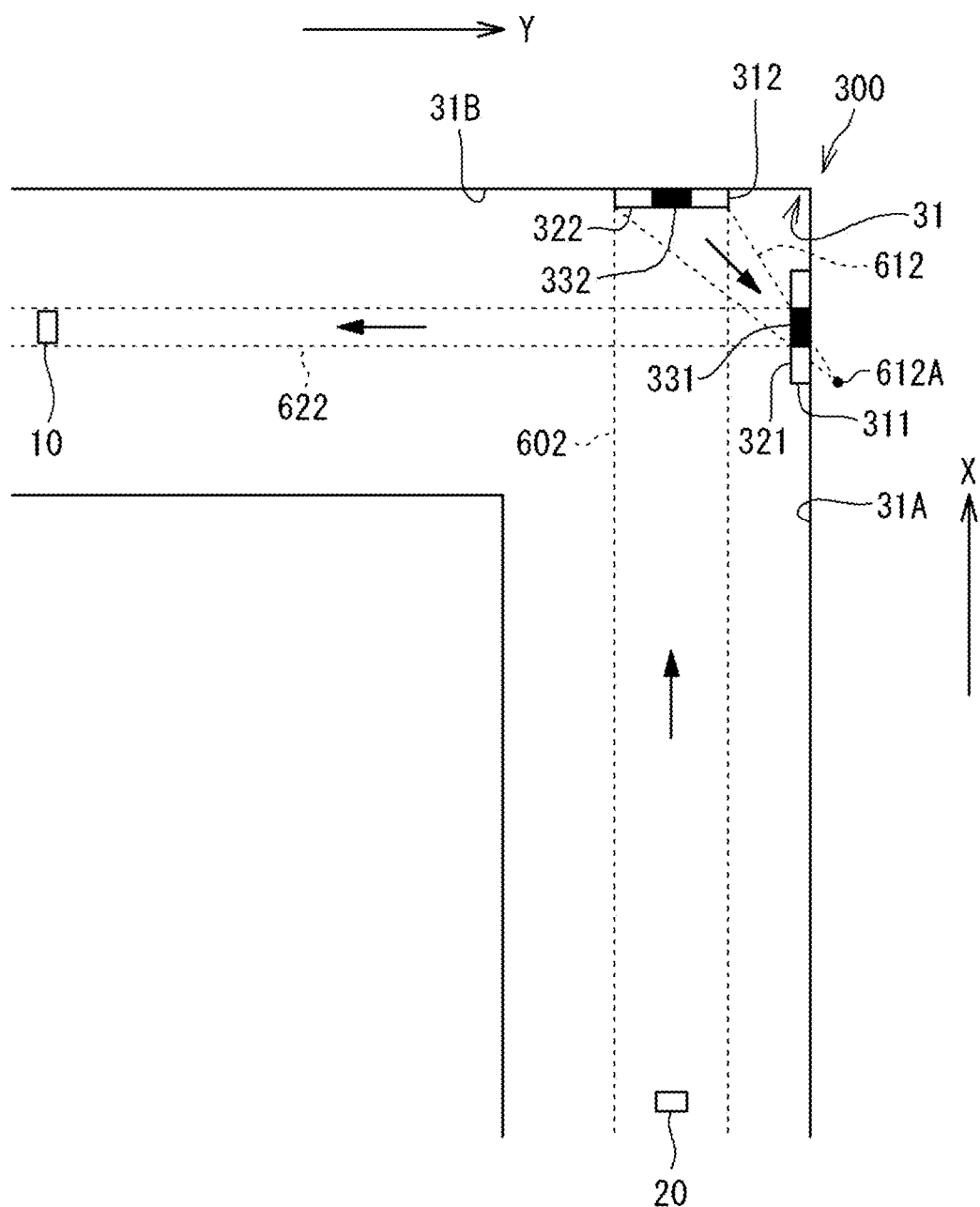
FIG. 35 describes reflection of a wireless communication signal by the reflection unit according to the second embodiment.

FIG. 34 and FIG. 35 each describe reflection of a wireless communication signal by the reflection unit 300 according to the second embodiment. In the example in the drawings, an X direction and a Y direction are orthogonal to each other in a horizontal plane. The first face 31A is a wall extending along the X direction, and the second face 31B is a wall extending along the Y direction. One of the first face 31A and the second face 31B may be a ceiling or a floor, and one of the X direction and the Y direction may be the vertical direction. FIG. 34 shows an example of a wireless transmission path from the base station 10 toward the user equipment 20. FIG. 35 shows an example of a wireless transmission path from the user equipment 20 toward the base station 10.

With reference to FIG. 34, the wireless transmission path from the base station 10 toward the user equipment 20 will be described. The first reflectarray reflector 311 reflects a wireless communication signal (first incident wave) transmitted in the Y direction from the base station 10 (first wireless device). The first reflectarray reflector 311 reflects a first incident wave 601 coming in the Y direction being a direction perpendicular to the first reflectarray reflector 311, into a direction toward the second reflectarray reflector 312.

The first reflectarray reflector 311 includes a first concentration reflection part 321 and a first non-concentration reflection part 331. The first concentration reflection part 321 is a reflectarray (concentration-type reflectarray) that simulates the reflection characteristics of the concave curved surface metal plate 200C (see FIG. 3). The first concentration reflection part 321 concentrates a reflected wave (hereinafter, referred to as a "primary reflected wave 611") at a focal point 611A positioned forward of the first concentration reflection part 321. The primary reflected wave 611 is an example of "first reflected wave".

Figure 36:
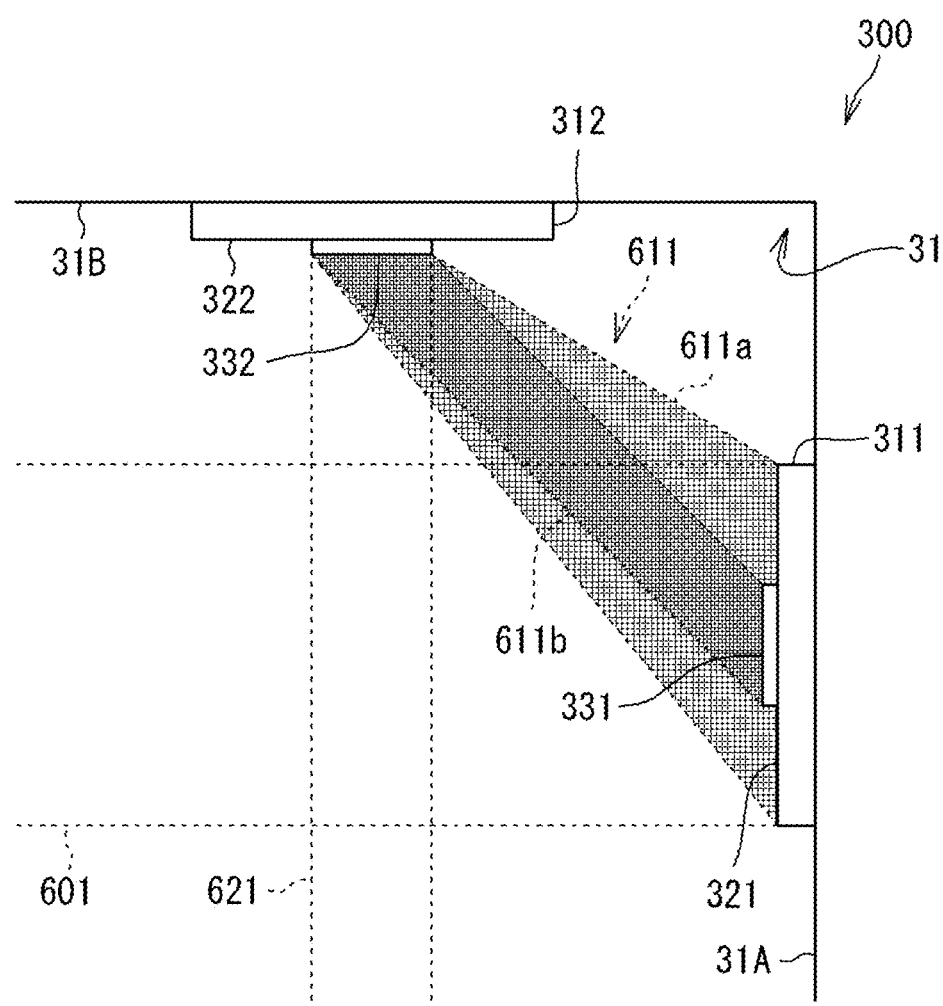
FIG. 36 describes reflection of a wireless communication signal by a first reflectarray reflector according to the second embodiment.

Here, reflection of a wireless communication signal by the first reflectarray reflector 311 will be described further in detail. FIG. 36 describes reflection of a wireless communication signal by the first reflectarray reflector according to the second embodiment. The primary reflected wave 611 includes a reflected wave component 611a caused by the first concentration reflection part 321 and a reflected wave component 611b caused by the first non-concentration reflection part 331.

Out of the primary reflected wave 611, the reflected wave component 611a caused by the first concentration reflection part 321 is converged when coming closer to the second reflectarray reflector 312. The focal point 611A is positioned farther with respect to the second reflectarray reflector 312, when viewed from the first reflectarray reflector 311. The reflected wave component 611a is incident on a part of the second reflectarray reflector 312.

The second reflectarray reflector 312 includes a second concentration reflection part 322 and a second non-concentration reflection part 332 (see FIG. 33). At the position of the second reflectarray reflector 312, the reflected wave component 611a has an area similar to that of the second non-concentration reflection part 332. That is, substantially all of the reflected wave component 611a is incident on the second non-concentration reflection part 332.

The first non-concentration reflection part 331 does not concentrate the reflected wave (the reflected wave component 611b). The first non-concentration reflection part 331 diffuses the reflected wave component 611b, or does not diffuse and does not concentrate the reflected wave component 611b. The first non-concentration reflection part 331 is, for example, a reflectarray (diffusion-type reflectarray) that simulates reflection characteristics of the convex curved surface metal plate 200A (see FIG. 3), or a reflectarray (non-diffusion and non-concentration type reflectarray) that simulates reflection characteristics of the plane metal plate 200B (see FIG. 3). The first non-concentration reflection part 331 may be the convex curved surface metal plate 200A or the plane metal plate 200B.

When the first non-concentration reflection part 331 is a diffusion-type reflectarray, the reflected wave component 611b is diffused. For example, the area of the reflected wave component 611b at the position of the second reflectarray reflector 312 is larger than the area of the second non-concentration reflection part 332. In this case, a part of the reflected wave component 611b is not incident on the second non-concentration reflection part 332.

With reference back to FIG. 33, the second concentration reflection part 322 has a ring shape, and the second non-concentration reflection part 332 is disposed on the inner side of the second concentration reflection part 322. The second non-concentration reflection part 332 is separated by a predetermined distance from the second concentration reflection part 322. That is, between the second concentration reflection part 322 and the second non-concentration reflection part 332, a space having a predetermined size is provided. The space around the second non-concentration reflection part 332 is a second low reflection region 342. The second low reflection region 342 has a reflectance lower than the reflectance of the second non-concentration reflection part 332. The second low reflection region 342 may include a radio wave absorber 342a. A part of the reflected wave component 611b off the second non-concentration reflection part 332 is incident on the second low reflection region 342. The part of the reflected wave component 611b incident on the second low reflection region 342 is attenuated, and further, the part of the reflected wave component 611b incident on the radio wave absorber 342a is absorbed by the radio wave absorber 342a.

With reference back to FIG. 36, when the first non-concentration reflection part 331 is a non-diffusion and non-concentration-type reflectarray, the reflected wave component 611b is not diffused and is not concentrated. That is, the reflected wave component 611b is radiated as a collimated beam to the second reflectarray reflector 312. When the shape and size of the first non-concentration reflection part 331 and the shape and size of the second non-concentration reflection part 332 are the same as or similar to each other, substantially all of the reflected wave component 611b is incident on the second non-concentration reflection part 332 in the second reflectarray reflector 312.

As described above, substantially all of the reflected wave component 611a and at least a part of the reflected wave component 611b are incident on the second non-concentration reflection part 332. That is, most of the primary reflected wave 611 is incident on the second non-concentration reflection part 332.

Similar to the first non-concentration reflection part 331, the second non-concentration reflection part 332 is, for example, a reflectarray (diffusion-type reflectarray) that simulates reflection characteristics of the convex curved surface metal plate 200A (see FIG. 3), or a reflectarray (non-diffusion and non-concentration-type reflectarray) that simulates reflection characteristics of the plane metal plate 200B (see FIG. 3). The second non-concentration reflection part 332 may be the convex curved surface metal plate 200A or the plane metal plate 200B.

The primary reflected wave 611 is reflected by the second non-concentration reflection part 332, whereby a secondary reflected wave 621 advances in a direction (direction toward the user equipment 20) opposite to the X direction. In the example in FIG. 34, the secondary reflected wave 621 is not diffused and is not concentrated. That is, the secondary reflected wave 621 is radiated as a collimated beam to the user equipment 20. In this example, the second non-concentration reflection part 332 is a diffusion-type reflectarray (or the convex curved surface metal plate 200A). Accordingly, the primary reflected wave 611 having been converged is reflected as a collimated beam by the second non-concentration reflection part 332. The secondary reflected wave 621 may be a convergent beam that is converged toward the user equipment 20, or may be a diffuse beam that is diffused toward the user equipment 20.

A noise radio wave is present in the space where the reflection unit 300 is disposed. The noise radio wave includes, for example, a reflected wave (multipath) which is a wireless communication signal reflected at a wall surface. Even if a noise radio wave different from the first incident wave 601 is incident on the first concentration reflection part 321 at an incident angle slightly different from the incident angle of the first incident wave 601, the reflected wave of the noise radio wave is incident on a position off the second non-concentration reflection part 332 in the second reflectarray reflector 312. Since the second low reflection region 342 is provided around the second non-concentration reflection part 332, the noise radio wave is attenuated, and the noise radio wave incident on the radio wave absorber 342a is absorbed. Therefore, noise in wireless communication can be reduced.

With reference to FIG. 35, the wireless transmission path from the user equipment 20 toward the base station 10 will be described. The second reflectarray reflector 312 reflects the wireless communication signal (second incident wave) transmitted in the X direction from the user equipment 20 (second wireless device). The second reflectarray reflector 312 reflects a second incident wave 602 coming in the X direction being a direction perpendicular to the second reflectarray reflector 312, into a direction toward the first reflectarray reflector 311.

Similar to the first concentration reflection part 321 of the first reflectarray reflector 311, the second concentration reflection part 322 of the second reflectarray reflector 312 is a concentration-type reflectarray. The second concentration reflection part 322 concentrates the reflected wave (hereinafter, referred to as a "primary reflected wave 612") at a focal point 612A positioned forward of the second concentration reflection part 322. The primary reflected wave 612 is an example of "second reflected wave".

Similar to the primary reflected wave 611 described above, the primary reflected wave 612 includes a reflected wave component caused by the second concentration reflection part 322 and a reflected wave component caused by the second non-concentration reflection part 332. The reflected wave component caused by the second concentration reflection part 322 is converged and substantially all of the reflected wave component is incident on the first non-concentration reflection part 331. The reflected wave component caused by the second non-concentration reflection part 332 is not converged and at least a part of the reflected wave component is incident on the first non-concentration reflection part 331. That is, most of the primary reflected wave 612 is incident on the first non-concentration reflection part 331.

The primary reflected wave 612 is reflected by the first non-concentration reflection part 331, whereby a secondary reflected wave 622 advances in a direction (direction toward the base station 10) opposite to the Y direction. In the example in FIG. 35, the secondary reflected wave 622 is not diffused and is not concentrated. That is, the secondary reflected wave 622 is radiated as a collimated beam to the base station 10. In this example, the first non-concentration reflection part 331 is a diffusion-type reflectarray (or the convex curved surface metal plate 200A). Accordingly, the primary reflected wave 612 having been converged is reflected as a collimated beam by the first non-concentration reflection part 331. The secondary reflected wave 622 may be a convergent beam that is converged toward the base station 10, or may be a diffuse beam that is diffused toward the base station 10.

With reference back to FIG. 33, the first concentration reflection part 321 has a ring shape, and the first non-concentration reflection part 331 is disposed on the inner side of the first concentration reflection part 321. A first low reflection region 341 is provided around the first non-concentration reflection part 331. The first low reflection region 341 has a reflectance lower than the reflectance of the first non-concentration reflection part 331. The first low reflection region 341 may include a radio wave absorber 341a. A noise radio wave is attenuated by the first low reflection region 341, and the noise radio wave incident on the radio wave absorber 341a is absorbed. Therefore, noise in wireless communication can be reduced.

The first non-concentration reflection part 331 is attachable to and detachable from the first concentration reflection part 321. Accordingly, the position of the first non-concentration reflection part 331 can be easily adjusted such that the primary reflected wave 612 is accurately incident on the first non-concentration reflection part 331. The second non-concentration reflection part 332 is attachable to and detachable from the second concentration reflection part 322. Accordingly, the position of the second non-concentration reflection part 332 can be easily adjusted such that the primary reflected wave 611 is accurately incident on the second non-concentration reflection part 332.

Figure 37:
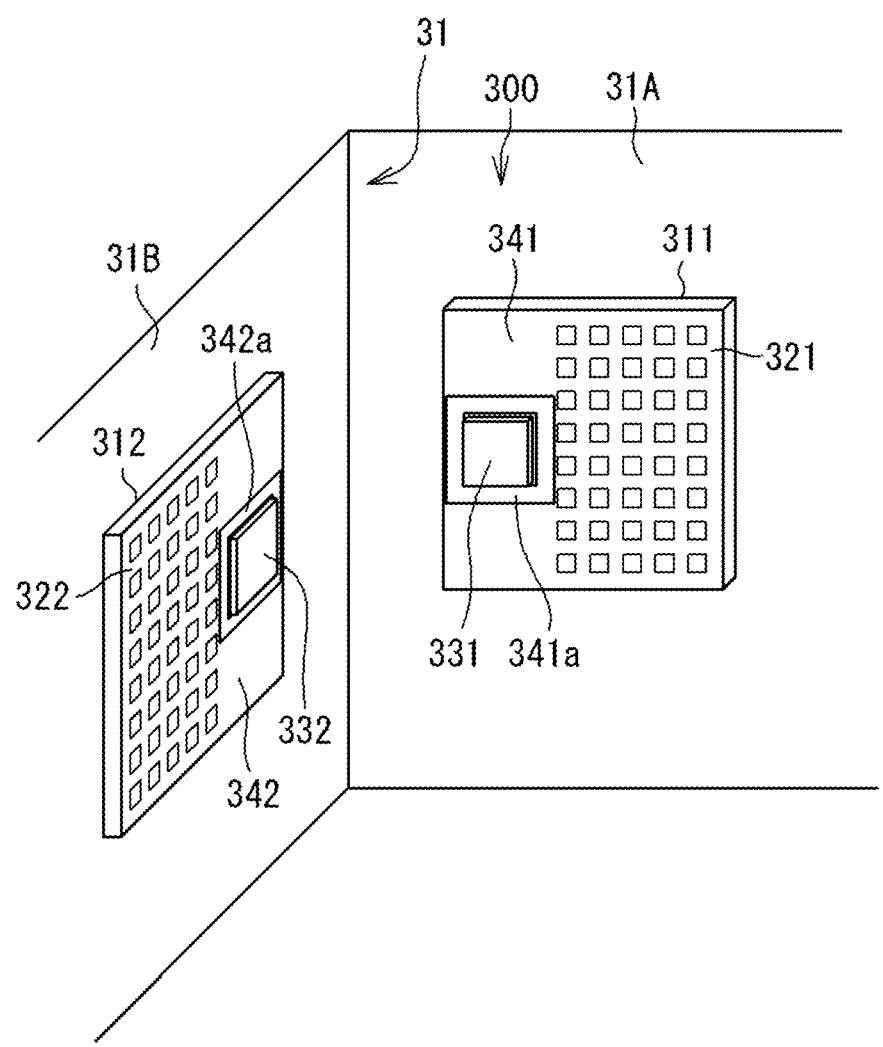
FIG. 37 shows a configuration of a first modification of the reflection unit according to the second embodiment.

In the second embodiment described above, the first non-concentration reflection part 331 is disposed on the inner side of the first concentration reflection part 321 having a ring shape, and the second non-concentration reflection part 332 is disposed on the inner side of the second concentration reflection part 322 having a ring shape. However, the present disclosure is not limited thereto. FIG. 37 shows a configuration of a first modification of the reflection unit according to the second embodiment. In the first modification, the first concentration reflection part 321 and the second concentration reflection part 322 each have a rectangular shape. In the first reflectarray reflector 311, the first non-concentration reflection part 331 is disposed at a position closer to the second face 31B than the first concentration reflection part 321. In the second reflectarray reflector 312, the second non-concentration reflection part 332 is disposed at a position closer to the first face 31A than the second concentration reflection part 322. Depending on the radio wave state in the space where the reflection unit 300 is disposed, when there are few noise radio waves near the wall (in the vicinity of the first face 31A and the second face 31B) and there are many noise radio waves at a position away from the wall, if the configuration as above is adopted, influence of noise in wireless communication can be reduced.

Figure 38:
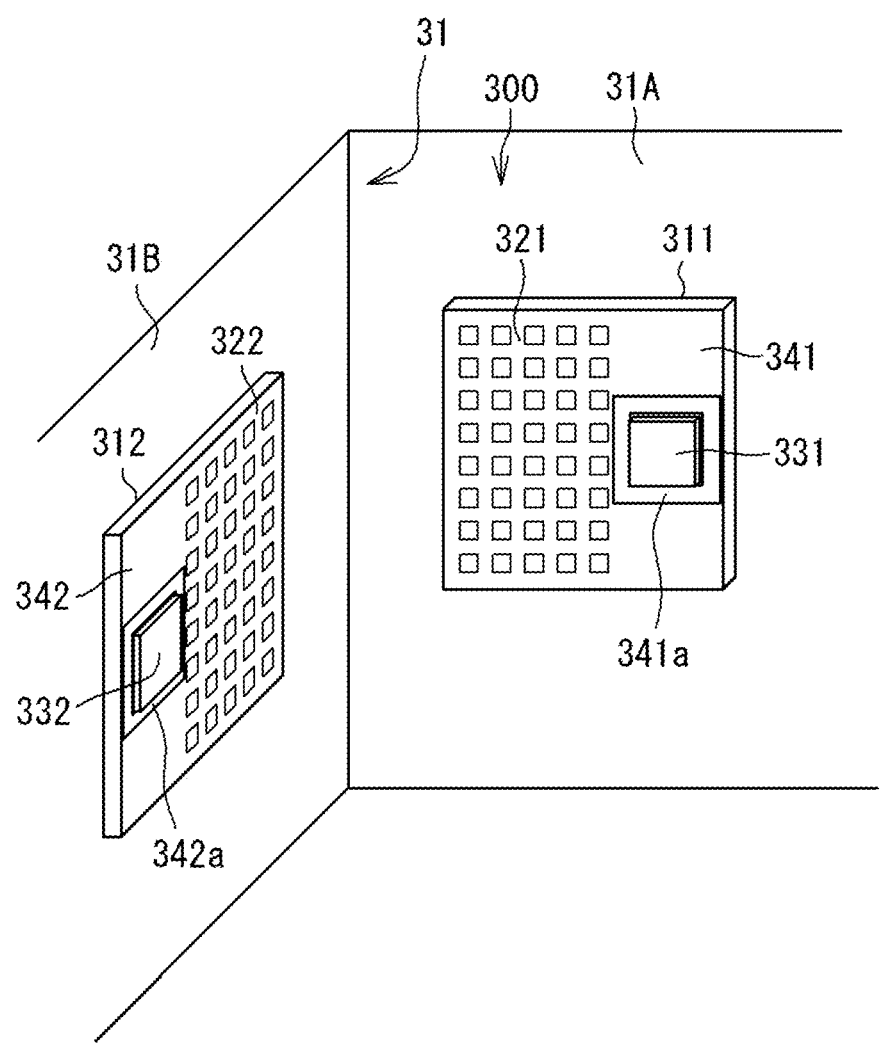
FIG. 38 shows a configuration of a second modification of the reflection unit according to the second embodiment.

FIG. 38 shows a configuration of a second modification of the reflection unit according to the second embodiment. In the second modification, the first concentration reflection part 321 and the second concentration reflection part 322 each have a rectangular shape. In the first reflectarray reflector 311, the first non-concentration reflection part 331 is disposed at a position farther away from the second face 31B than the first concentration reflection part 321. In the second reflectarray reflector 312, the second non-concentration reflection part 332 is disposed at a position farther away from the first face 31A than the second concentration reflection part 322. Depending on the radio wave state in the space where the reflection unit 300 is disposed, when there are few noise radio waves at a position (a position away from the first face 31A and the second face 31B) away from the wall and there are many noise radio waves near the wall, if the configuration as above is adopted, influence of noise in wireless communication can be reduced.

The first non-concentration reflection part 331 may be disposed above the first concentration reflection part 321, or may be disposed below the first concentration reflection part 321. The second non-concentration reflection part 332 may be disposed above the second concentration reflection part 322, or may be disposed below the second concentration reflection part 322. The positional relationship between the first concentration reflection part 321 and the first non-concentration reflection part 331, and the positional relationship between the second concentration reflection part 322 and the second non-concentration reflection part 332 can be determined according to the radio wave state and the position where the reflection unit 300 is disposed in the building.

Another Embodiment

In the embodiments described above, the wireless communication signal is a radio signal having a frequency of a submillimeter wave or a frequency higher than that of the submillimeter wave, or a radio signal having a frequency of a millimeter wave or a frequency higher than that of the millimeter wave. However, the present disclosure is not limited thereto. The reflection unit 300 may be used for reflection of a high frequency power signal for space power transmission. That is, the reflection unit 300 may be disposed between a feeding device (first wireless device) that transmits a high frequency power signal and a power receiving device (second wireless device) that receives the high frequency power signal, and the reflection unit 300 may change the direction of the transmission path of the high frequency power signal.

The embodiments disclosed herein are merely illustrative in all aspects and are not restrictive. The scope of the present disclosure is defined by the scope of the claims rather than the embodiments described above, and is intended to include meaning equivalent to the scope of the claims and all modifications within the scope.

REFERENCE SIGNS LIST 1 wireless transmission system
10 first wireless device (base station)
11 first base station
12 second base station
20 second wireless device (user equipment)
20A, 20B, 20C, 21, 22 user equipment
30 structure (architecture)
30A first portion
30B second portion (opening)
30C decorative plate
31, 33, 34 corner
31A first face
31B second face
41, 41A, 41B wall member
42 ceiling member
43 floor member
45 obstacle
47 reflector installation surface
50 opening
60 incident wave
60A radio wave
61 first reflected wave
61A, 62A, 65, 162A, 162B, 163A, 164A, 611A, 612A focal point
62 second reflected wave
65A first focal point
65B second focal point
67B reflected wave
67C penetrating wave
71 first area
72 second area
100, 100A, 100B, 100C, 100D, 100E, 100F, 100G, 300 reflection unit
110 reflectarray reflector
110A diffusion reflectarray reflector
110B non-diffusion and non-concentration-type reflectarray reflector (non-diffusion reflectarray reflector)
110C concentration-type reflectarray reflector (non-diffusion reflectarray reflector)
110C-1 single-focal point reflectarray reflector
110C-2 multi-focal point reflectarray reflector
111, 311 first reflectarray reflector
112, 312 second reflectarray reflector
113 third reflectarray reflector (radio wave absorber)
120 protection cover
131 high frequency substrate
131A front face
131B rear face
132 reflection element
160A, 601 first incident wave
160B, 602 second incident wave
161, 161A first reflected wave
161B, 162 second reflected wave
163 third reflected wave
164 fourth reflected wave
200A convex curved surface metal plate (metal reflector)
200B plane metal plate (metal reflector)
200C concave curved surface metal plate (metal reflector)
321 first concentration reflection part
322 second concentration reflection part
331 first non-concentration reflection part
332 second non-concentration reflection part
341 first low reflection region
341a, 342a radio wave absorber
342 second low reflection region
611, 612 primary reflected wave
611a, 611b reflected wave component
621, 622 secondary reflected wave
C1 first coverage area
C2 second coverage area
S1 corridor (internal space)
S2 room (internal space)
S3 attic space (internal space)
X1 range
X2 range
θ spread
φ spread

The invention claimed is:

1. A reflection unit installed in a wireless transmission path between a first wireless device comprising a first antenna and being configured to at least transmit a wireless communication signal and a second wireless device comprising a second antenna and being configured to at least receive the wireless communication signal, in order to change a direction of the wireless transmission path, the reflection unit comprising a plurality of reflectors configured to reflect the wireless communication signal, wherein the plurality of reflectors includes a plurality of reflectarray reflectors, the plurality of reflectarray reflectors includes a first reflectarray reflector and a second reflectarray reflector, the first reflectarray reflector is configured to reflect a second reflected wave, caused by the second reflectarray reflector, of a second wireless communication signal transmitted from the second wireless device, the second reflectarray reflector is configured to reflect a first reflected wave, caused by the first reflectarray reflector, of a first wireless communication signal transmitted from the first wireless device, the first reflectarray reflector includes a first concentration reflection part configured such that the first reflected wave is concentrated at a focal point, and a first non-concentration reflection part configured such that the first reflected wave is not concentrated, and the second reflectarray reflector includes a second concentration reflection part configured such that the second reflected wave is concentrated at a focal point, and a second non-concentration reflection part configured such that the second reflected wave is not concentrated.

2. The reflection unit according to claim 1, wherein
the reflection unit is mountable to a structure having a corner where a first face and a second face are in contact with each other, and
the first reflectarray reflector is configured to be mounted to the first face; and the second reflectarray reflector is configured to be mounted to the second face.

3. The reflection unit according to claim 1, wherein
the plurality of reflectarray reflectors includes at least one non-diffusion reflectarray reflector configured such that the wireless communication signal is reflected in a non-diffused manner.

4. The reflection unit according to claim 1, wherein
the plurality of reflectarray reflectors includes
at least one diffusion reflectarray reflector configured such that the wireless communication signal is reflected in a diffused manner, and
at least one non-diffusion reflectarray reflector configured such that the wireless communication signal is reflected in a non-diffused manner.

5. The reflection unit according to claim 3, wherein
the at least one non-diffusion reflectarray reflector includes at least one concentration-type reflectarray reflector configured such that a reflected wave of the wireless communication signal is concentrated at a focal point.

6. The reflection unit according to claim 5, wherein
the reflection unit is mountable to a structure that has: a first portion; and a second portion where the wireless communication signal is more easily propagated than in the first portion, and
the concentration-type reflectarray reflector is mounted to the structure such that the reflected wave passes through the second portion.

7. The reflection unit according to claim 5, wherein
the concentration-type reflectarray reflector is configured such that the focal point is present at a position where an obstacle present in the wireless transmission path is avoided.

8. The reflection unit according to claim 5, wherein
the plurality of reflectors includes another reflector that further reflects the reflected wave caused by the concentration-type reflectarray reflector, and
the other reflector is smaller than the concentration-type reflectarray reflector.

9. The reflection unit according to claim 1, wherein
the first reflectarray reflector and the second reflectarray reflector are each one of a diffusion reflectarray reflector, a concentration-type reflectarray reflector, and a non-diffusion and non-concentration-type reflectarray reflector,
the second reflectarray reflector is one of the diffusion reflectarray reflector, the concentration-type reflectarray reflector, and the non-diffusion and non-concentration-type reflectarray reflector,
the diffusion reflectarray reflector is a reflectarray reflector configured such that the wireless communication signal is reflected in a diffused manner,
the concentration-type reflectarray reflector is a reflectarray reflector configured such that a reflected wave of the wireless communication signal is concentrated at a focal point, and
the non-diffusion and non-concentration-type reflectarray reflector is a reflectarray reflector configured such that: the wireless communication signal is not reflected in a diffused manner; and a reflected wave of the wireless communication signal is not concentrated at a focal point.

10. The reflection unit according to claim 1, wherein
the reflection unit is mountable to a structure having an installation surface, and
the second reflectarray reflector is configured to radiate the second reflected wave into a range including a direction orthogonal to the installation surface.

11. The reflection unit according to claim 1, wherein
the reflection unit further includes a radio wave absorber.

12. The reflection unit according to claim 1, wherein
the plurality of reflectarray reflectors further includes a multi-focal point reflectarray reflector, and
the multi-focal point reflectarray reflector is configured such that a first focal point in a first radiation plane included in a radiation range of a reflected wave of the wireless communication signal and a second focal point in a second radiation plane orthogonal to the first radiation plane are present at different positions.

13. The reflection unit according to claim 1, wherein
the first concentration reflection part and the second concentration reflection part are each implemented by a reflectarray including a plurality of reflection elements.

14. The reflection unit according to claim 1, wherein
the first non-concentration reflection part is configured to reflect the second reflected wave caused by the second concentration reflection part, and
the second non-concentration reflection part is configured to reflect the first reflected wave caused by the first concentration reflection part.

15. The reflection unit according to claim 1, wherein
the first reflectarray reflector includes a first low reflection region around the first non-concentration reflection part,
the first low reflection region has a reflectance lower than a reflectance, as to the second reflected wave, of the first non-concentration reflection part,
the second reflectarray reflector includes a second low reflection region around the second non-concentration reflection part, and
the second low reflection region has a reflectance lower than a reflectance, as to the first reflected wave, of the second non-concentration reflection part.

16. The reflection unit according to claim 15, wherein
the first low reflection region and the second low reflection region each include a radio wave absorber.

17. The reflection unit according to claim 1, wherein
the first concentration reflection part is formed in a ring shape,
the first non-concentration reflection part is disposed on an inner side of the first concentration reflection part,
the second concentration reflection part is formed in a ring shape, and
the second non-concentration reflection part is disposed on an inner side of the second concentration reflection part.

18. The reflection unit according to claim 1, wherein
the reflection unit is mountable to a structure having a corner where a first face and a second face are in contact with each other,
the first reflectarray reflector is mounted to the first face,
the second reflectarray reflector is mounted to the second face, the first non-concentration reflection part is disposed at a position closer to the second face than the first concentration reflection part, or a position farther away from the second face than the first concentration reflection part, and the second non-concentration reflection part is disposed at a position closer to the first face than the second concentration reflection part, or a position farther away from the first face than the second concentration reflection part.

19. The reflection unit according to claim 1, wherein the first non-concentration reflection part is configured such that the first reflected wave is diffused, or is configured such that the first reflected wave is not diffused and is not concentrated, and the second non-concentration reflection part is configured such that the second reflected wave is diffused, or is configured such that the second reflected wave is not diffused and is not concentrated.

20. The reflection unit according to claim 19, wherein the first non-concentration reflection part and the second non-concentration reflection part are each implemented by a reflectarray including a plurality of reflection elements.

21. The reflection unit according to claim 1, wherein the first non-concentration reflection part is attachable to and detachable from the first concentration reflection part, and the second non-concentration reflection part is attachable to and detachable from the second concentration reflection part.

22. The reflection unit according to claim 1, embedded in a construction member.

23. A reflection unit installed in a wireless transmission path between a first wireless device comprising a first antenna and being configured to at least transmit a wireless communication signal and a second wireless device comprising a second antenna and being configured to at least receive the wireless communication signal, the reflection unit comprising at least one concentration-type reflectarray reflector configured such that a reflected wave of the wireless communication signal is concentrated at a focal point, wherein the at least one concentration-type reflectarray reflector includes a first reflectarray reflector and a second reflectarray reflector, the first reflectarray reflector is configured to reflect a second reflected wave, caused by the second reflectarray reflector, of a second wireless communication signal transmitted from the second wireless device, the second reflectarray reflector is configured to reflect a first reflected wave, caused by the first reflectarray reflector, of a first wireless communication signal transmitted from the first wireless device, the first reflectarray reflector includes
  a first concentration reflection part configured such that the first reflected wave is concentrated at a focal point, and
  a first non-concentration reflection part configured such that the first reflected wave is not concentrated, and the second reflectarray reflector includes
  a second concentration reflection part configured such that the second reflected wave is concentrated at a focal point, and
  a second non-concentration reflection part configured such that the second reflected wave is not concentrated.

24. The reflection unit according to claim 23, wherein the reflection unit is mountable to a structure that has: a first portion; and a second portion where the wireless communication signal is more easily propagated than in the first portion, and one of the at least one concentration-type reflectarray reflector is mounted to the structure such that the reflected wave passes through the second portion.

25. The reflection unit according to claim 23, wherein one of the at least one concentration-type reflectarray reflector is configured such that the focal point is present at a position where an obstacle present in the wireless transmission path is avoided.

26. The reflection unit according to claim 23, further comprising another reflector configured to further reflect the reflected wave, wherein the other reflector is smaller than the concentration-type reflectarray reflector.

27. A wireless transmission system comprising:

the first wireless device according to claim 1 configured to at least transmit the wireless communication signal;

the second wireless device according to claim 1 configured to at least receive the wireless communication signal; and the reflection unit according to claim 1 installed in the wireless transmission path between the first wireless device and the second wireless device in order to change the direction of the wireless transmission path.

* * * * *